(12) United States Patent
Tanaka et al.

(10) Patent No.: US 6,544,123 B1
(45) Date of Patent: Apr. 8, 2003

(54) GAME APPARATUS, COMMAND INPUT METHOD FOR VIDEO GAME AND COMPUTER-READABLE RECORDING MEDIUM RECORDING PROGRAMS FOR REALIZING THE SAME

(75) Inventors: Hiromichi Tanaka, Tokyo (JP); Daisuke Watanabe, Chiba (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/537,178

(22) Filed: Mar. 29, 2000

(30) Foreign Application Priority Data

Oct. 29, 1999 (JP) .......................................... 11-309823

(51) Int. Cl.[7] ................................................. A63F 13/00
(52) U.S. Cl. ............................... 463/36; 463/1; 463/43; 463/30; 463/36; 345/783
(58) Field of Search ................................. 463/1, 30, 31, 463/33, 43, 36; 345/783, 834, 700, 619, 630, 649, 650, 665, 670, 671, 835, 810, 961

(56) References Cited

FOREIGN PATENT DOCUMENTS

| JP | 9-192353 | 7/1999 |
| JP | 11-232016 | 8/1999 |
| JP | 2000-157735 | 6/2000 |
| JP | 2000-176164 | 6/2000 |

OTHER PUBLICATIONS

Warhammer: Dark Omen, Published by Electronic Arts, 1998. [http://www.mobygames.com/game_group/sheet/gameGroupId,286/] pp 1–2.*
Warhammer: Dark Omen Screenshot, Published by Electronic Arts, 1998. [http://www.mobygames.com/game/shots/gameShotId, 19421/gameId,2240/] p. 1.*
English Language Abstract of JP 11–232016.

* cited by examiner

*Primary Examiner*—Mark Sager
*Assistant Examiner*—Aaron Capron
(74) *Attorney, Agent, or Firm*—Greenblum & Bernstein, P.L.C.

(57) ABSTRACT

Multiple icons are placed on a first loop-shaped orbit and a second loop-shaped orbit which are set with a certain position in a virtual space as the center thereof. Desired icons from the icons on the first loop-shaped orbit and a second loop-shaped orbit are moved to a first cursor and a second cursor respectively, in response to an operation input by a player. Selection key input by the player inputs a command corresponding to the icons within the cursors to a computer. Thus, the visual recognition of icons is improved over the conventional method of command input by selecting icons, and the number of icon images can be kept to a minimum even in the event that the number of candidates for command selection is great.

30 Claims, 53 Drawing Sheets

FIG. 16

| | | |
|---|---|---|
| 122b | CHARACTER NO. | 0 |
| 122c | CHARACTER NAME | — |
| 122d | COORDINATES (x, y, z) | Char_x, Char_y, Char_z |
| | — | — |
| | ⋮ | ⋮ |

| | 1260 |
|---|---|
| NUMBER OF XZ ICONS | — |
| XZ ICON NO. | NAME |
| 0 | A |
| 1 | B |
| 2 | C |
| 3 | D |
| 4 | E |
| 5 | F |
| ⋮ | ⋮ |
| XZ RADIUS | r1 |
| XZ SELECTION ICON NO. | 0 |
| XZ CURRENT ANGLE | 0 |
| XZ TARGET ANGLE | 0 |
| XZ ANGLE DIFFERENCE | 0 |
| XZ COUNT | 0 |
| XZ SELECTION CHARACTER NO. | 0 |

Labels: 1261 (NUMBER OF XZ ICONS), 1262 (XZ ICON NO.), 1263 (XZ RADIUS), 1264 (XZ SELECTION ICON NO.), 1265 (XZ CURRENT ANGLE), 1266 (XZ TARGET ANGLE), 1267 (XZ ANGLE DIFFERENCE), 1268 (XZ COUNT), 1269 (XZ SELECTION CHARACTER NO.)

| | | 1270 |
|---|---|---|
| 1271 | NUMBER OF YZ ICONS | — |
| 1272 | YZ ICON NO. | NAME |
| | 0 | 1 |
| | 1 | 2 |
| | 2 | 3 |
| | 3 | 4 |
| | 4 | 5 |
| | 5 | 6 |
| | ⋮ | ⋮ |
| 1273 | YZ RADIUS | r2 |
| 1274 | YZ SELECTION ICON NO. | 0 |
| 1275 | YZ CURRENT ANGLE | 0 |
| 1276 | YZ TARGET ANGLE | 0 |
| 1277 | YZ ANGLE DIFFERENCE | 0 |
| 1278 | YZ COUNT | 0 |
| 1279 | YZ SELECTION CHARACTER NO. | 0 |

FIG. 59

| COLOR ATTRIBUTES | EFFECTS | MAGIC SPELL |
|---|---|---|
| RED | NORNAL | BURNER |
|  | WIDE | BULLET |
|  | POWER | FLARE |
|  | ⋮ | ⋮ |
| BLUE | NORNAL | DROP |
|  | WIDE | CUTTER |
|  | POWER | RIPPLE |
|  | ⋮ | ⋮ |
| ⋮ | ⋮ | ⋮ |

124b / 124c / 124a / 124d

GAME APPARATUS, COMMAND INPUT METHOD FOR VIDEO GAME AND COMPUTER-READABLE RECORDING MEDIUM RECORDING PROGRAMS FOR REALIZING THE SAME

BACKGROUND OF THE INVENTION

1. Field of the Invention

The present invention relates to a video game apparatus, a command input method for the video game apparatus, and a computer-readable recording medium upon which is recorded programs for realizing the method, and particularly relates to a game apparatus wherein icons are displayed on a screen and the player selects the icons during the game so as to input correlating commands, a command input method for the video game, and a computer-readable recording medium upon which is recorded programs for realizing the method thereof.

2. Description of the Related Art

In games of various genres, there are scenes wherein the player selects the action of a play character from a plurality of commands. In such a case, a method is used wherein icons, to which are appropriated commands to be input, are displayed on the screen, and the player selects one of the multiple icons, thereby inputting the command.

FIG. 65 is a diagram illustrating a conventional example of such an icon display. As shown in FIG. 65, multiple icons 300 through 309 are arrayed in two rows on a two-dimensional plane. Different commands are appropriated to each of the arrayed icons 300 through 309. The picture for each icon corresponds to a command with which it is correlated. For example, the icon 300 indicates that it is correlated with a command "A". The player moves cursor 310, which is capable of moving within the screen using direction keys of a the controller, so as to be placed upon the displayed icon for the command to be selected. In the example shown in FIG. 65, the moving path of the cursor 310 over the icons 300 through 308 is shown by an arrow. Actuating a confirm key allows the player to input the selected command.

Also, as described in Japanese Unexamined Patent Publication No. Hei 9-192353, there are arrangements wherein an image of a selected icon is displayed larger than the other icon images. This increases the ease of visual recognition of the icon, facilitates the ease of icon selection, and further simplifies the input of commands.

With the method of arraying the icons in a grid on a two-dimensional plane as shown in FIG. 65, the player must first recognize the desired icon, and then operate direction keys on the controller to move cursor 310 to the desired icon. For example, in the event that the player desires to select the command "K", the player must find the icon 308, and move the cursor 310 to the position thereof.

However, it is not always easy for the player to speedily find the desired command from among the multiple icons 300 through 309. This task becomes even more complicated in the event that the number of icons to be displayed is increased, and also, the display area for displaying the icons as images requires a large area.

SUMMARY OF THE INVENTION

Accordingly, it is an object of the present invention to suppress the number of displayed icons to which commands are appropriated, and to facilitate the ease of the player inputting desired commands from a great number of commands.

To this end, the game apparatus according to the present invention comprises a computer for controlling a game, and a recording medium that stores programs for causing the computer to control a game, wherein the program causes the computer to perform the following:

storing each of a first icon image group and a second icon image group made up of a plurality of icon images for the inputting of commands to be instructed to the computer;

respectively setting in a loop fashion a first orbit for moving the first icon image group into a virtual space, and a second orbit for moving the second icon image group;

positioning the stored first icon image group and the second icon image group on the set first orbit and set second orbit in a corresponding manner;

controlling the movement of the first icon image group and the second icon image group positioned on a display screen along corresponding first and second orbits, in response to an operation input; and inputting commands correlated beforehand with combinations of icons placed on particular positions on the first orbit and the second orbit by the moving control.

With the game apparatus according to the present invention, a first orbit and a second orbit are set in a loop-shaped form in a virtual space, wherein icons can be moved on the screen following the first and second orbits, and the player can input commands correlated to the combination of icons. Thus, even in the event that the number of candidates for command selection is great, the number of icons displayed can be kept to a minimum.

Also, magic spells may be correlated beforehand with the input commands, to be executed. Thus, magic spells can be executed by selecting combinations of icons, so even in the event that there is a great number of types of magic spells in the game, the number of icons for magic spells displayed can be kept to a minimum.

Also, an arrangement may be employed wherein the position in the virtual space of one or more characters displayed on the screen is stored. Selected character information for specifying a character that is displayed on the screen and selected by the player is held. The character specified by the held selection information is changed to another character according to operating signals from the player. A first orbit and a second orbit is get with the position of the character specified by the stored selected character information as the center thereof.

Further, the commands appropriated to the first and second icon image groups may be hierarchically sorted and stored; with the icon positioning involving only icon images which are appropriated to the commands belonging to the hierarchical level selected by the player being selected and positioned from the first and second icon image groups. The diameters of each of the first and second orbits to be set according to the hierarchical level of the command appropriated to the icon image to be displayed can be changed to a diameter stored in correlation with the hierarchical level of the command.

Also, the game apparatus according to the present invention may further comprise a hierarchy change displaying means, wherein, in the event that the hierarchical level of the command selected by the player changes, the diameter of the orbit from the first or second orbit where the icon image to which the command regarding which the hierarchical level thereof changes is appropriated is either enlarged or reduced with the position of the character specified by the selected character information as the center thereof, so as to be deleted from the display screen, and the diameter of the orbit on which the icon image to which the command of the new hierarchical level is appropriated is displayed on the display screen again by either enlarging or reducing with the position of the character specified by the selected character information as the center thereof. Thus, the player is capable of visually grasping the switching of the hierarchical level of the command.

Also, the icons may be positioned on the first and second orbits at uniform distancing.

Also, an arrangement may be made wherein the selected icon images are positioned on specified positions on the first and the second orbits according to operating signals from the player, and the icons positioned on specified positions can be switched to other icons adjacent thereto on the first or the second orbits according to operating signals from the player. Thus, the player can select the desired combination of icons from the icons placed on the first and the second orbits.

Also, at least a part of the first and the second orbits may be set so as to intersect, or so as to be concentric.

Further, the above-described game apparatus can be realized by inputting commands with the command input method according to the present invention. Thus, with such hardware, the game apparatus according to the present invention can be easily carried out by executing the processing of the command input method according to the present invention using hardware such as general-purpose computers, general-purpose game apparatuses, or the like.

Also, the above game apparatus can be easily carried out by executing programs contained in a computer-readable recording medium according to the present invention, or programs transported by computer signals according to the present invention, using general-purpose computers, general-purpose game apparatuses, or the like. Thus, this can be easily distributed and sold independently from the apparatus as a software product, by means of the recording medium. Also, distributing the computer signals thereof as carrier waves from a host device allows the programs to be easily distributed independently from the apparatus. Then, using this software with appropriate hardware, such as, for example, general-purpose computers, general-purpose game apparatuses, or the like, allows the command input technique of the present invention to be easily carried out with such hardware.

BRIEF DESCRIPTION OF THE DRAWINGS

FIG. 16 is a diagram illustrating a character table in a character data storing area according to the first embodiment;

FIG. 18 is a diagram illustrating an X-Z icon data table in the icon data area according to the first embodiment;

FIG. 59 is a diagram illustrating the correlation relation between combinations of attributes and effects, and magic spells, according to a fifth embodiment of the present invention;

DETAILED DESCRIPTION OF THE PREFERRED EMBODIMENTS

The following is a detailed description of embodiments of the present invention, with reference to the attached drawings.

(Description of Principle)

First, the basic principle of a command input method in video games will be described. The following description will be made regarding application to a home video game apparatus.

Figure 1:
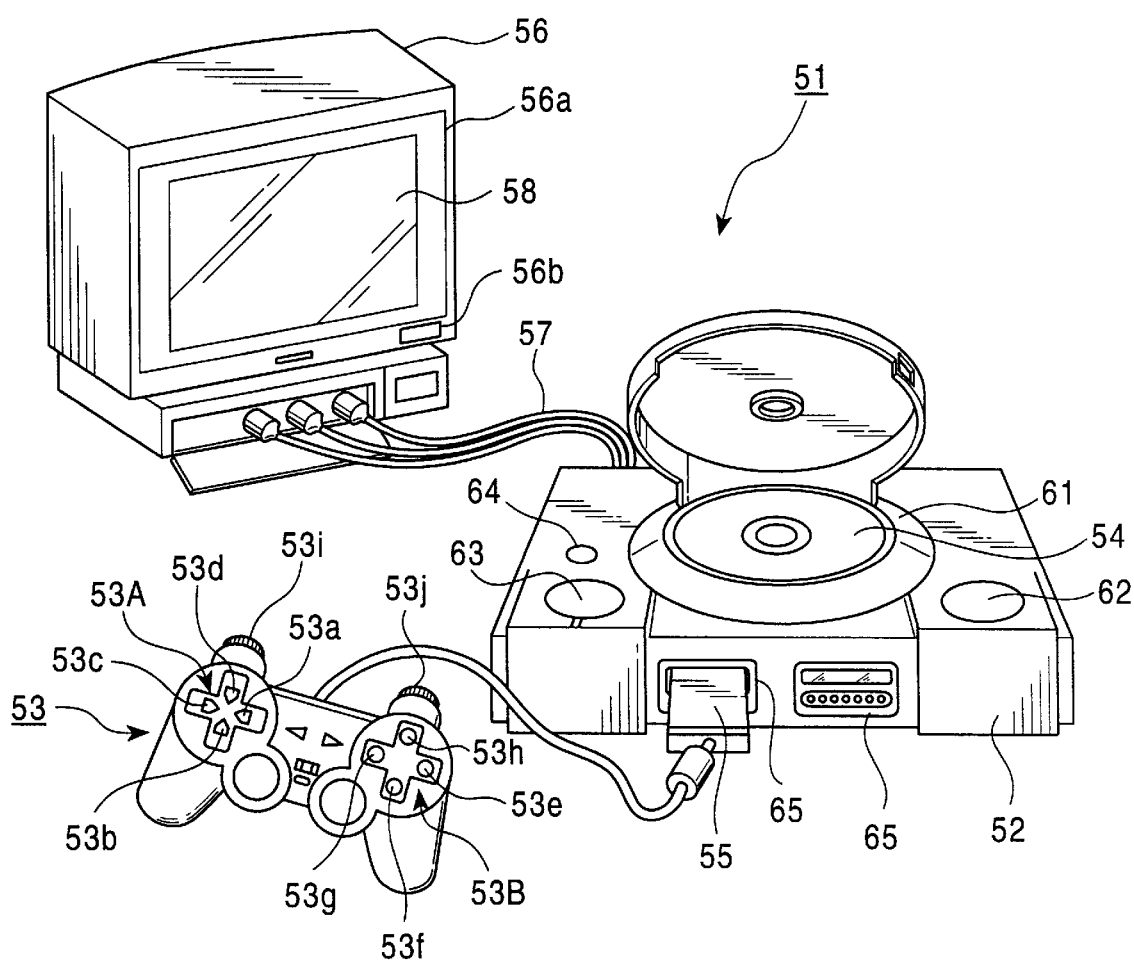
FIG. 1 is a diagram illustrating an overall configuration of a game apparatus to which the present invention is applied.

FIG. 1 is a diagram illustrating an overall configuration of a game apparatus according to the present invention. Game apparatus 51 can be generally broken down into, for example, a game apparatus main unit 52 which has the main functions of the game apparatus 51, a controller 53 which provides input operation instructions to the game apparatus main unit 52, a CD-ROM (Compact Disc Read-Only Memory) drive 113 (see FIG. 2) that accepts a CD disk 54 that stores programs for realizing processing related to the later-described game, image data, sound data, etc., a memory card 55 for saving game data, such as, for example, partway game data or game environment settings data, and a display unit, such as, for example, a television (TV) set 56 for displaying images and outputting sound according to the contents of the game, based on image signals and sound signals from the game apparatus main unit 52. The TV set 56 has a display 56a for displaying images, and a speaker 56b for outputting sound.

The game apparatus main unit 52 of the disclosed embodiment is provided on an upper plane thereof with a disk holder 61 for holding the CD-ROM 54, an open button 62 for opening the disk holder 61, an electric power button 63, and a reset button 64. Further, provided on a front side of the game apparatus main unit 52 are slot portions 65 for mounting controllers 53 and memory cards 55. The controllers 53 and memory cards 55 are detachably mounted to the game apparatus main unit 52 via these slot portions 65.

Arrayed on the controller 53 are the following: a direction key 53A, intent confirmation key 53B, left button 53i, and right button 53j. Associated with the direction key 53A are a right direction key 53a, down direction key 53b, left direction key 53c, and up direction key 53d. Associated with the intent confirmation key 53B are a confirmation key 53e, cancel key 53f, square key 53g, and a triangle key 53h.

Also, an AV (Audio and Visual) output portion (not shown in the drawings) is provided on a rear side of the game apparatus main unit 52, for connecting an AV cable 57. The game apparatus main unit 52 is connected to the TV set 56 via this AV cable 57. The display 56a comprises a CRT (Cathode Ray Tube) or the like, and the in-game screen is displayed on the display screen 58.

Figure 2:
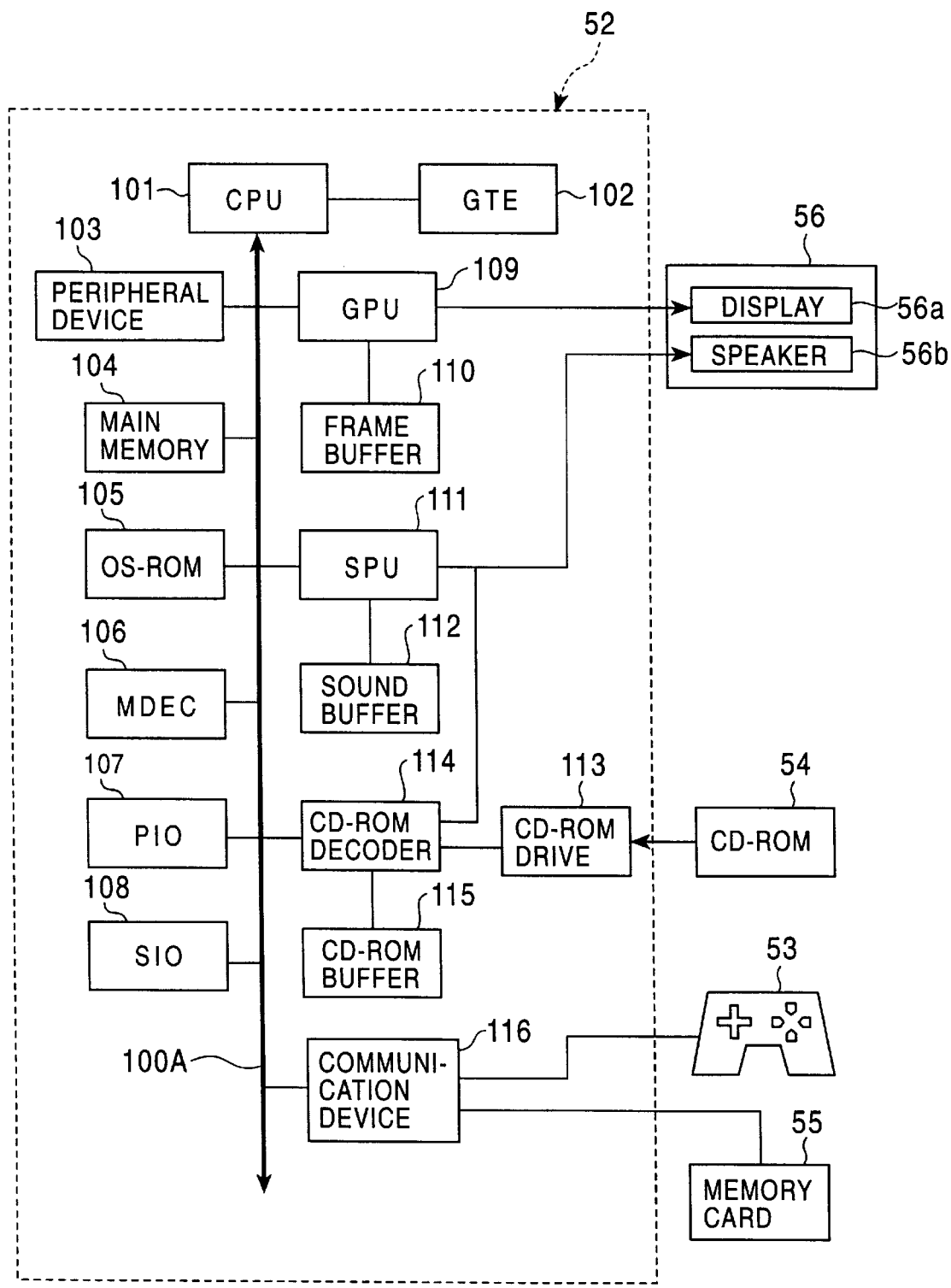
FIG. 2 is a block diagram illustrating a circuit configuration of a main game apparatus and peripheral components of the game apparatus of FIG. 1.

FIG. 2 is a block diagram illustrating the circuit configuration of the game apparatus main unit 52 shown in FIG. 1 and the peripheral components thereof. The game apparatus main unit 52 of the disclosed embodiment comprises, for example, a CPU (Central Processing Unit) 101, a GTE (Geometric Transform Engine (e.g., a graphic data generating processor)) 102, peripheral devices 103, main memory 104, OS-ROM (Operating System ROM) 105, MDEC (Motion DECoder (e.g., a data expanding engine)) 106, PIO (Parallel Input/Output) 107, SIO (Serial Input/Output) 108, GPU (Graphics Processing Unit) 109, frame buffer 110, SPU (Sound Processing Unit) 111, Sound buffer 112, CD-ROM drive 113, CD-ROM decoder 114, CD-ROM buffer 115, and a communication device 116.

The CPU 101, peripheral device 103, main memory 104, OS-ROM 105, MDEC 106, PIO 107, SIO 108, GPU 109, SPU 111, CD-ROM decoder 114, and communication device 116, are mutually connected together, in the disclosed embodiment, via bus 100A.

CPU 101 controls the components of the game apparatus main unit 52, based on the Operating System stored in the OS-ROM 105, and the game programs and data read from the CD-ROM 54 and deployed in the main memory 104, as described in later-described flowcharts.

Specifically, the CPU 101 reads out game programs and modeling data, such as 3-D models and the like, from the CD-ROM 54 via the CD-ROM drive 113 and CD-ROM decoder 114, and transfers the read data to the main memory 104. The CPU 101 also reads out a CLUT (Color Look-Up Table), texture pattern data, etc., from the CD-ROM 54, and transfers these to the frame buffer 110. Further, the CPU 101 transfers image information and color information requested from the GTE 102, and also instructs the GPU 109 to draw images.

In response to the instructions from the CPU 101, the GPU 109 performs modeling processing and rendering processing and the like, based on coordinates data and color information obtained from the GTE 102, and CLUT and texture pattern data and the like deployed in the frame buffer 110. Then, 2-dimensional projected images of an arbitrary area on a virtual three-dimensional space, configured by positioning a 3-D model, are drawn by the frame buffer 110. Synchronizing signals are added to this image data to produce picture signals that are input to the TV set 56. As an example, images according to contests of the game are displayed on the screen 58.

The CPU 101 also reads out sound data from the CD-ROM 54 and transfers this to the main memory 104 and SPU 111, thus instructing sound reproduction of the SPU 111. In response to this, the SPU 111 executes an appropriate modulation processing, reproducing processing, etc., for this sound data. In addition, this sound reproduction data is played over audio reproduction data transferred from the CD-ROM decoder 114, so as to form sound signals (voice, sound effects, BGM, etc.), which are output to the speaker 56b. Thus, BGM (BackGround Music) sound effects, etc., corresponding to the contents of the game, are output from the speaker 56b of the TV set 56.

The CPU 101 additionally generates clock signals based on timing signals supplied from a oscillator (omitted in the drawings). A timer counter (omitted in the drawings) with built-in clock signals is then used to perform clocking processing of time.

The GTE 102 is connected to the CPU 101, and operates as a co-processor for the CPU 101. The GTE 102 performs computation processing of fixed-point matrices or vectors, according to computation requests from the CPU 101. Included in such computation processing are, the following for 3-D coordinates data making up a 3-D model for example: coordinate calculation such as, for example, motion, rotation, enlargement, and reduction, perspective conversion calculations to two-dimensional coordinate data, brightness calculations for calculating the brightness of each part according to a virtually-set type of light source and the distance and angle from that light source, and perspective position thereto, and so forth.

The peripheral device 103 performs interruption control, control relating to DMA (Direct Memory Access) transfer, and the like. The main memory 104 is a memory to which programs executed by the CPU 101, data and the like, necessary for the execution, and so forth, are stored. The memory configuration and stored data for this main memory 104 will be described later. The OS-ROM 105 stores the Operating System that performs basic control of the game apparatus main unit 52, such as OS kernels, boot loader, etc.

The MDEC 106 performs decompressing processing of compressed images. Specifically, the MDEC 106 decompresses compressed image data by performing a decoding of Huffman coding, inverse-quantization processing, IDCT (Inverse Discrete Cosine Translation) computation and the like, regarding still-image and motion image compressed image data, such as, for example, JPEG (Joint Photographic Coding Experts Group) and MPEG (Moving Picture Expert Group). The PIO 107 is an expansion port that enables the exchange of parallel data. The SIO 108 is an interface with an expansion port for the serial exchange of data.

The GPU 109 is a sub-processor which operates independently from the CPU 101. The GPU 109 performs modeling processing and rendering processing of 3-D models made up of multiple polygons, based on coordinate data and color information obtained by the GTE 102, and the CLUT and texture pattern data and the like deployed in the frame buffer 110, following the drawing instructions from the CPU 101. Two-dimensional projected images of an arbitrary area in the virtual three-dimension space, configured by arraying a 3-D model, is drawn on the frame buffer 110. It is noted that the term "polygons" refers to the smallest unit of shapes making up a 3-D model, and are planar polygons such as triangles and quadrangles and the like.

The GPU 109 also adds synchronizing signals to the image data thus drawn or image data transfer from the main memory 104, thereby generating picture signals, that are output to the display 56a.

The frame buffer 110 of the disclosed embodiment is made up of dual-port RAM, with two areas being provided thereto. Image data for display is written to the above two areas in the frame buffer 110. At the same time that image data is being written to one area, image data is being read out from the other area, and the image is thus displayed on the display 56a.

The Color Look-Up Table (CLUT) to which reference is made for color specification, texture pattern data for texture mapping, etc., is stored in the frame buffer 110.

The SPU 111 is a sub-processor which operates independently of the CPU 101. The SPU 111 performs volume adjustment processing, pitch conversion, interval adjustment, envelope, reverberation and other types of modulation processing, such as ADPCM (Adaptive Differential Pulse Code Modulation) sound data stored in the sound buffer 112, based on sound replay instructions from the CPU 101, to generate sound signals. The generated sound signals are reproduced by the speaker 56b.

The SPU 111 also plays the audio replay data transferred from the CD-ROM decoder 114 over the sound replay data replayed by the SPU 111, so as to generate sound signals, which are outputted for reproduction by the speaker 56b.

The sound buffer 112 comprises a memory that temporarily stores ADPCM sound data and the like transferred from the main memory 104 by the CPU 101. The sound buffer 112 is used as a work area in the event that the SPU 111 performs reverberation processing. Also, in the event that the SPU 111 transfers sound data to the main memory 104, the sound buffer 112 is used as a buffer area for temporarily storing the sound data to be transferred.

The CD-ROM drive 113 includes a motor (not shown) that rotates a table (not shown) upon which the CD-ROM 54 is placed. The CD-ROM drive 113 includes a lazer (not shown) that irradiates a laser beam on the CD-ROM 54 while the table, upon which the CD-ROM 54 is placed, is rotating, and detects a light reflected therefrom. The CD-ROM drive 113 reads the encoded data stored in the CD-ROM 54, based on the reflected light which has been detected. The CD-ROM decoder 114 performs an error corresponding processing while decoding the data read from the CD-ROM 54, and transfers the decoded programs and data to the main memory 104 and SPU 111, etc. The CD-ROM driver 113 includes an internal sound source and mixer (both omitted in the drawings), and has replaying functions for audio data. The CD-ROM buffer 115 comprises memory for temporarily storing data to be transferred.

A controller 53 and memory card 55 is connected to the communication device 116. The communication device 116 controls the transfer of data between the CPU 101 and the like within the game apparatus main unit 52 and the connected controller 53 (or memory card 55).

Controller 53 comprises an input device for taking various types of operation signals according to operation input from the player, and transferring these to the CPU 101 in the game apparatus main unit 52 via the communication device 116. Multiple input buttons, such as a start button and direction key 53A, are provided on the controller 53.

The memory card 55 of the disclosed embodiment comprises a flash memory. Data read out from an arbitrary area on the main memory 104 and data read from the CD-ROM 54 is stored in the memory card 55. The data stored in the memory card 55 is read out by the CPU 101, and stored in the main memory 104.

Also, in the present Principle Description, the CD-ROM 54 has recorded therein programs and data for realizing the present invention. The CPU 101 reads output programs recorded in the CD-ROM, and performs processing according to the programs in cooperation with the other circuits within the game apparatus main unit 52. Thus, the functions intended by the programs are realized by the game apparatus 51. In the following discussion, a description will be made under the assumption that the CPU 101 executes programs recorded on the CD-ROM 54.

Data necessary for progression of the game is sequentially read out from the CD-ROM 54 according to the state of progression of the processing following the program under control of the CPU 101, and is transferred to the main memory 104. In this case, a data storing area is formed for each type, such as data, on the main memory 104.

Figure 3:
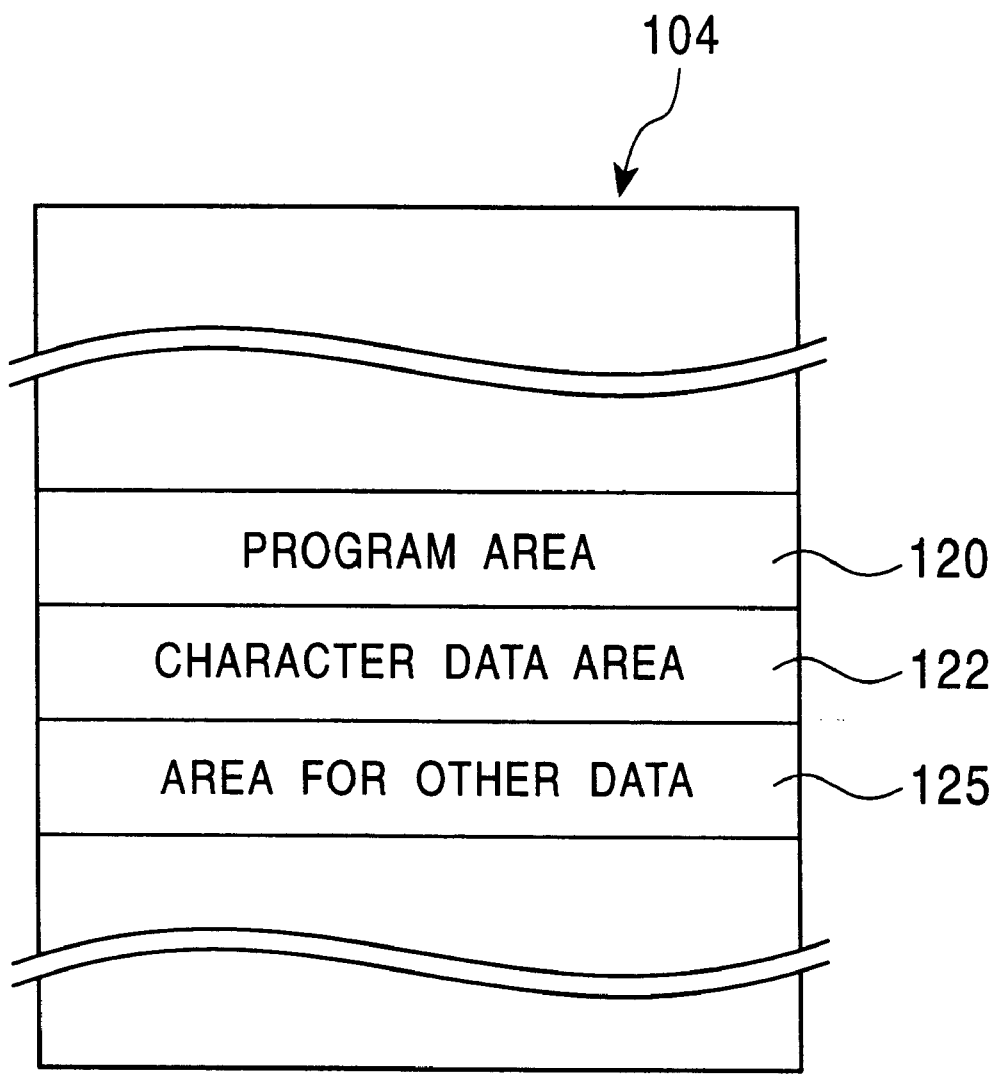
FIG. 3 is a diagram illustrating main memory storage area divisions associated with the main game apparatus shown in FIG. 2.

FIG. 3 is a diagram illustrating an example of the data storing area in the main memory 104. In this example, there are formed within the main memory 104 a program area 120, character data area 122, and an other data area 125. Stored in the program area 120 are programs necessary for the progress of the game. Stored in the character data area 122 is data representing the forms (and the like) of characters. Stored in the other data area 125 is icon data (and the like). Also stored in the other data area 125 is positional information for each icon in the event that the icon display processing ends. Note that a detailed description of the transfer of the various types of data read from the CD-ROM 54 to the main memory, decoding, and driving of the CD-ROM drive will be omitted, as such is known by those skilled in the art.

Figure 4:
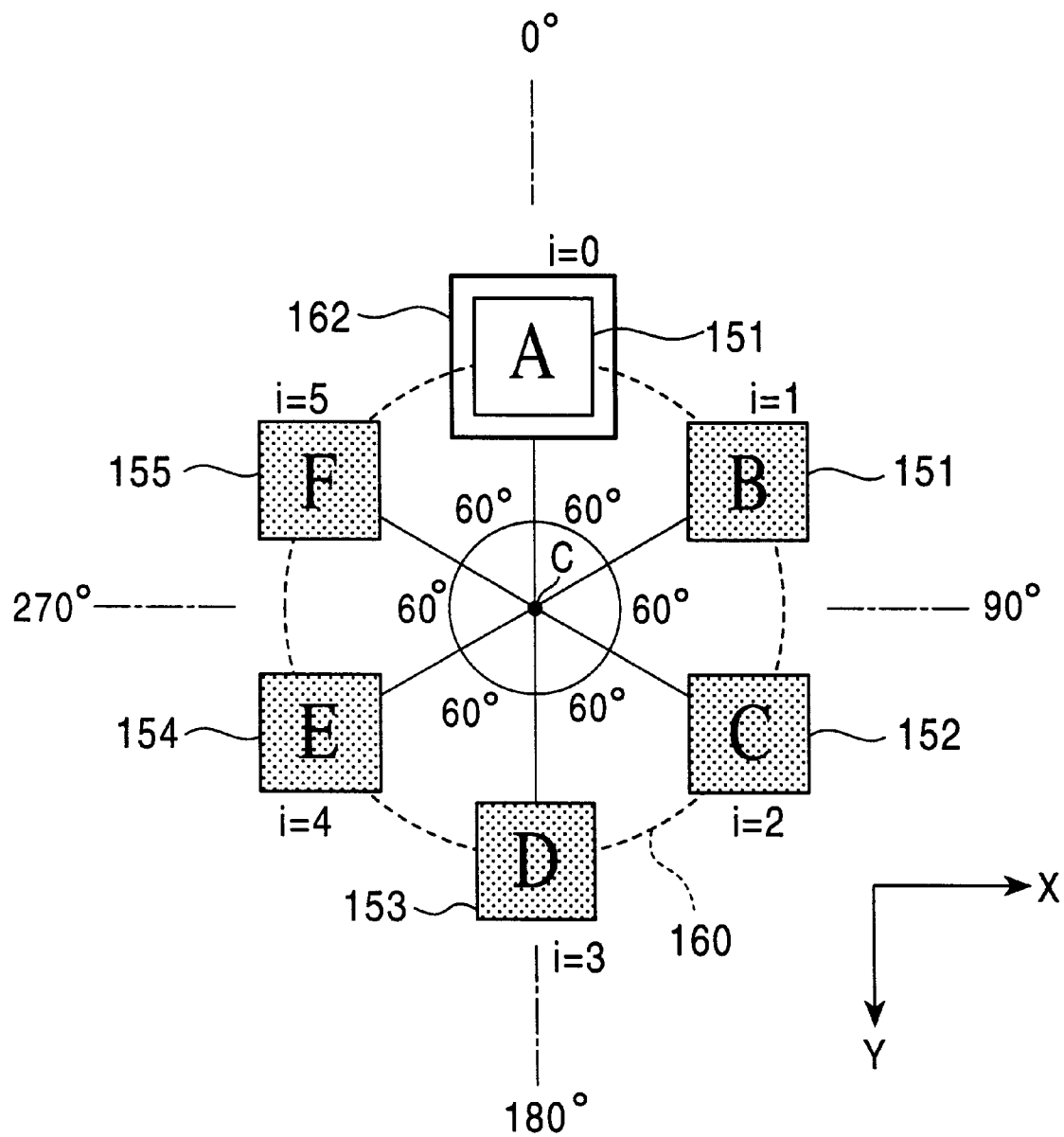
FIG. 4 is a diagram illustrating a placement state of multiple icons according to a method relating the principle description of the present invention.

Next, the icon display method relating to the present Principle Description will be described. FIG. 4 is a diagram illustrating the state of multiple icons being positioned on a loop-shaped orbit by the method relating to the present Principle Description.

FIG. 4 shows an orbit (hereafter referred to as "loop-shaped orbit") 160 upon which multiple icons 150 through 155 for example have been positioned. In the example shown in FIG. 4, the six icons 150 through 155 are positioned on the circular loop-shaped orbit 160 at equal spacing. That is, in the event that center point C of the loop-shaped orbit 160 and the positions at which the icons 150 through 155 are situated are each connected with line segments, the center angle between adjacent line segments is 60 degrees.

The images for the icons 150 through 155 represent commands appropriated to the icons 150 through 155, respectively. In the example shown in FIG. 4, a command "A" is appropriated to the icon 150, "B" to icon 151, "C" to icon 152, "D" to icon 153, "E" to icon 154, and "F" to icon 155. The player selects a desired icon, thereby inputting the desired command to the game apparatus main unit 52.

The icons 150 through 155 are allocated icon Nos. i. In the example shown in FIG. 4, icons 150 through 155 are allocated icon Nos. i=0 through 5. The greatest icon No. is I=number of icons minus 1. In FIG. 4, a square frame-like cursor 162 is displayed at a position encompassing the icon 150. This cursor 162 is placed at a specific position on the loop-shaped orbit 160, and as an example, are displayed in this position in a fixed manner.

The X coordinates and Y coordinates for positioning the icon with the icon No. I can be obtained by the following expressions:

$x(I)$=radius $r \times \cos (I \times (360/m) + \text{current angle} - 90)$, and $y (I)$=radius $r \times \sin (I \times (360/m) + \text{current angle} - 90)$.

Here, "r" represents the radius of the loop-shaped orbit 160. The variable "m" (a natural number) represents the number of icons, and in the present Principle Description, m=6 holds. Also, the current angle is the center angle between the reference line segment drawn from the center point C to the position of the cursor 162, and the line segment drawn from the center point C to the position of the icon 150 with the icon No. I=0 (the center angle being measured clockwise from the reference line segment). Incidentally, with the two-dimensional plan view in the present Principle Description, the center point C is the point of origin, to the right of the center point C is the positive X coordinates, and to the left of the center point C is the negative X coordinates. Also, above the center point C is the negative Y coordinates, and below the center point C is the positive Y coordinates.

Figure 5:
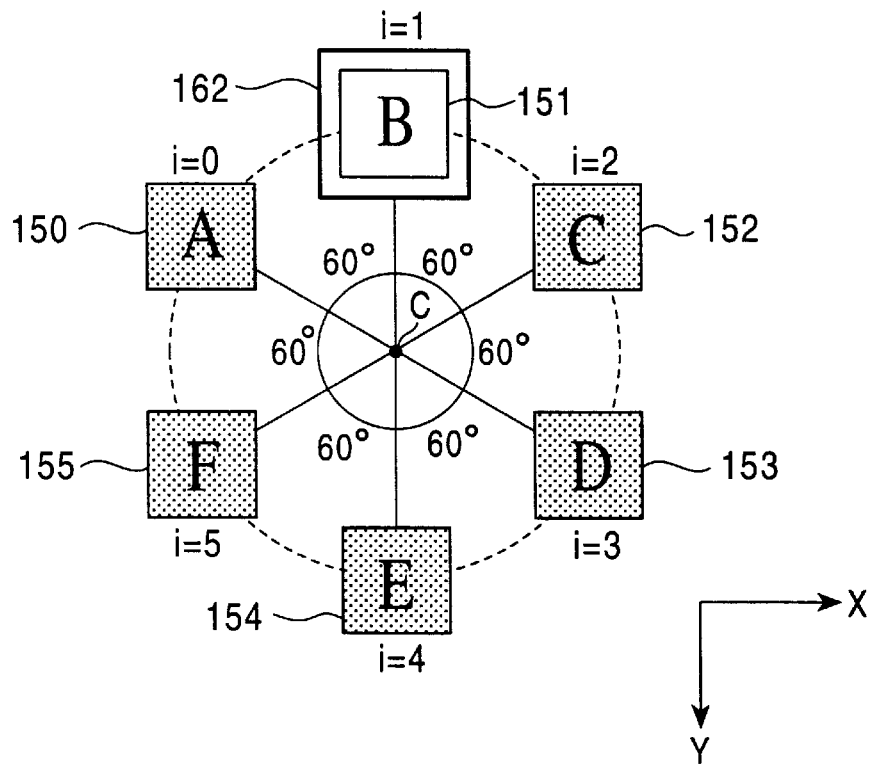
FIG. 5 is a diagram illustrating the placement state of the icons in the case that a direction key of a controller is pressed when in the state shown in FIG. 4.

Next, FIG. 5 is a diagram illustrating the placement state of icons in the event that the player presses the direction key 53A (see FIG. 1) in the state shown in FIG. 4. In the present Principle Description, icons 150 through 155 are arranged to move along the loop-shaped orbit 160 in response to the operation input of the direction key 53A by the player. In the event that the player presses the left-direction key 53c, icons 150 through 155 move along the loop-shaped orbit 160 in the counter-clockwise direction by a distance of one icon (360°/number of icons). This brings icon 151, which is appropriated the command "B", within the cursor 162. Now, in the event that the player presses the right-direction key 53a, icons 150 through 155 conversely move along the loop-shaped orbit 160 in the clockwise direction by a distance of one icon.

Thus, repeating the operation of the direction key 53A (see FIG. 1) allows the icon to which the command that the player wishes to select to be brought within the cursor 162. Then, the player presses confirmation key 53e to execute the command appropriated to the icon positioned within the cursor 162. For example, in the event that the player is to input the command "B", the confirmation key 53e (see FIG. 1) should be pressed in the state shown in FIG. 5 to select icon 151.

Figure 6:
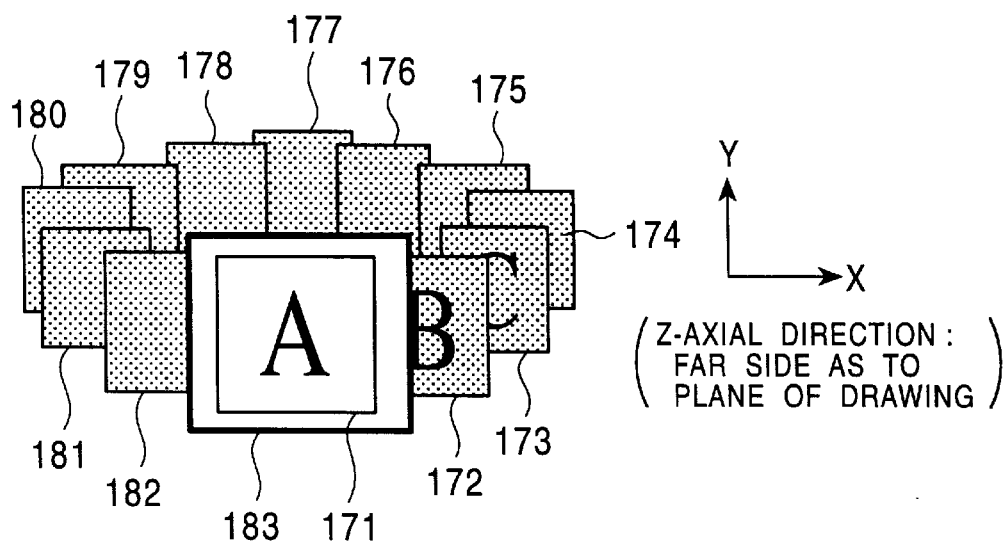
FIG. 6 is a diagram illustrating an example of a state wherein icons to be displayed are placed on a loop-like orbit.

Next, a description will be made regarding a case wherein icons are positioned within a virtual space, according to the method relating to the Principle Description of the present invention. FIG. 6 is a diagram illustrating the placement state of icons in a virtual space by the method relating to the Principle Description of the present invention. In FIG. 6, the direction from left to right is a direction of a positive X-axis, and the direction from bottom to top is a direction of a positive Y-axis, and the direction from a near side to a far side is a direction of a positive Z-axis.

As shown in FIG. 6, 12 icons, 171 through 182, are arranged at equal spacing on a circular loop-shaped orbit on the X-Z plane in a virtual space. Icons 171 through 182 are controlled so as to be always parallel to the X-Y plane. Thus, icons 171 through 182 always face the screen. Cursor 183 is fixedly positioned so as to encompass the icon placed at the most near-side position.

The symbols on the icons represent the commands appropriated thereto. For example, command "A" is appropriated to the icon 171, "B" to icon 172, "C" to icon 173, and so on in the same manner for the other icons 174 through 182.

Figure 7:
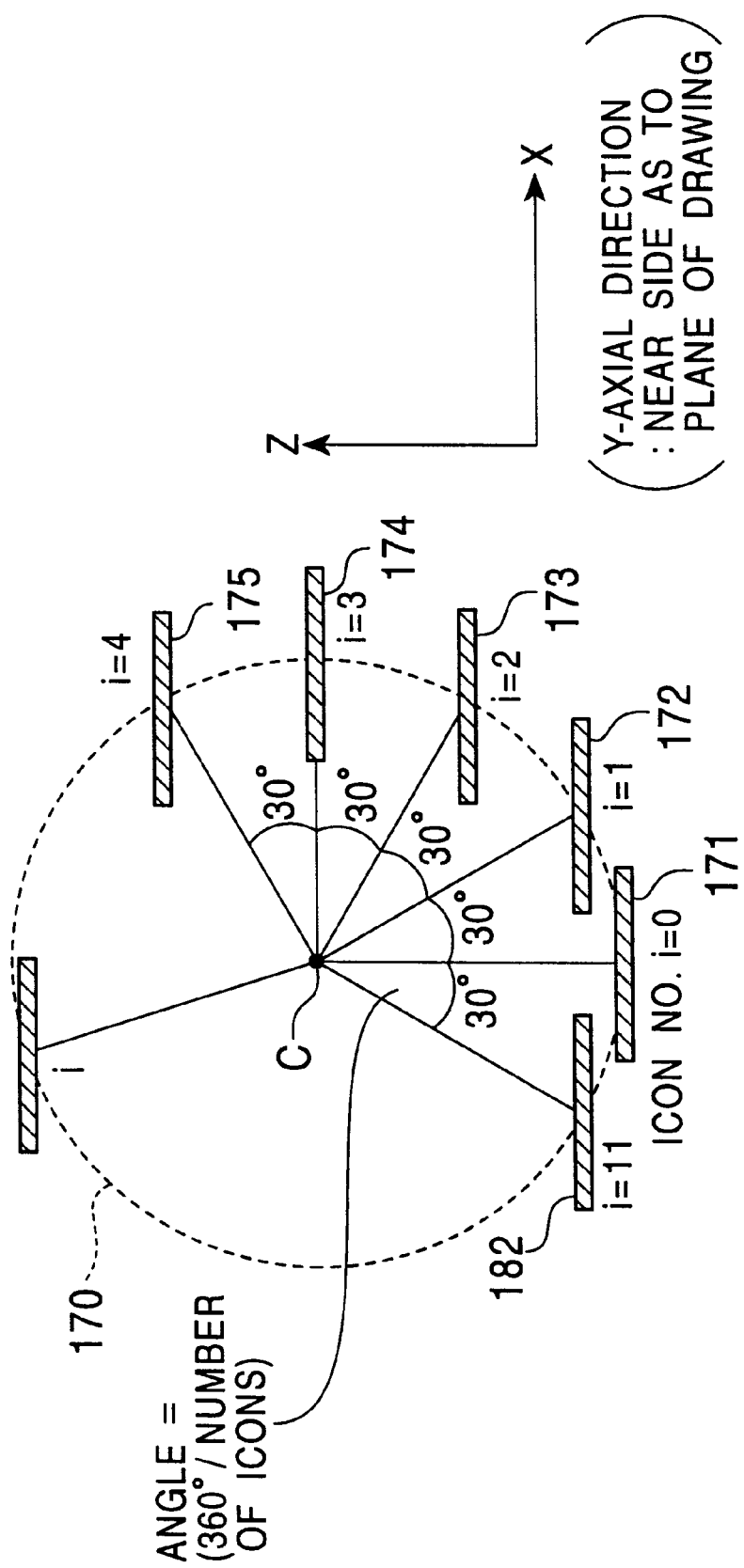
FIG. 7 is a diagram showing the state of icons in FIG. 6 directly from above, with respect to an X-Z plane.

Next, the positional placement of the icons in FIG. 6 will be described. FIG. 7 is a plan view of the X-Z plane of the icons in the state shown in FIG. 6. In FIG. 7, the direction from the left to the right is the direction of the positive X-axis, a direction from the bottom to the top is a direction of a positive Z-axis, and the direction from the far side to the near side is the direction of the positive Y-axis. For purposes of clarity, icons 176 through 181 are omitted in this drawing. Icons 171 through 182 are positioned on the circular loop-shaped orbit 170 at equal spacing. That is, in the event that the center point C of the loop-shaped orbit 160 and the positions at which the 12 icons 171 through 182 are situated are each connected with line segments, the center angle between adjacent line segments is 30 degrees. In other words, the center angles of the icons 171 through 182 can be represented as "360°/number of icons".

Here, the icon No. I for icon 171 is 0, icon No. I for icon 172 is 1, icon No. I for icon 173 is 2, and icon No. I for icon 174 is 4. Also, icon No. I for icon 182 is 11. In other terms, the maximum value of icon No. I can be represented as the number of icons minus 1.

The X coordinates and Z coordinates for positioning the icon with icon No. I can be obtained by the following expressions:

$x(I)$=radius $r$×cos ($I$×(360/$m$)+current angle−90), and $z(I)$=radius $r$×sin ($I$×(360/$m$)+current angle−90).

Here, "r" represents the radius of the loop-shaped orbit 170, and the variable "m" represents the number of icons, which, in the present Principle Description, m=12 holds.

Figure 8:
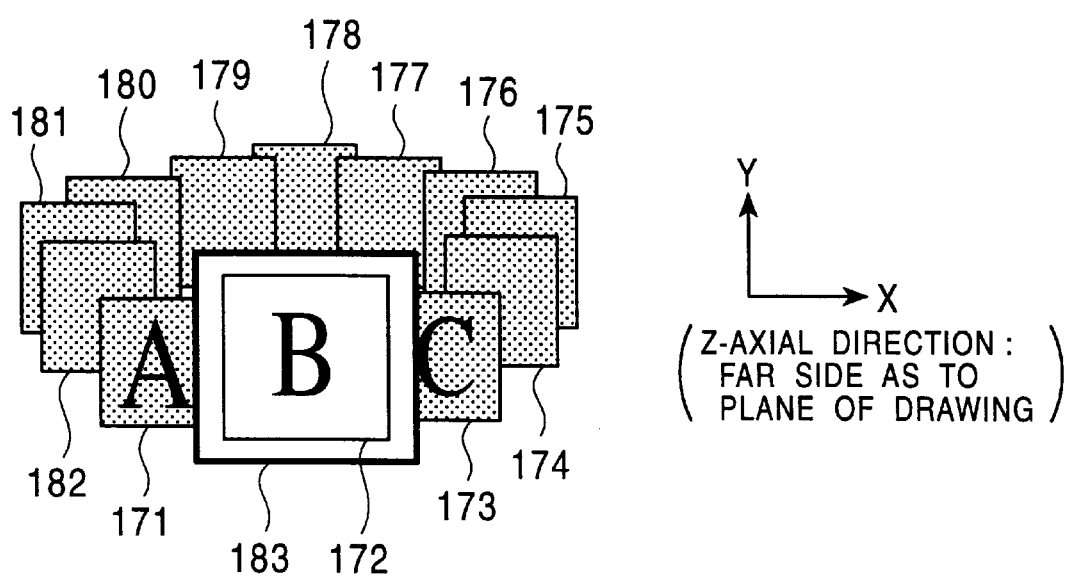
FIG. 8 is a diagram illustrating the placement state of the icons in the case that a right direction key of the controller is pressed when in the state shown in FIG. 6.

Next, FIG. 8 is a diagram illustrating the icon placement state in the event that the left direction key 53c is pressed in the state shown in FIG. 6. The coordinate axes are the same as shown in FIG. 6.

In the event that the player presses the left-direction key 53c (see FIG. 1) in the state shown in FIG. 6, icons 171 through 182 move along the loop-shaped orbit 170 by a distance of one icon. Consequently, the icon 172 is displayed at a position enveloped by the cursor 183.

Figure 9:
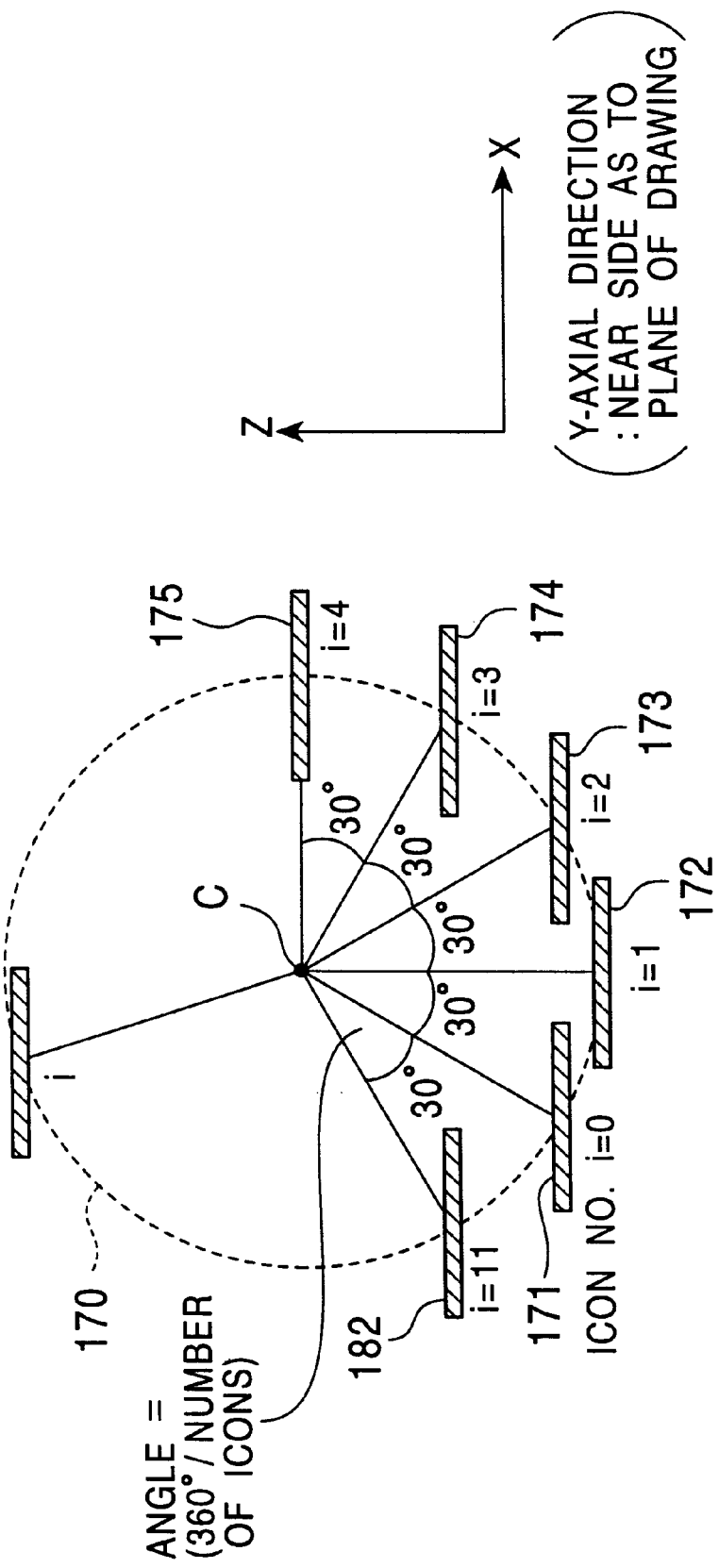
FIG. 9 is a diagram showing the state of icons in FIG. 8 directly from above, with respect to the X-Z plane.

Next, the positional placement of the icons in FIG. 8 will be described. FIG. 9 is a plan view of the X-Z plane of the icons in the state shown in FIG. 8. The coordinate axes are the same as shown in FIG. 7. The player presses the left-direction key 53c, causing icons 172 through 182 to move along the loop-shaped orbit 170 in the clockwise direction, which brings icon 172 to within the cursor 183. Now, in the event that the player presses the right-direction key 53a (see FIG. 1), icons 171 through 182 move along the loop-shaped orbit 170 in a counter-clockwise direction by a distance of one icon.

Thus, repeating the operation of the direction key 53A (see FIG. 1) allows the icon to which the command that the player wishes to select to be brought within the cursor 183, thereby inputting the command. For example, in the event that the player is to input the command "B", the confirmation key 53e (see FIG. 1) should be pressed in the state shown in FIG. 8 to select the icon 172, thereby inputting the command "B".

With the present Principle Description, movement of the looped icons in response to player operation input is displayed as an animated movement, by generating and displaying image data for a partway state.

Figure 10:
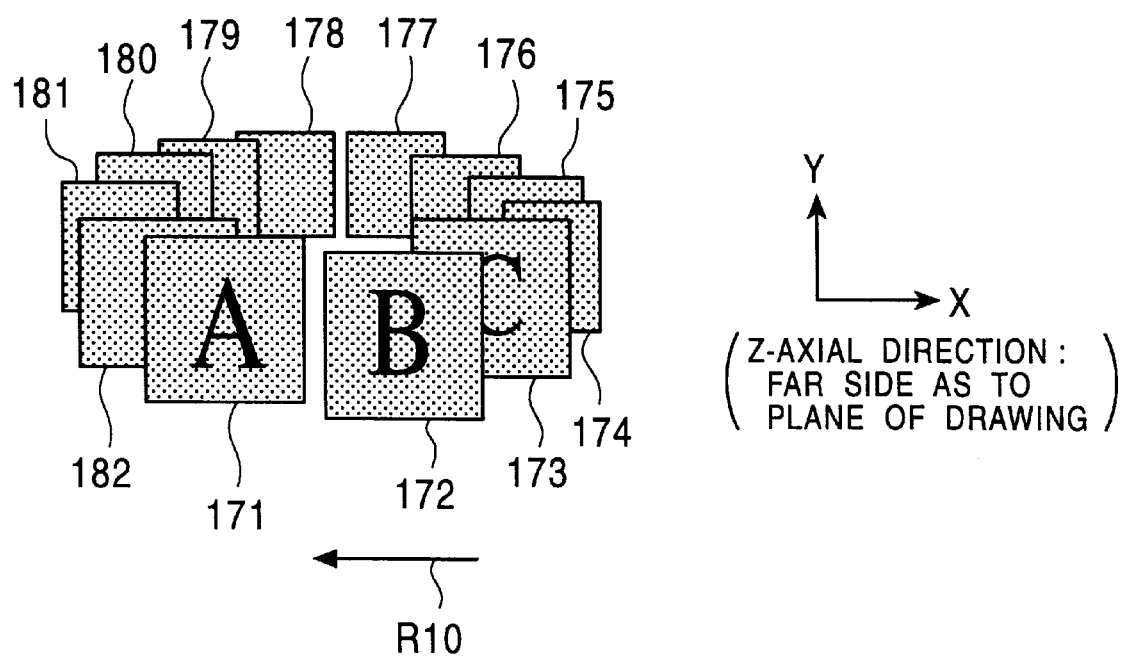
FIG. 10 is a diagram illustrating the state of moving from the icon placement state shown in FIG. 6 to the icon placement state shown in FIG. 8.

FIG. 10 is a diagram for illustrating the interpolation of frames in the process for changing from the icon placement state shown in FIG. 6 to that shown in FIG. 8. In FIG. 10, the state partway through the movement from icons 172 through 182 moving along the loop-shaped orbit 170 in the direction of arrow RIO in response to the input from the left-direction key 53c is shown.

Figure 11:
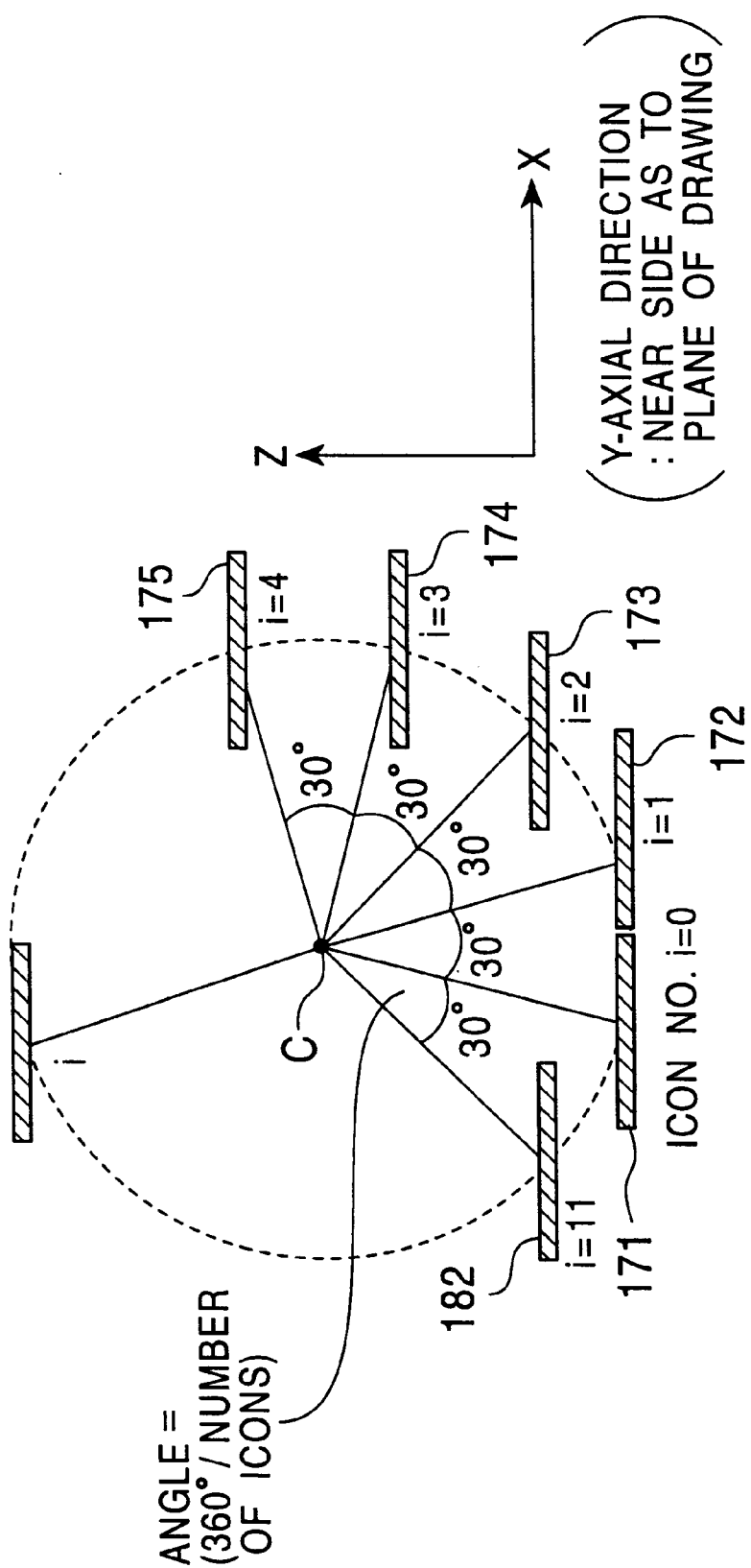
FIG. 11 is a diagram showing the state of icons in FIG. 10 directly from above, with respect to the X-Z plane.

The positional placement of the icons in FIG. 10 will now be described. FIG. 11 is a plan view of the X-Z plane of the icons in the state shown in FIG. 10. In this example, icons 171 through 182 move along the loop-shaped orbit 170 in the clockwise direction by 30 degrees, but with the present Principle Description, the movement thereof is displayed as an animation by a certain number of interpolation frames. That is to say, icons 171 through 182 are continuously displayed while moving along the loop-shaped orbit 170 in 5° increments at a time, for example, thereby displaying the state partway through motion as an animation.

Figure 12:
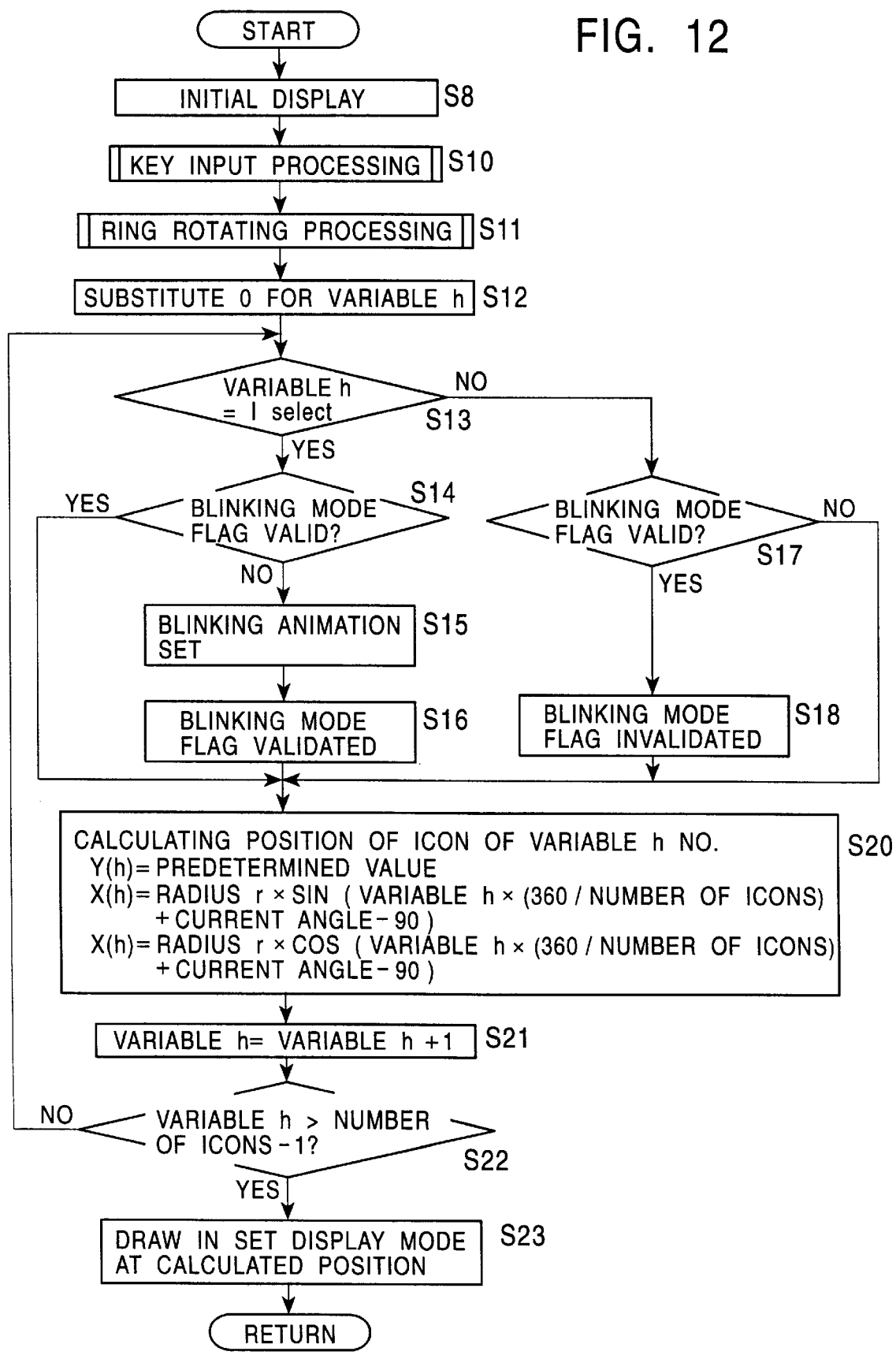
FIG. 12 is a flowchart for a main processing routine for displaying an icon relating to the principle description of the present invention.

FIG. 12 is a diagram illustrating a main flowchart for icon display processing according to the present Principle Description.

As shown in FIG. 12, once the processing begins, information indicating the position of each icon at the time of ending the previous icon display processing, and the icon data are read out of the other data area 125 of the main memory 104, and the icons are placed at the position at the time of ending the previous icon display processing The placed icons are displayed on the display screen 58 (step S8).

Subsequently, a key input processing routine is executed (step S10). The key input processing routine is executed in the event that the right-direction key 53a or the left-direction key 53c of the controller 53 is pressed, with the details thereof being described later. Next, a ring rotating processing routine is executed (step S11). The ring rotating processing routine controls the display of the above animation, wherein the icons move; the details thereof will be described later.

Next, a zero is substituted for the variable "h" (step S12), and a judgement is made regarding whether the variable "h" is equal to the selected icon No. Iselect (step S13). Here, at the beginning time of the key input processing routine, the icon No. of the icon which is displayed at the position enveloped by the cursor 183 is set in Iselect. That is, in the state shown in FIG. 8, Iselect=1.

In the event that the variable "h"=Iselect in step S13, a determination is made as to whether a blinking mode flag is valid (step S14). The blinking mode is a mode for performing a blinking animation display, and is set for each icon. The image for an icon wherein the blinking mode flag is valid is displayed by an animation wherein blinking is repeated. In the event that the blinking mode flag is not valid, blinking animation is set (step S15). Then, the blinking mode flag is validated (step S16).

In the event that variable 'h' does not equal Iselect in step S13, a determination is made regarding whether the blinking mode flag is valid (step S17). In the event that the blinking mode flag is valid, the blinking mode flag is invalidated (step S18).

In the event that the blinking mode flag is valid in step S14, or, in the event that the validation processing of the blinking mode flag for step S16 is completed, or, in the event that the invalidation processing of the blinking mode flag for step S18 is completed, or, in the event that the blinking mode flag is judged to be invalid in step S17, the position of the icon with the same icon No. I as the variable "h" is calculated (step S20). The information of the position of the calculated icon is stored in the other data area 125 of the main memory 104.

Specifically, the x coordinate and z coordinate for the icon wherein icon No. I (=h) are calculated by the following expressions:

$X(h)$=radius $r$×sin ($h$×(360/$m$)+current angle−90), and $Z(h)$=radius $r$×cos ($h$×(360/$m$)+current angle−90).

Here, "r" represents the radius of the circle traced by the loop-shaped orbit 170. The y-coordinate is constant at an arbitrary predetermined value.

Next, variable 'h' is set equal to variable 'h'+1 (step S21). That is, the variable "h" is incremented by 1 (1 is added thereto). Next, a determination is made regarding whether the variable "h" is greater than the number of icons minus 1 (step S22). That is, determination is made (at step S22) regarding whether or not display mode settings and setting calculation of placement coordinate positions have been completed, for all icons.

In the event that the variable "h" is not greater than the number of icons minus 1, i.e., in the event that the variable "h" is equal to or smaller than the number of icons minus 1, processing returns to step S13. On the other hand, in the event that the variable "h" is greater than the number of icons "h" minus 1, the icons are positioned in accordance with the calculated positions, i.e., on the orbit, and the icons are drawn in the set display mode (step S23). That is, all icons are drawn at the calculated x-coordinates, z-coordinates, and predetermined y-coordinates, in either the blinking mode or the non-blinking normal display mode.

This ends the main processing in the present Principle Description. The main processing is repeatedly executed several tens of times (e.g., 30 times) each second.

Figure 13:
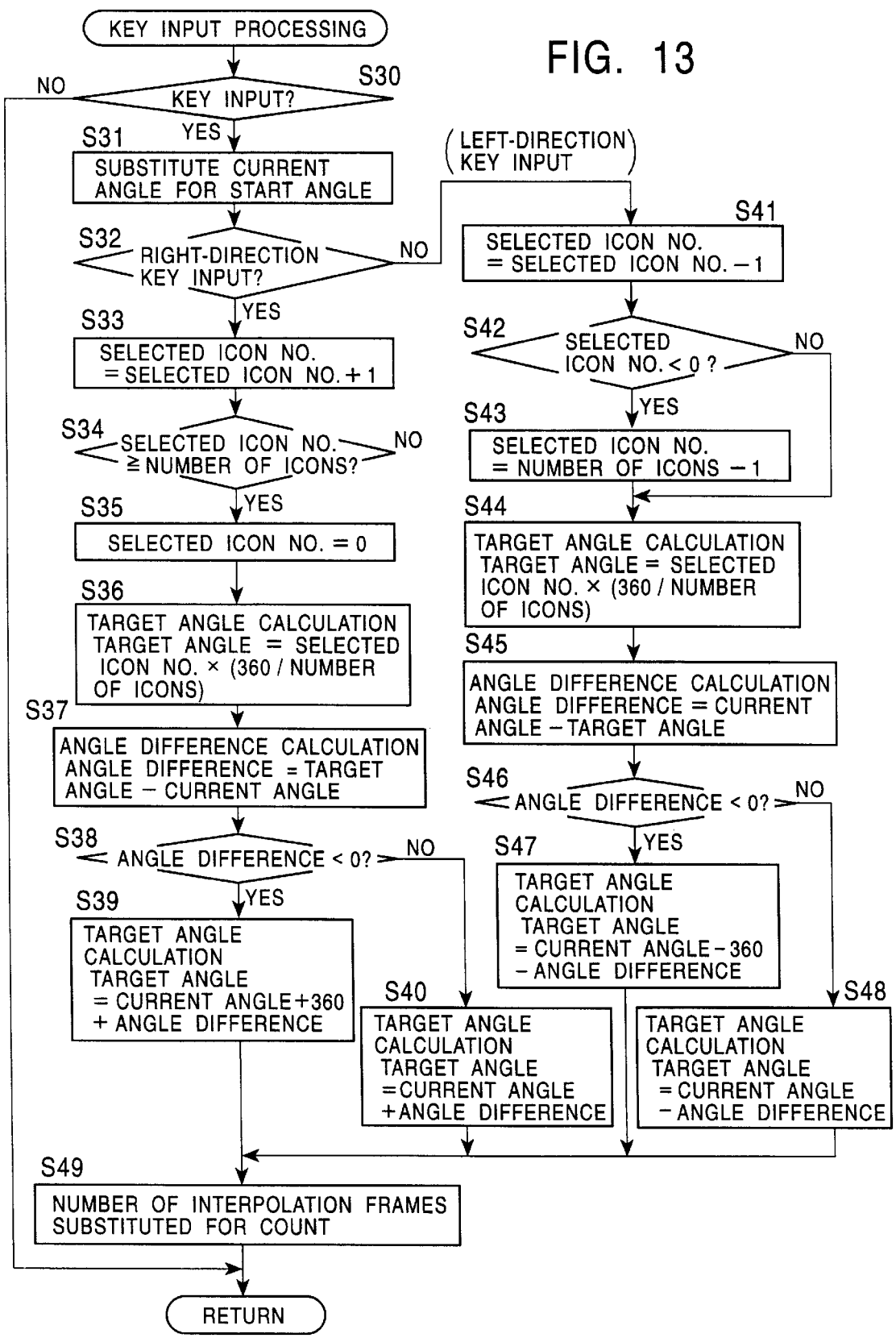
FIG. 13 is a flowchart for a key input processing routine relating to the principle description.

FIG. 13 is a flowchart illustrating the processing contents of the key input processing routine (step S10) shown in FIG. 12. As shown in FIG. 12, regarding the key input processing, a determination is initially made regarding whether there has been key input (step S30). In the event that there has been no key input, this key input processing routine ends immediately.

In the event that there has been a key input, the current angle is substituted for the starting angle (step S31). The starting angle is the current angle at the point of key input, and this is used to display later-described animation. Next, a judgment is made as to whether the input was made by the right-direction key 53$a$ (see FIG. 1) (step S32). In the event that the input was made by the right-direction key 53$a$, the selected icon No. Iselect is incremented by 1 (step S33). That is, processing for "selected icon No.=selected icon No.+1" is performed. Thus, the icon enveloped by the cursor 183 is changed to the adjacent icon.

Next, a judgement is made regarding whether the "selected icon No. Iselect≧number of icons" (step S34). That is, a judgement is made regarding whether or not the selected Icon No. exceeds the greatest icon No.

In the event that the selected icon No. Iselect is greater than or equal to number of icons, the selected icon No. Iselect is set to zero (step S35). Following completion of the processing of this step S35, or in the event that "selected icon No. Iselect≧number of icons"does not hold, the target angle is calculated (step S36). Specifically, the target angle is calculated by "selected icon No.×(360 number of icons)". Now, the target angle is a target value for the current angle wherein the changed selected icon will be enveloped by the cursor 183.

Next, the angle difference is calculated (step S37). Specifically, the angle difference is calculated by subtracting the current angle from the target angle. This angle difference is the angle by which to rotate icons 171 through 182 from the current angle in order to change the icon enveloped by the cursor 183 to the adjacent icon.

Next, a determination is made as to whether the angle difference is less than 0 (step S38). When the angle difference is less than 0, the target angle is re-calculated by "current angle+360+angle difference" (step S39). On the other hand, in the event that "angle difference<0" is false, the target angle is calculated by "target angle=current angle+angle difference" (step S40).

In step S32, in the event that a determination is made that the input was not made by the right-direction key 53$a$ (see FIG. 1), i.e., that the input was made by the left-direction key 53$c$, the selected icon No. Iselect is decremented by 1 (step S41). That is to say, processing for "selected icon No.=selected icon No.−1" is performed.

Next, a determination is made as to whether the selected icon No. Iselect is less than 0. That is, a judgement is made as to whether the selected icon No. is smaller than zero.

In the event that "selected icon No. Iselect<0" is true, the selected icon No. Iselect is determined by 1 (e.g., set to "number of icons−1") (step S43). Following completion of the processing of this step S43, or in the event that "selected icon No. Iselect<0" is false, the target angle is calculated (step S44). Specifically, the target angle is calculated by "selected icon No.×(360/number of icons)".

Next, the angle difference is calculated (step S45). Specifically, the angle difference is calculated by subtracting the target angle from the current angle. This angle difference is the angle by which to rotate icons 171 through 182 from the current angle in order to change the icon enveloped by the cursor 183 to the adjacent icon.

Next, a determination is made regarding whether the angle difference is less than 0 (step S46). In the event that this determination is affirmative (positive), the target angle is re-calculated by "current angle−360−angle difference" (step S47). On the other hand, in the event that the determination at step 546 is negative, the target angle is calculated by "target angle=current angle−angle difference" (step S48).

Following completion of the processing of the above steps S39, S40, S47, and S48, the number of interpolation frames is substituted in the variable named count (step S49). This count is a value which is decremented (one is subtracted therefrom each time) for each processing (frame), and is used for displaying the later-described animation. In the present Principle Description, the number of interpolation frames is set to 6, for example. Thus, the key input processing (step S10) shown in FIG. 12 is completed.

Figure 14:
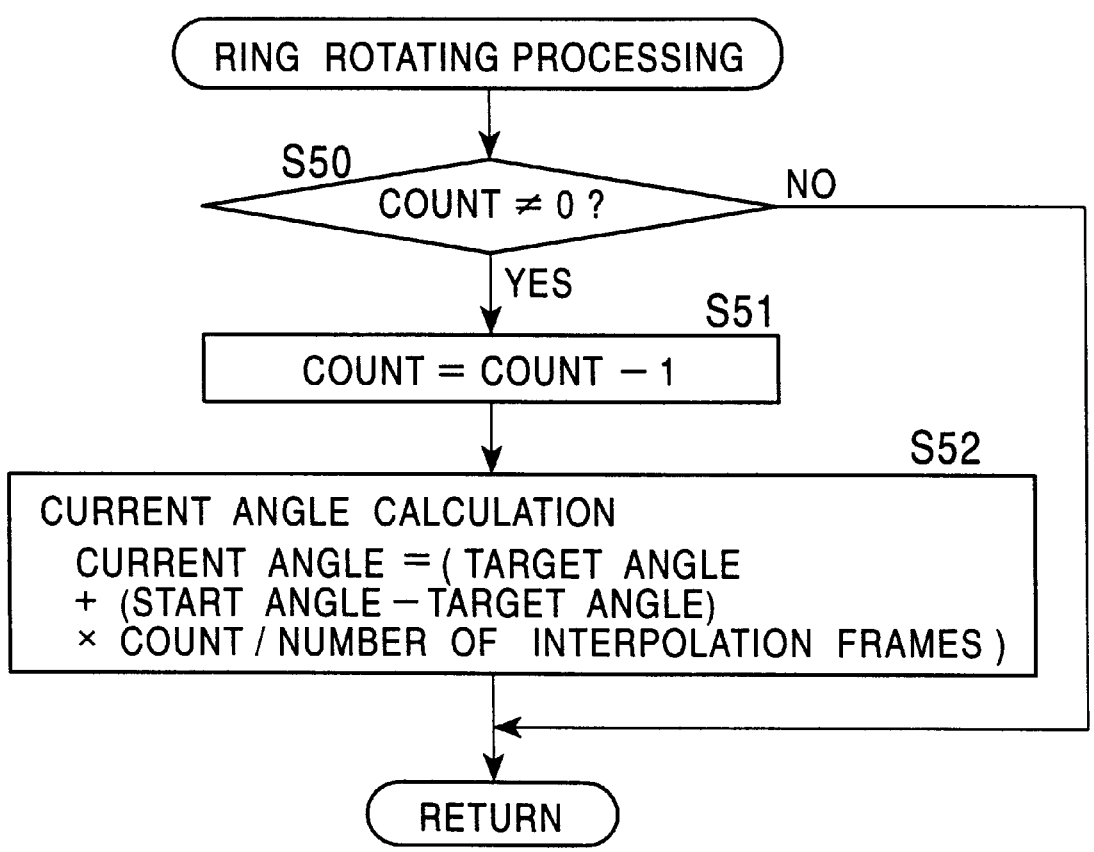
FIG. 14 is a flowchart for a ring rotating processing routine relating to the principle description.

FIG. 14 is a flowchart illustrating the processing contents of the ring rotating processing routine (step S11) in FIG. 12. As shown in FIG. 14, in the ring rotating processing, a determination is initially performed to determine whether the "count" is not equal to 0" (step S50).

Next, the current angle is calculated (step S52). That is, the current angle is calculated by (target angle+(starting angle−target angle)×count/number of interpolation frames). The above completes the ring rotating processing (step S11) shown in FIG. 12.

As shown in FIG. 12, this ring rotating processing routine (step S11) is executed each time the main processing is performed. Accordingly, in the event that the number of interpolation frames is set in the count at the key input processing routine (step S10), the processing of steps S50 through S52 shown in FIG. 14 is performed until the count is zero, even if there is no key input, and an animation, wherein the icons move along the loop-shaped orbit is drawn.

As described above, according to the icon display method relating to the present Principle Description, all icons are simultaneously displayed on the loop-shaped orbit, so ease of visual recognition of other selections is facilitated. Also, moving the icons to either the left or the right along the loop-shaped orbit allows the player to instantly determine whether the desired icon can be selected.

Or left-direction key 53c, so the ease of key operation can be facilitated, even in the event that the number of selection options of commands increases. That is to say, displaying multiple icons on a loop-shaped orbit facilitates ease of key operation on the part of the player at the time of selecting icons, as compared with the conventional arrangement shown in FIG. 65, wherein icons are displayed on a two-dimensional plane.

The present invention is carried out based on such Principles. The following is a description of an embodiment of the present invention. The first through sixth embodiments are examples of cases wherein application of the present invention has been made to home-use game apparatuses having the same configuration as the game apparatus used for the Principle Description.

First Embodiment

With the first embodiment, two loop-shaped icon orbits used in the Principle Description are set, so that a single command is input by a combination of the icons placed on each of the two loop-shaped orbits. In the following description, the two loop-shaped icon orbits will be described as the first loop-shaped orbit and the second loop-shaped orbit. While the present embodiment employs two types of loop-shaped orbits, the present invention is by no means restricted to such; rather, three or more types may be used as well.

The icons in the present embodiment are grouped into two groups. The icons in each group are placed on a separate loop-shaped orbit for that group. The icons of one group are placed on the first loop-shaped orbit, and the icons of the other group are placed on the second loop-shaped orbit. At the time of inputting commands, the player selects one icon each from the groups. Then, one command is specified by the combination of the selected icons.

Figure 15:
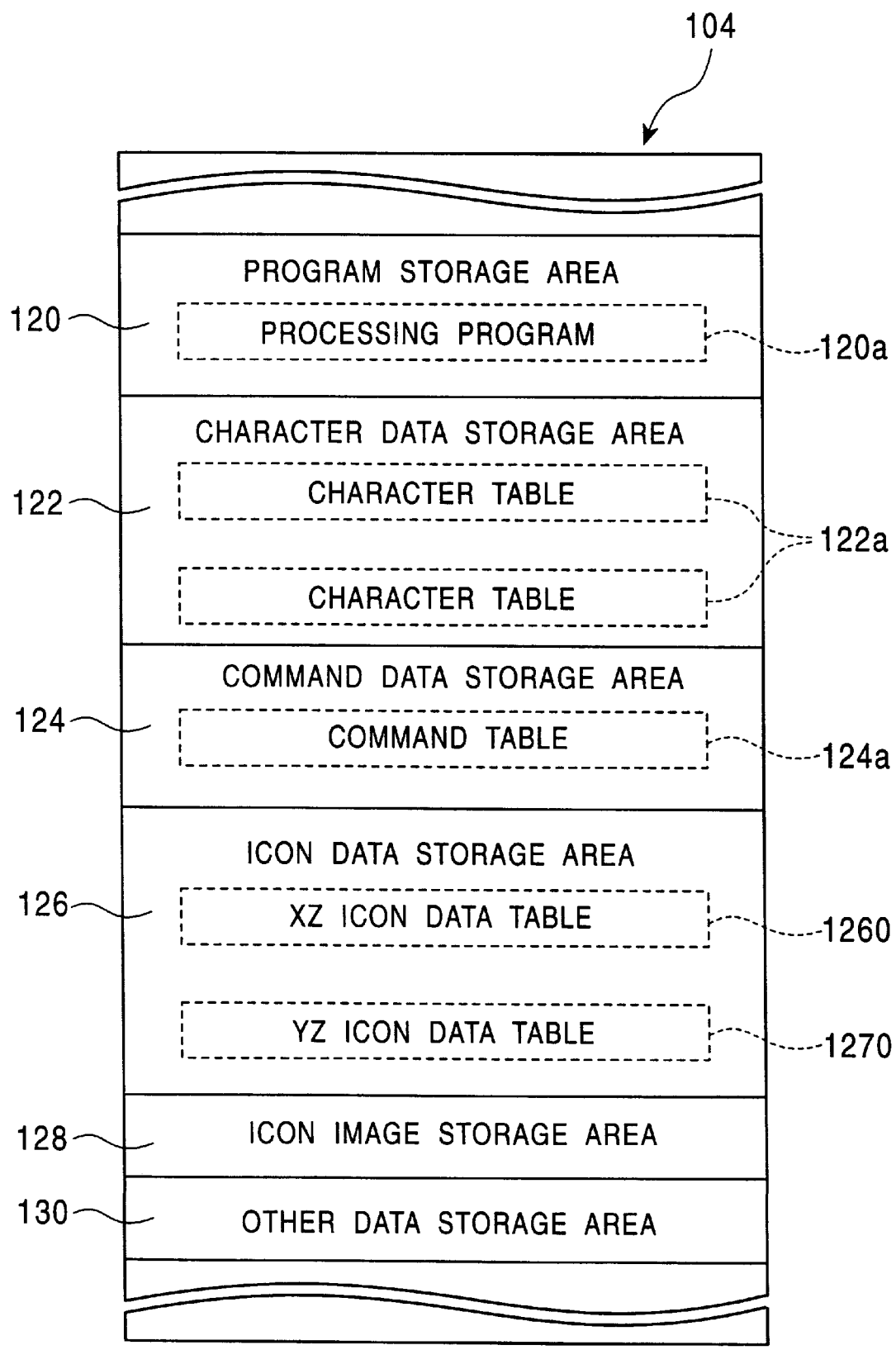
FIG. 15 is a diagram illustrating storage area divisions within the main memory according to a first embodiment of the present invention.

FIG. 15 illustrates data being read from the CD-ROM 54 and memory card 55 by the CPU 101 for the game and stored in the main memory 104. The data in FIG. 15 is sequentially read out of the CD-ROM 54 according to the state of progression of processing following the program under the control of the CPU 101, and thus transferred to the main memory 104. In this case, formed in the main memory 104 are the following: a program storing area 120, character data storing area 122, command data storing area 124, icon data storing area 126, icon image storing area 128, and the other data area 130. Note that detailed description of transfer of the various types of data read from the CD-ROM 54 to the main memory 104, decoding, and driving of the CD-ROM drive will be omitted.

As shown in FIG. 15, a processing program 120a is stored in the program storing area 120 for executing processing corresponding to input commands. Character tables 122a for each character appearing in the game are stored in the character data storing area 122 within the main memory 104. FIG. 16 is a drawing illustrating an example of a character table 122a stored in the character data storing area shown in FIG. 15. In the present embodiment, the character table 122a stores character Nos. 122b for specifying characters, character names 122c, and coordinates (x, y, z) 122d for holding the coordinates of the characters within the virtual space, and so forth.

Figure 17:
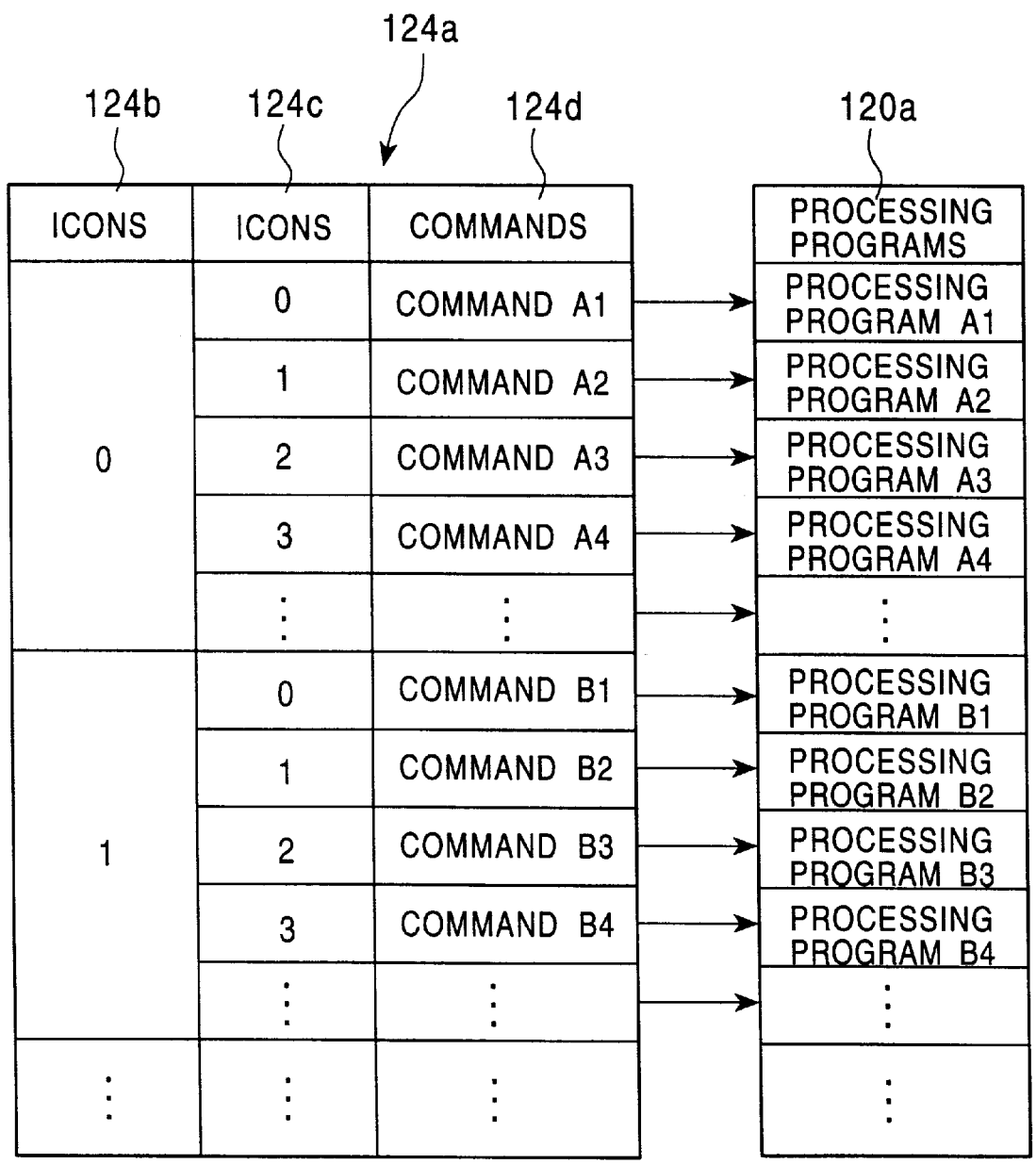
FIG. 17 is a diagram illustrating a command table in the command data storing area according to the first embodiment.

Also, as shown in FIG. 15, the command data storing area 124 within the main memory 104 stores a pre-set command table 124a. FIG. 17 illustrates the correlation relationship between the command table 124a stored in the command data storing area 124 shown in FIG. 15 and the processing program 120a for each command.

The command table 124a is made up of three columns 124b, 124c, and 124d. The icon Nos. of the icons to be placed on the first loop-shaped orbit are stored in column 124b. The icon Nos. of the icons to be placed on the second loop-shaped orbit are stored in column 124c, in a manner individually correlated with the icon Nos. in column 124b. Column 124d stores commands correlated with combinations of column 124b and column 124c.

For example, in correlation with an icon No. "#0" in column 124b, column 124c stores the icon Nos. of all icons to be placed on the second loop-shaped orbit, "#0, #1, #2, #3, . . . ". Then, is correlation with the combination of the icon No. "#0" in column 124b and the icon Nos. "#0, #1, #2, #3, ℿℿℿ" in column 124c, column 124d stores commands "COMMAND A1, COMMAND A2, COMMAND A3, COMMAND A4, . . . ".

Also, the programs storing area 120 of the main memory 104 stores processing programs 120a corresponding to each command registered in the command table 124a. Once a command registered in the command table 124a is input, the processing program 120a corresponding to the input command is executed.

As shown in FIG. 15, the icon data storing area 126 stores both the X-Z icon data table 1260, which stores icon data of the icons to be placed on the first loop-shaped orbit, and the Y-Z icon data table 1270, which stores icon data of the icons to be placed on the second loop-shaped orbit. Note that in the following description, the prefix "X-Z" comprises data corresponding to the first loop-shaped orbit and the icons on this loop-shaped orbit, and the prefix "Y-Z" comprises data corresponding to the second loop-shaped orbit and the icons on this loop-shaped orbit.

FIG. 18 is a diagram illustrating an example of the X-Z icon data table 1260 stored in the icon data storing area 126 shown in FIG. 15. In the present embodiment, the X-Z icon data table 1260 is used for setting the X-Z icon number 1261, which is the number of icons to be displayed on the first loop-shaped orbit, names 1262 appropriated to each icon with the X-Z icon Nos., the X-Z radius 1263 which is used to set the orbit and is the radius of the circle traced by the first loop-shaped orbit, X-Z selection icon Nos. 1264 for specifying the icons selected by the player and positioning the icons on the cursor position on the orbit, the X-Z current angle 1265 for controlling the placement positions of icons, which will be described later, and likewise X-Z target angle 1266, X-Z angle difference 1267, X-Z count 1268, and X-Z selected character No. 1269, and so forth.

Figure 19:
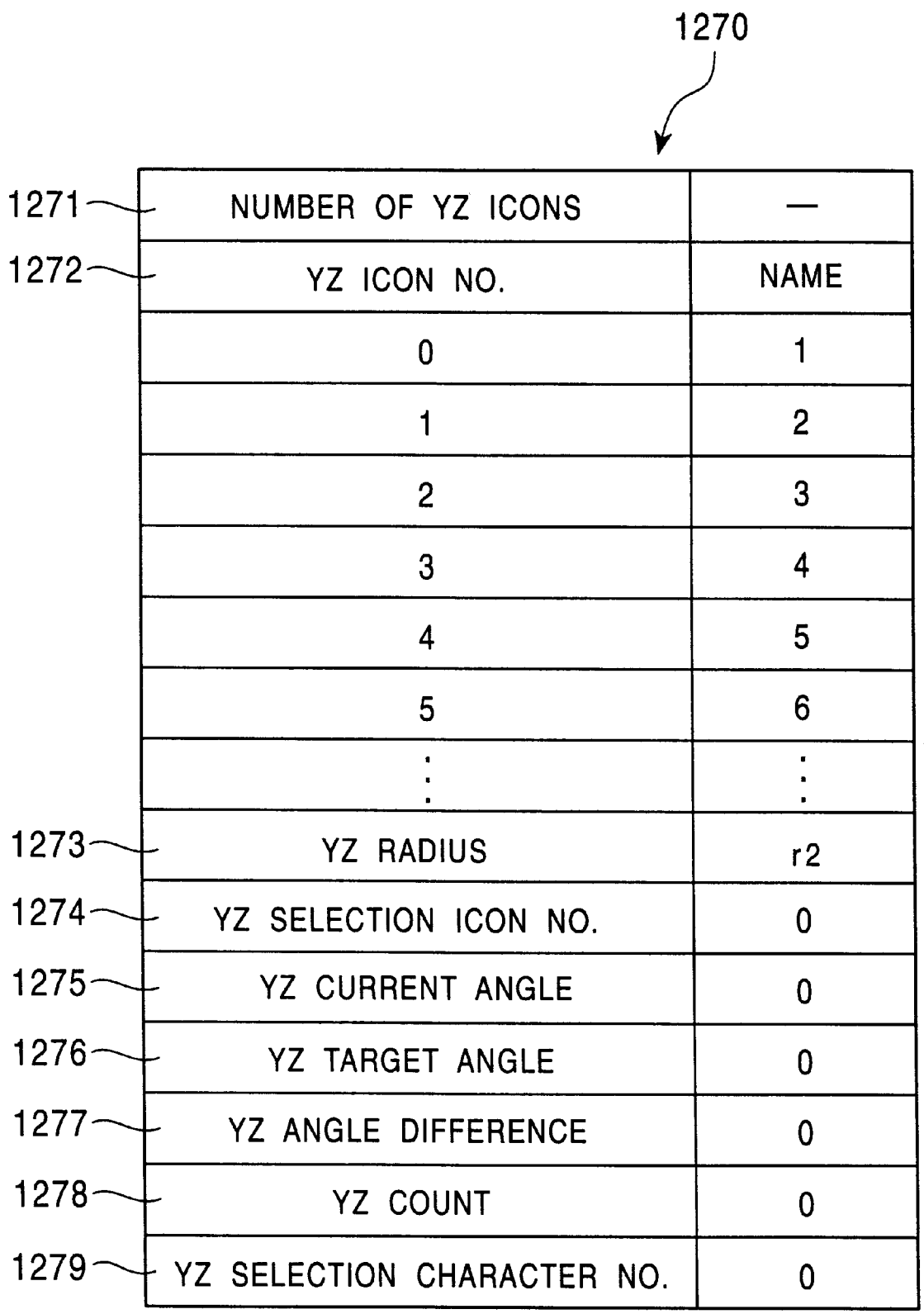
FIG. 19 is a diagram illustrating a Y-Z icon data table in the icon data area according to the first embodiment.

FIG. 19 is a diagram illustrating an example of the Y-Z icon data table 1270 stored in the icon data storing area 126 shown in FIG. 15. In the present embodiment, the Y-Z icon data table 1270 is used for setting the Y-Z icon number 1271 which is the number of icons to be displayed on the second loop-shaped orbit, names 1272 appropriated to each icon with the Y-Z icon Nos., the Y-Z radius 1273 which is used to set the orbit and is the radius of the circle traced by the second loop-shaped orbit, Y-Z selection icon Nos. 1274 for specifying the icons selected by the player and positioning the icons on the cursor position on the orbit, the Y-Z current angle 1275 for controlling the placement positions of icons, which will be described later, and likewise Y-Z target angle 1276, Y-Z angle difference 1277, Y-Z count 1278, and Y-Z selected character No. 1279, and so forth.

As shown in FIG. 15, the icon image storing area 128 within the main memory 104 stores icon images corresponding to each of the Nos. 1264 (see FIG. 18) appropriated to the X-Z selection icon Nos. in the icon data tables 1260 and 1270 (see FIG. 18) and the Y-Z selection icon Nos. 1274 (see FIG. 19).

Figure 20:
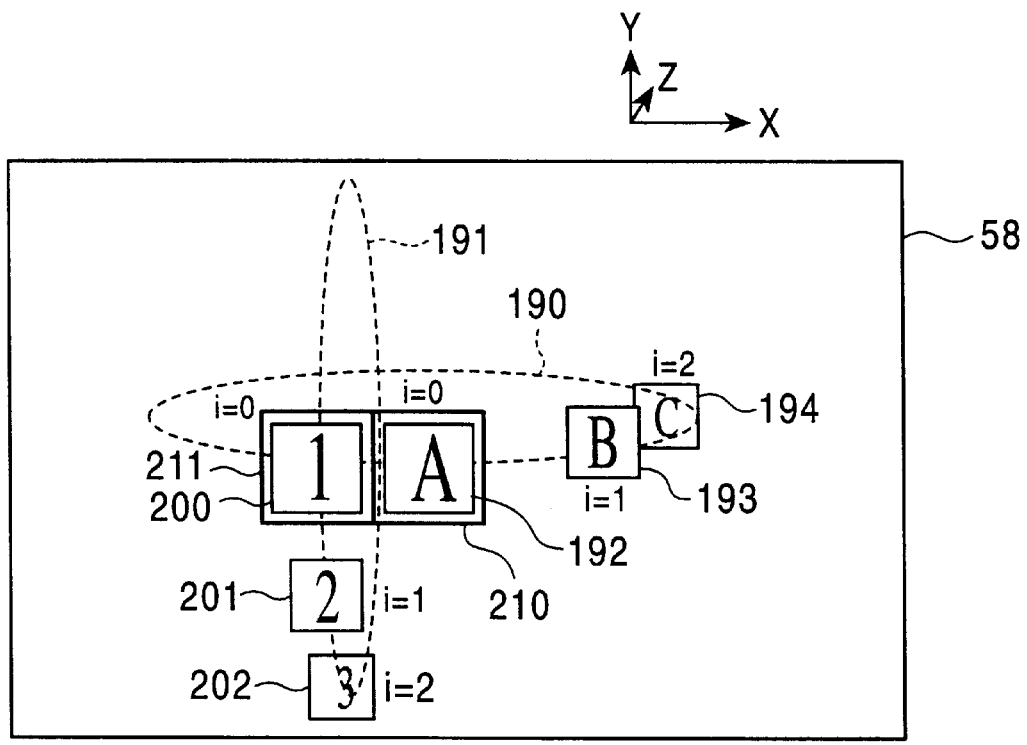
FIG. 20 is a diagram illustrating an example display screen of multiple icons using the method according to the first embodiment.

Next, the icon display method according to the present embodiment will be described. FIG. 20 is a diagram illustrating the state of icons being placed in a virtual space and displayed on a display screen 58 by the method according to the first embodiment of the present invention. In FIG. 20, the direction from the left to the right is the direction of the positive X-axis, the direction from the bottom to the top is the direction of the positive Y-axis, and the direction from the near side to the far side is the direction of the positive Z-axis. This arrangement of coordinates axes is the same in the following FIGS. 22, 24, 26, and 28.

With the present embodiment, multiple icons are each placed on the first loop-shaped orbit and the second loop-shaped orbit at equal spacing. Now, an example is described in which the first loop-shaped orbit and the second loop-shaped orbit trace circles, but there is no particular restriction on the shape traced. This may be an ellipse, or a spline-shape. Also, an arrangement may exist in which at least a portion of the first loop-shaped orbit and the second loop-shaped orbit intersect is given as an example, but there is no particular restriction regarding how this intersecting occurs.

In FIG. 20 there are provided a first loop-shaped orbit (first orbit) 190 and a second loop-shaped orbit (second orbit) 191. On the first loop-shaped orbit 190 are placed multiple icons 192, 193, 194, and so on, at equal spacing.

Also, a first cursor 210 is also provided thereto. Also, the icons are placed in a virtual space, so the display is such that icons positioned farther away from the point of view are display smaller on the screen. With the example shown in FIG. 20, icons 193 and 194 are displayed smaller than icon 192.

In the same way, on the second loop-shaped orbit 191 are placed multiple icons 200, 201, 202, and so on, at equal spacing. Also, a second cursor 211 is also provided thereto.

The symbols of the icons represent the commands appropriated thereto. For example, with icons 192 through 194, icon 192 is a symbol representing "A", and a command "A" is appropriated thereto. Icon 193 is a symbol representing "B", and a command "B" is appropriated thereto. Icon 194 is a symbol representing "C", and a command "C" is appropriated thereto. Icon images for the icons is read out from the icon image storing area 128, based on the X-Z icon data table 1260 stored in the icon data storing area 126 shown in FIG. 15.

On the other hand, for example, with icons 200 through 202, icon 200 is a symbol representing "1", and a command "1" is appropriated thereto. Icon 201 is a symbol representing "2", and a command "2" is appropriated thereto. Icon 202 is a symbol representing "3", and a command "3" is appropriated thereto. Icon images for the icons is read out from the icon image storing area 128, based on the Y-Z icon data table 1270 stored in the icon data storing area 126 shown in FIG. 15.

Accordingly, the icons in the present embodiment are separately placed on the first loop-shaped orbit 190 and the second loop-shaped orbit 191 by their respective group.

Figure 21:
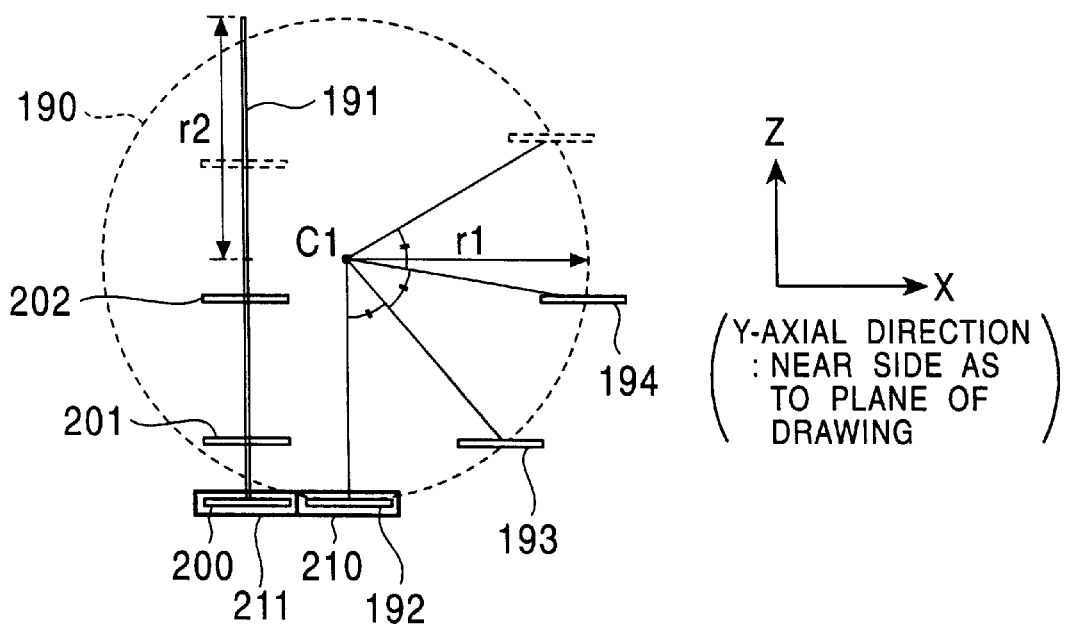
FIG. 21 is a diagram showing the icons in FIG. 20 directly from above, with respect to the X-Z plane.

FIG. 21 is a diagram for describing the icon placement position of the icons shown in FIG. 20 within the virtual space, and is a plan view on the X-Z plane. In FIG. 21, the direction from the left to the right is the direction of the positive X-axis, the direction from the far side to the near side is the direction of the positive Y-axis, and the direction from the bottom to the top is the direction of the positive Z-axis. This arrangement of coordinates axes is the same in the following FIGS. 23, 25, 27, and 29.

In FIG. 21, each of the icons are positioned such that the center angles between icons 192, 193, 194, . . . at the center point C1 of the first loop-shaped orbit 190 are each equal on the X-Z plane. The center angle of the icons 192, 193, 194, . . . can be represented by 360 degrees divided by the number of icons. In FIG. 21, the combination of the icon 192 enveloped by the cursor 210 and the icon 200 enveloped by the cursor 211 is selected.

As with the X-Z plane, icons 200, 201, 202, . . . are positioned on the Y-Z plane such that the center angles therebetween at the center point C2 of the second loop-shaped orbit 191 (not shown) are each equal, but a detailed description thereof will be omitted here.

Figure 22:
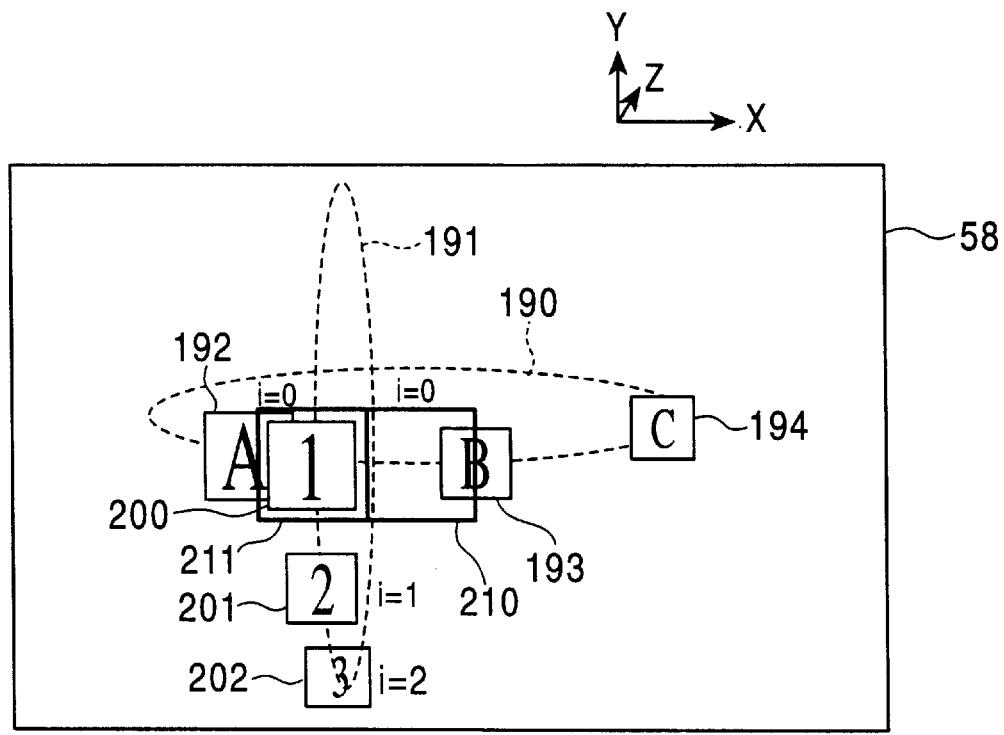
FIG. 22 is a diagram illustrating a display screen example for the interpolation of frames in the case that a right direction key is pressed by the player when in the state shown in FIG. 20.
Figure 23:
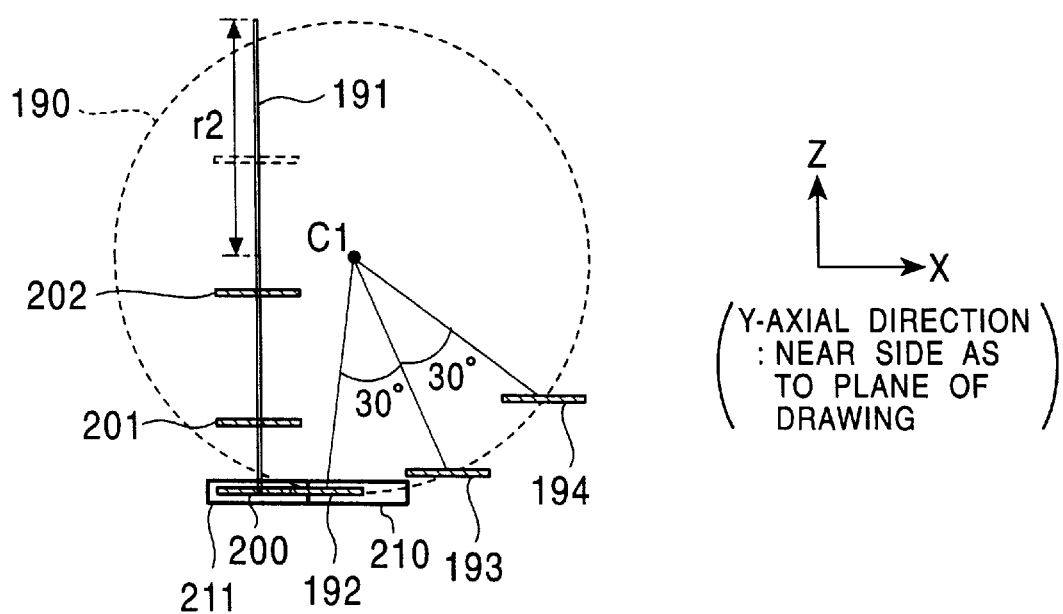
FIG. 23 is a diagram showing the state of the icons in FIG. 22 directly from above, with respect to the X-Z plane.

Next, the movement of icons in the event that the player presses the left-direction key 53c (see FIG. 1) in the state shown in FIG. 20 will be described. FIG. 22 is a diagram illustrating the state wherein the left-direction key 53c has been pressed in the state shown in FIG. 20 and the icon movement has been displayed on the display screen 58. In this case, as described in the Principle Description, multiple interpolation frames representing movement of the icons are displayed. Also, FIG. 23 is a plan view on the X-Z plane illustrating the icon placement state shown in FIG. 22. Thus, icons move in the clockwise direction along the first loop-shaped orbit 190.

Figure 24:
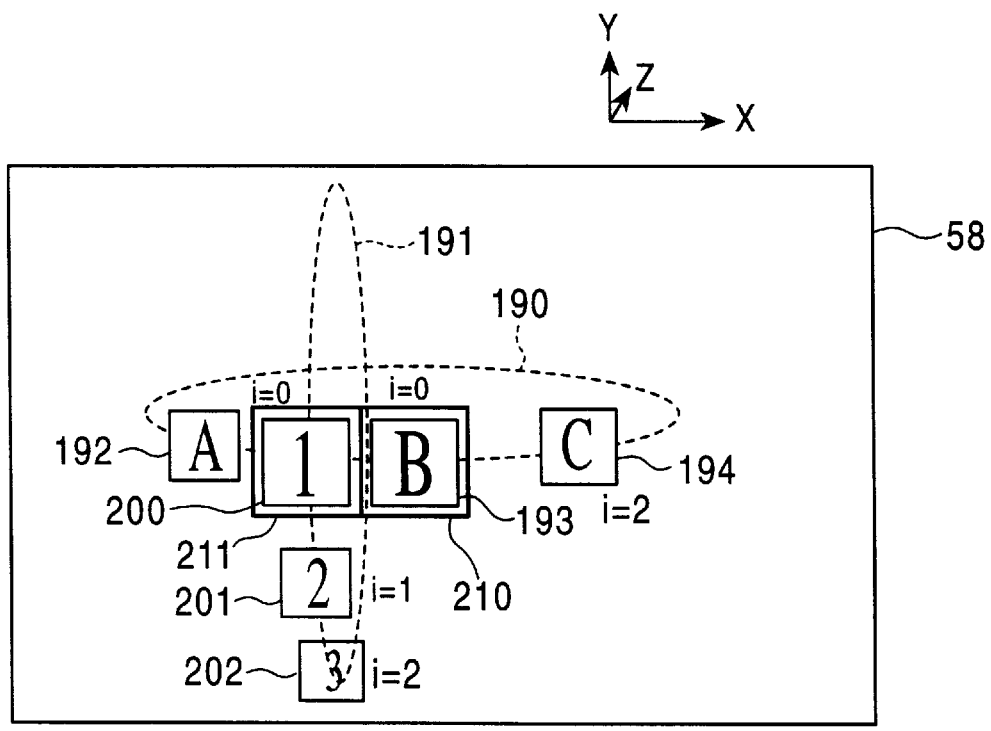
FIG. 24 is a diagram illustrating a display screen example in the case that the icons on the first loop-shaped orbit move from the state shown in FIG. 20.
Figure 25:
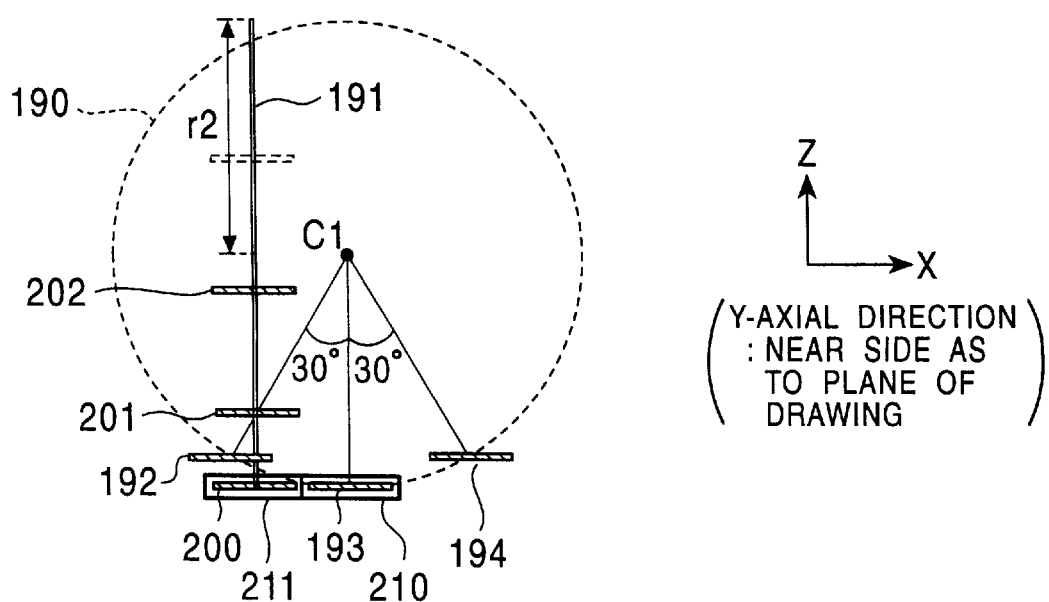
FIG. 25 is a diagram showing the state of the icons in FIG. 24 directly from above, with respect to the X-Z plane.

FIG. 24 illustrates the display screen 58 in the state that the icons 192, 193, 194, . . . , have moved in the clockwise direction (the clockwise direction as viewed from the direction shown in FIG. 21) from the state shown in FIG. 20 along the first loop-shaped orbit 190 by a distance of one icon (360°/number of icons). Icon 193, carrying the symbol "B", is displayed within the cursor 210 positioned at a certain position on the first loop-shaped orbit 190. FIG. 25 is a plan view on the X-Z plane illustrating the icon placement state in the state shown in FIG. 24. In this case, the combination of icons has changed to the combination of icon 193 enveloped by the cursor 210 and the icon 200 enveloped by the cursor 211. Incidentally, in the event that the player presses the right-direction key 53a (see FIG. 1), icons 192, 193, 194, . . . , conversely move in the counter-clockwise direction (the counter-clockwise direction as viewed from the direction shown in FIG. 21) along the first loop-shaped orbit 190 by a distance of one icon.

Figure 26:
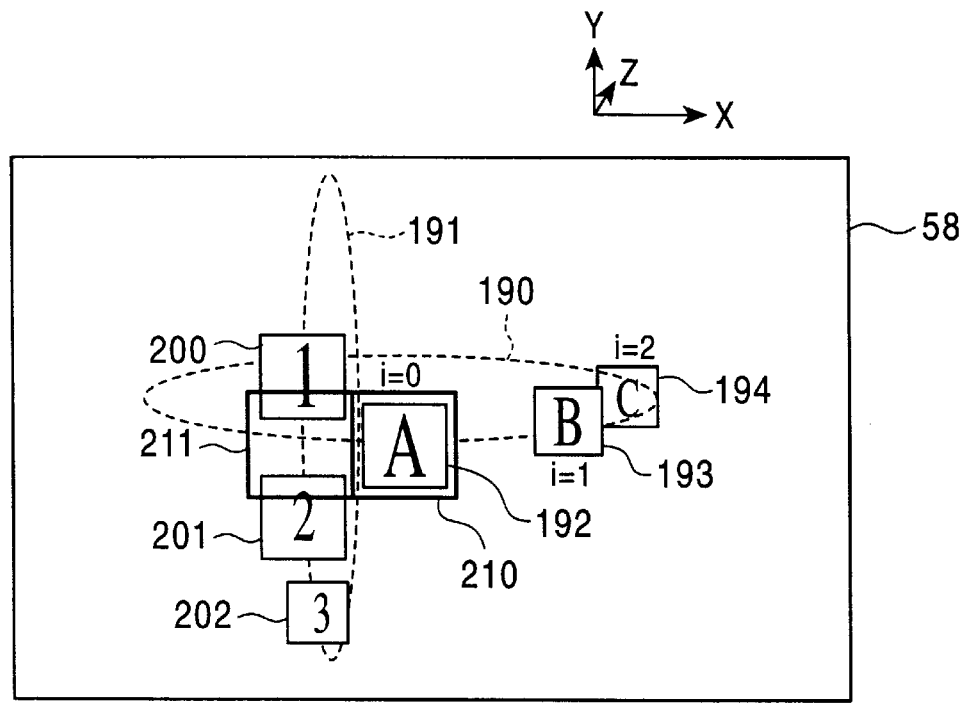
FIG. 26 is a diagram illustrating a display screen example for the interpolation of frames in the case that an up direction key is pressed by the player when in the state shown in FIG. 20.
Figure 27:
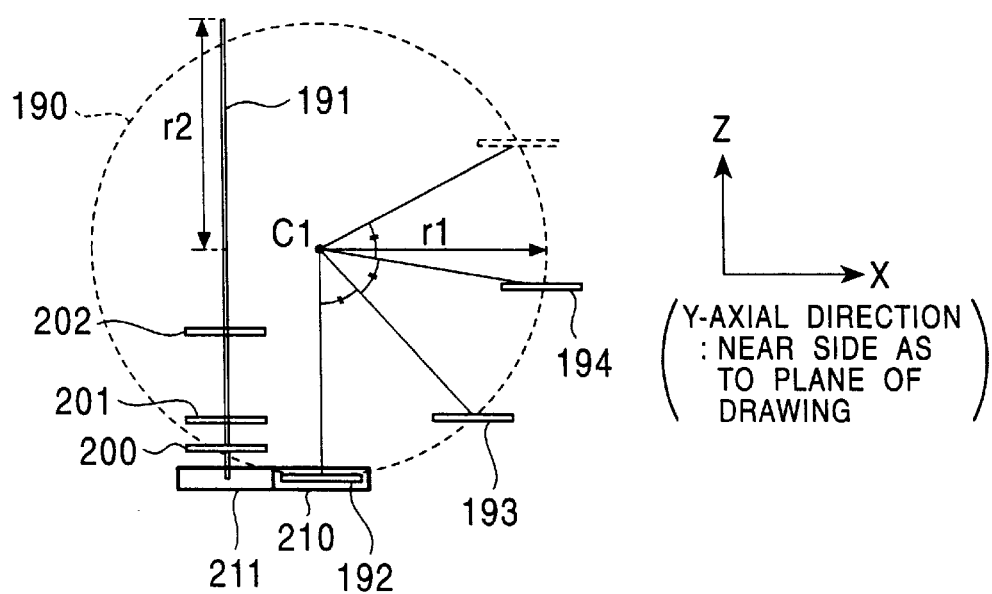
FIG. 27 is a diagram showing the state of the icons in FIG. 26 directly from above, with respect to the X-Z plane.

FIG. 26 is a diagram illustrating the state wherein the up-direction key 53d has been pressed in the state shown in FIG. 20 and the icon movement has been displayed on the display screen 58. In this case, as described in the Principle Description, multiple interpolation frames representing movement of the icons are displayed. FIG. 27 is a plan view on the X-Z plane illustrating the icon placement state shown in FIG. 26. In this case, there is no movement of icons placed on the first loop-shaped orbit 190, and icons move in the along the second loop-shaped orbit 191 in the direction orthogonal with the first loop-shaped orbit 190.

Figure 28:
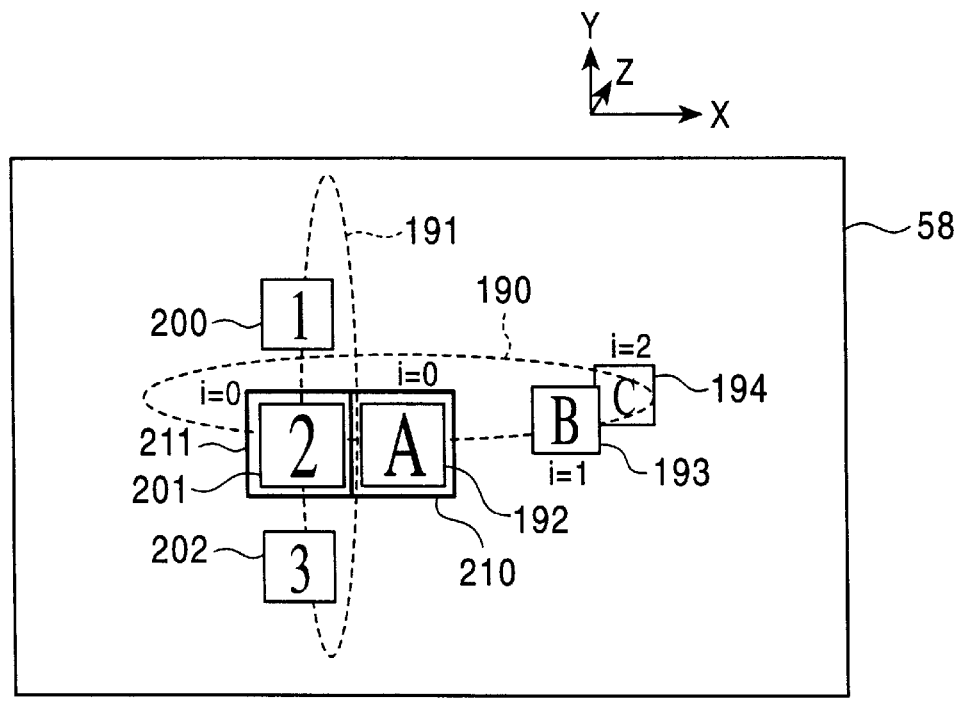
FIG. 28 is a diagram illustrating a display screen example in the case that the icons on the second loop-shaped orbit move from the state shown in FIG. 20.
Figure 29:
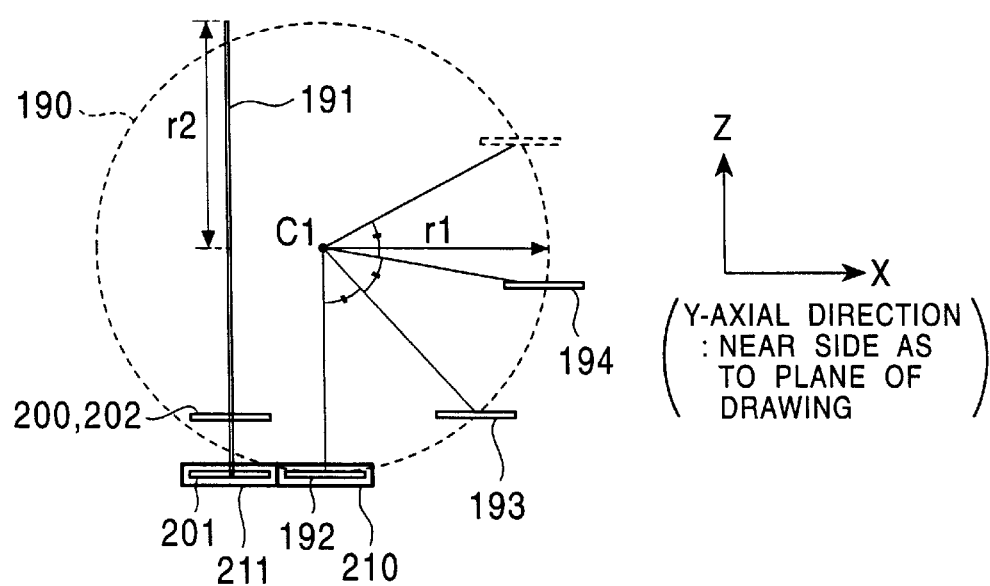
FIG. 29 is a diagram showing the state of the icons in FIG. 28 directly from above, with respect to the X-Z plane.

FIG. 28 illustrates the display screen 58 in the state that the icons 200, 201, 202, . . . , have moved in the upwards direction from the state shown in FIG. 20 along the second loop-shaped orbit 191 by a distance of one icon (360°/number of icons). In FIG. 28, the icon 201 carrying the symbol "2" is displayed within the cursor 211. FIG. 29 is a plan view on the X-Z plane illustrating the icon placement state in the state shown in FIG. 25. Changing from the state shown in FIG. 20 to the state shown in FIG. 29 changes the combination of icons. In the state shown in FIG. 29, the combination of icons represent icon 192 enveloped by cursor 210 and icon 201 enveloped by cursor 211. In the event that the player presses the down-direction key 53b (see FIG. 1), icons 200, 201, 202, . . . , move in the downward direction along the second loop-shaped orbit by a distance of one icon.

Repeating the operation of the direction key 53A (see FIG. 1) allows the icons that the player wishes to select to be brought within the first cursor 210 and the second cursor 211. For example, in the event that the player selects icon 192 having symbol "A" and icon 200 having symbol "1", the confirmation key 53e (see FIG. 1) is pressed in the state shown in FIG. 20. Thus, the player can input a command corresponding to the combination of the two. One command can be input by a combination of icons, so even in the event that there is a great number of commands, the number of icons necessary for inputting commands can be kept to a minimal number.

Figure 30:
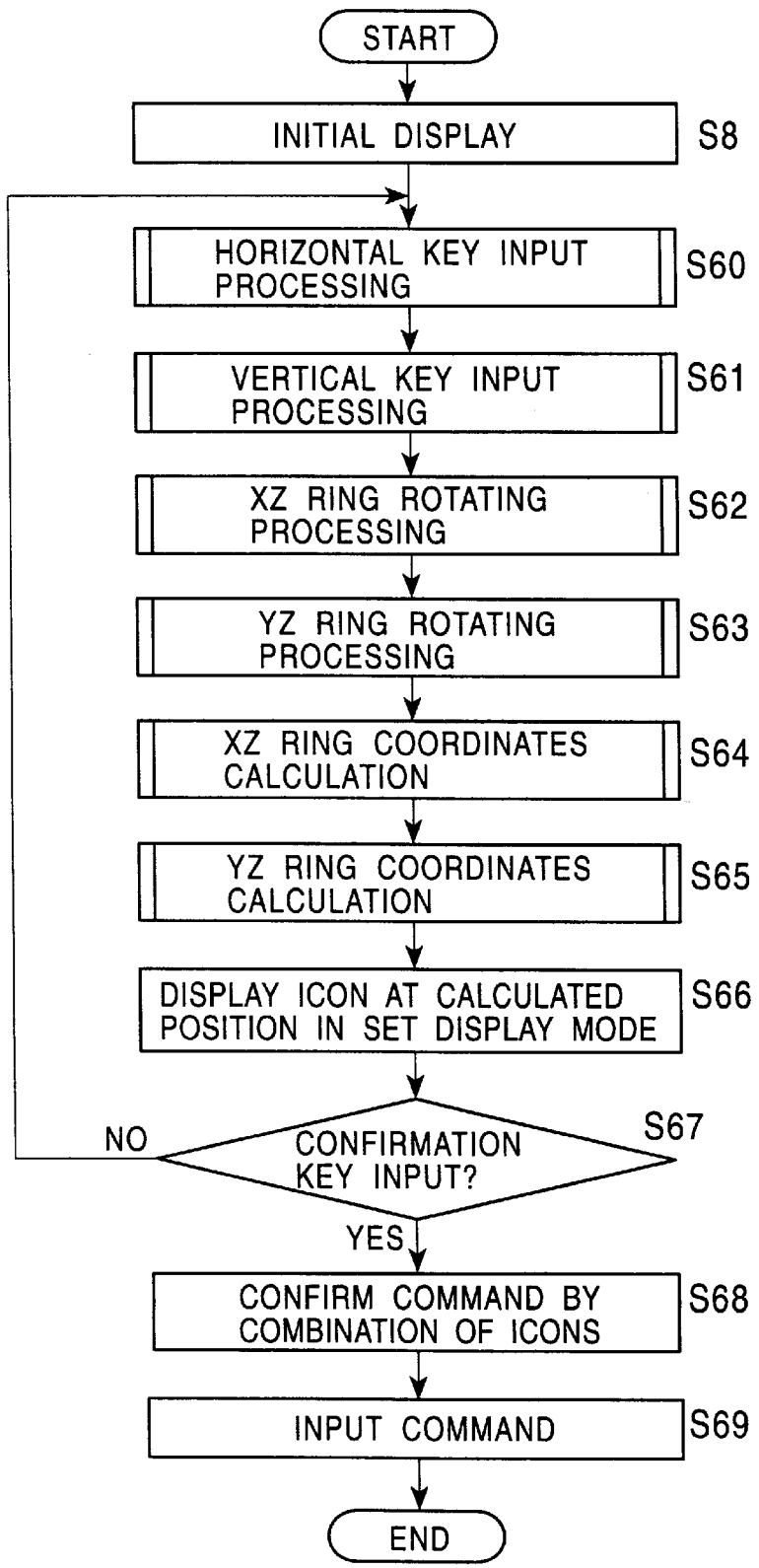
FIG. 30 is a flowchart for making an icon display according to the first embodiment.

FIG. 30 is a diagram illustrating the main flow chart of icon display process according to the first embodiment.

As shown in FIG. 30, once the process begins, the first loop-shaped orbit 190 and second loop-shaped orbit 191 are set (step S8), based on the data in the X-Z icon data table 1260 and Y-Z icon data table 1270 of the icon data storing area 126. Specifically, the position of the first loop-shaped orbit 190 and second loop-shaped orbit 191 in the virtual space and the radii traced thereby, etc., are set.

Next, left/right key input process is performed (step S60). This left/right key input processing is executed in the event that the right-direction key 53a or the left-direction key 53c of the controller 53 is pressed; a detailed description thereof will be provided below.

Up/down key input process is performed (step S61). The up/down key input processing is executed in the event that the down-direction key 53b or the up-direction key 53d of the controller 53 is pressed; a detailed description thereof will be provided below.

An X-Z ring rotating process is then performed (step S62). The X-Z ring rotating process is performed to display animation at the time of changing the position of icons on the first loop-shaped orbit 190 shown in FIG. 20; a detailed description thereof will be provided below.

A Y-Z ring rotating process is performed (step S63). The Y-Z ring rotating process is performed to display animation at the time of changing the position of icons on the second loop-shaped orbit 191 shown in FIG. 20, a detailed description thereof will be provided below.

An X-Z ring coordinates calculation process is then executed at (step S64). This process is performed to calculate the coordinates of the icons on the first loop-shaped orbit 190 shown in FIG. 20. A detailed description thereof will be given later.

A Y-Z ring coordinates calculation process is executed at step S65. This process is performed to calculate the coordinates of the icons on the second loop-shaped orbit 191 shown in FIG. 20. A detailed description thereof will be given later. Subsequently, the icons are displayed in the set display mode at the coordinates thus calculated (step S66). That is to say, as shown in FIG. 20, a display is made in the positional relation wherein at least a portion of the first loop-shaped orbit 190 and second loop-shaped orbit 191 intersect in an orthogonal manner.

In the event that an input has been made by the player with the confirmation key 53e (step S67), the combination of icons enveloped by the first cursor 210 and the second cursor 211 is determined, and reference is made to the command table 124a, thereby determining the command (step S68). Then, the specified command is input (Step S69), and the corresponding processing program is executed. In the event that an input is not made by the player with the confirmation key 53e, the processing in step 58 and S60 through S66 is repeatedly executed, and animation for changing the position of the icons is displayed.

Figure 31:
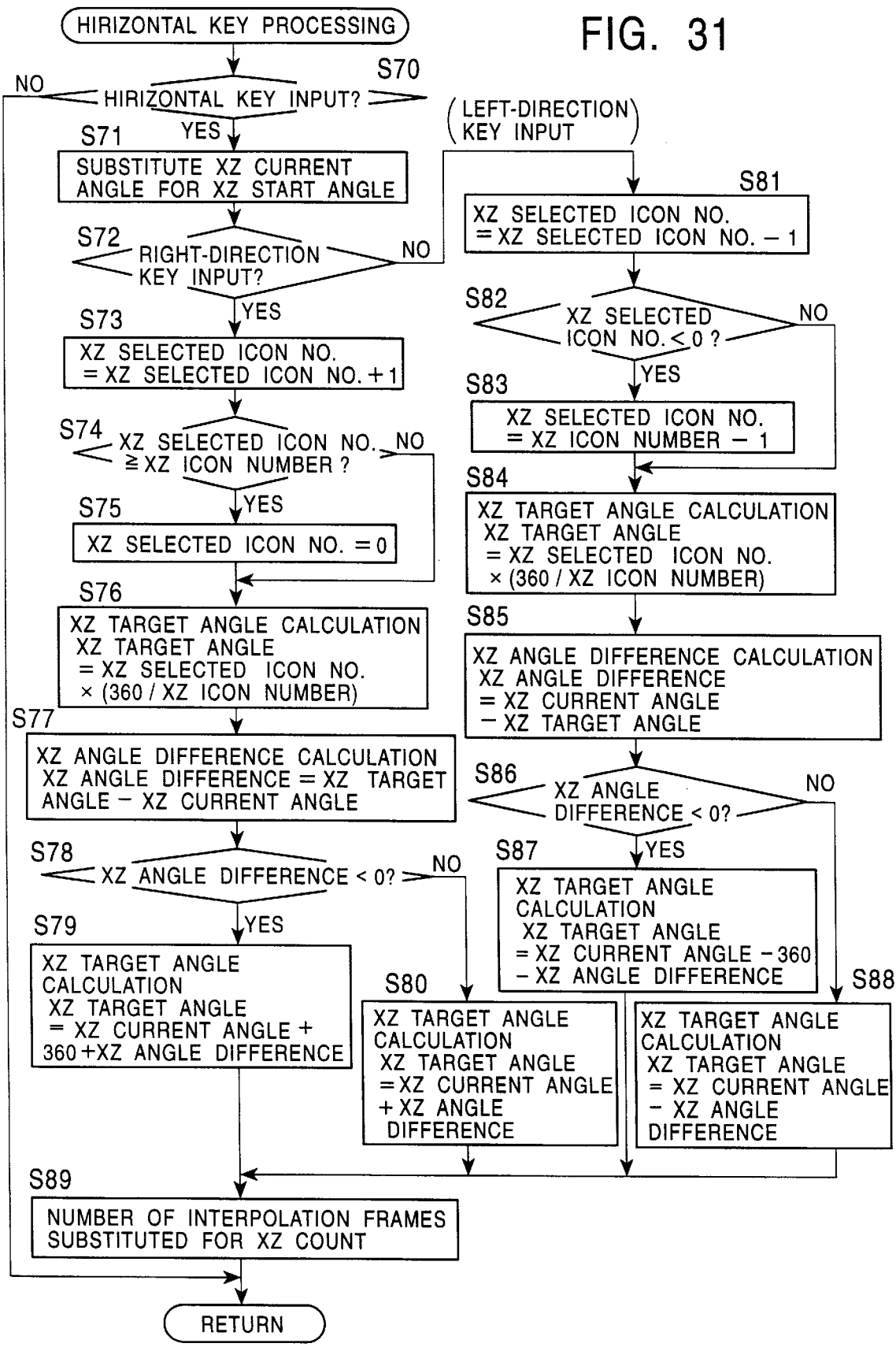
FIG. 31 is a flowchart for a left/right key input processing according to the first embodiment.

FIG. 31 is a flowchart illustrating the Horizontal Key Input Process routine for processing contents of left/right key input processing (step S60) in FIG. 30. As shown in this FIG. 31, in the left/right key input processing, a determination is first made as to whether there has been input of the left/right key (step S70). In the event that there has been no input of the left/right key, the left/right key input processing thus ends.

In the event that there has been input of the left/right key, the X-Z current angle is substituted for the X-Z start angle (step S71). Next, a determination is made regarding whether or not there has been input of the right-direction key 53a (step S72). In the event that there has been input of the right-direction key 53a, the X-Z selection icon No. Iselect is incremented by 1 (step S73). That is, processing for "X-Z selection icon No.=X-Z selection icon No.+1" is performed.

Next, a determination is made as to whether "X-Z selection icon No. Iselect≧X-Z number of icons" (step S74). That is, a judgement is made as to whether the selected icon No. has exceeded the greatest icon No.

In the event that "X-Z selection icon No. Iselect≧X-Z number of icons" is positive (true), X-Z selection icon No. Iselect is set to zero (step S75). After completion of the processing in step S75, or in the event that "X-Z selection icon No. Iselect≧X-Z number of icons" is negative (false), the X-Z target angle is calculated (step S76). Specifically, the X-Z target angle is calculated by "X-Z selection icon No. (360/number of X-Z icons)".

The X-Z angle difference is calculated at step S77. Specifically, the X-Z angle difference is calculated by "X-Z target angle–X-Z current angle". The X-Z angle difference is the angle by which icons 192, 193, 194, . . . , should be moved from the current angle along the first loop-shaped orbit 190 in order to change the icon enveloped by the first cursor 210 into the adjacent icon.

A determination is then made regarding whether "X-Z angle difference<0" (step S78). In the event that "X-Z angle difference<0" is affirmative, the X-Z target angle is re-calculated by "X-Z current angle+360+X-Z angle difference" (step S79). On the other hand, in the event that "X-Z angle difference<0" is negative, the X-Z target angle is re-calculated by "X-Z target angle=X-Z current angle+X-Z angle difference" (step S80).

In the event that there has been no input of the right-direction key 53a (see FIG. 1) in step S72, i.e., in the event that there has been input of the left-direction key 53c, the X-Z selection icon No. Iselect is decremented (decreased) by 1 (step S81). That is, processing for "X-Z selection icon No.=X-Z selection icon No.–1" is performed.

A judgement is then made regarding whether "X-Z selection icon No. Iselect<0" (step S82). That is, a judgement is made regarding whether the selected icon No. has become smaller than zero.

In the event that "X-Z selection icon No. Iselect<0" is affirmative, X-Z selection icon No. Iselect is set such that the number of icons is–1 (step S83). Following the processing in step S83, or in the event that "X-Z selection icon No. Iselect<0" is negative, the X-Z target angle is calculated (step S84). Specifically, the X-Z target angle is calculated by "X-Z selection icon No.×(360/number of icons)".

Next, the X-Z angle difference is calculated (step S85). Specifically, the X-Z angle difference is calculated by "X-Z current angle–X-Z target angle". This X-Z angle difference is the angle by which icons 192, 193, 194, . . . should be moved along the first loop-shaped orbit 190 from the X-Z current angle in order to change the icon enveloped by the first cursor 210 into the adjacent icon.

Next, a judgement is made as to whether "X-Z angle difference<0" (step S86). In the event that the determination is affirmative, the X-Z target angle is re-calculated by "X-Z current angle–360–X-Z angle difference" (step S87). On the other hand, if the determination is negative, the X-Z target angle is calculated by "X-Z target angle=X-Z current angle–X-Z angle difference" (step S88).

Following completion of the processing in step S79, S80, S87, and S88, the number of interpolation frames is substituted into the X-Z count, which is a variable (step S89). Incidentally, the X-Z count is a value that is decremented each time processing is performed (i.e., each frame), and is used for performing animation. In the present embodiment, the number of interpolation frames is set at 6, as an example. The above completes the left/right key input processing shown in FIG. 30 (step S60).

Figure 32:
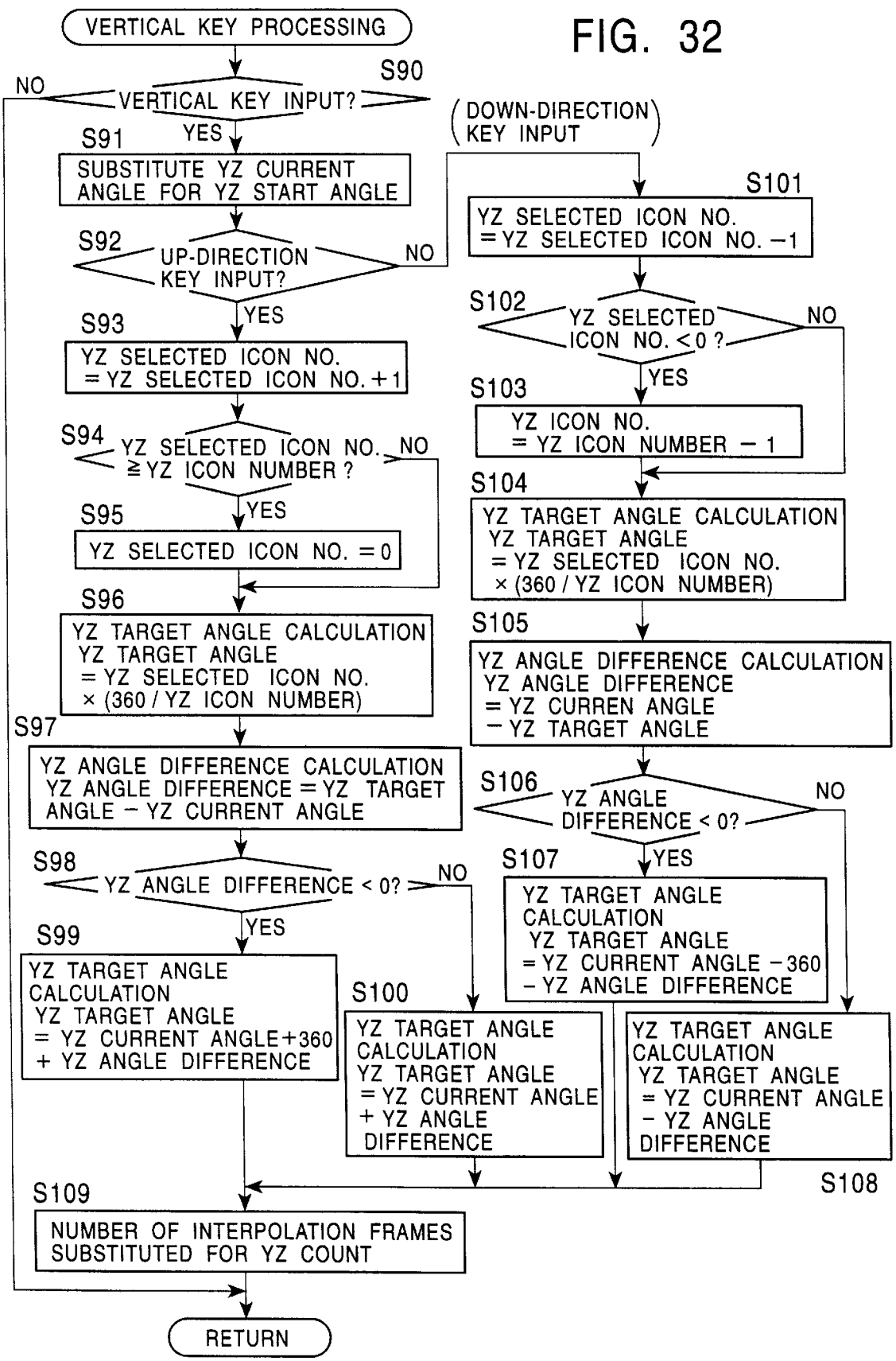
FIG. 32 is a flowchart for an up/down key input processing according to the first embodiment.

FIG. 32 is a flowchart illustrating the vertical (up/down) key input processing routine (step S61) in FIG. 30. As shown in FIG. 32, an initial determination is made as to whether an up/down key has been actuated (step S90). In the event that there has been no input of the up/down key, the up/down key input processing immediately ends.

In the event that there has been an input of the up/down key, the Y-Z current angle is substituted for the Y-Z start angle (step S91). Next, a judgement is made as to whether there has been input of the up-direction key 53d (See FIG. 1) (step S92). In the event that there has been an input of the up-direction key 53d, the Y-Z selection icon No. Iselect is incremented by 1 (step S93). That is, processing for "Y-Z selection icon No.=Y-Z selection icon No.+1" is performed.

Next, a judgement is made as to whether "Y-Z selection icon No. Iselect≧Y-Z number of icons" (step S94). That is, a judgement is made as to whether the selected icon No. has exceeded the greatest icon No.

In the event that the determination is affirmative, the Y-Z selection icon No. Iselect is set to zero (step S95). After completion of the processing in this step S95, or in the event that "Y-Z selection icon No. Iselect≧Y-Z number of icons" is negative, the Y-Z target angle is calculated (step S96). Specifically, Y-Z target angle is calculated by "Y-Z selection icon No.×(360/number of Y-Z icons)".

The Y-Z angle difference is calculated at step S97. Specifically, the Y-Z angle difference is calculated by "Y-Z target angle–Y-Z current angle". The Y-Z angle difference is the angle by which icons 200, 201, 202, . . . should be moved along the second loop-shaped orbit 191 from the Y-Z current angle in order to change the icon enveloped by the second cursor 211 into the adjacent icon.

Next, a determination is made as to whether "Y-Z angle difference<0" (step S98). In the event that the determination is affirmative, the Y-Z target angle is re-calculated by "Y-Z current angle+360+Y-Z angle difference" (step S99). On the other hand, if the determination is negative, the Y-Z target angle is calculated by "Y-Z target angle=Y-Z current angle+Y-Z angle difference" (step S100).

In the event that there has been no input of the up-direction key 53d (see FIG. 1) in step S92, i.e., in the event that there has been an input of the down-direction key 53b, the Y-Z selection icon No. Iselect is decremented by 1 (step S101). That is, processing for "Y-Z selection icon No.=Y-Z selection icon No.–1" is performed.

Then, it is decided whether "Y-Z selection icon No. Iselect<0" (step S102). That is, a judgement is made regarding whether the selected icon No. has become smaller than zero.

If the determination is affirmative, Y-Z selection icon No. Iselect is set such that the number of icons is–1 (step S103). Following the processing in step S103, or in the event that Y-Z selection icon No. Iselect is less than 0, the Y-Z target angle is calculated (step S104). Specifically, the Y-Z target angle is calculated by "Y-Z selection icon No.×(360/number of icons)".

Next, the Y-Z angle difference is calculated (step S105). Specifically, the Y-Z angle difference is calculated by "Y-Z current angle–Y-Z target angle". This Y-Z angle difference is the angle by which icons 200, 201, 202, . . . should be moved along the second loop-shaped orbit 191 from the Y-Z current angle in order to change the icon enveloped by the second cursor 211 into the adjacent icon.

Next, it is determined if Y-Z angle difference<0 (step S106). If the determination is affirmative, the Y-Z target angle is re-calculated by "Y-Z current angle–360–Y-Z angle difference" (step S107). On the other hand, if the determination was negative, the Y-Z target angle is calculated by "Y-Z target angle=Y-Z current angle–Y-Z angle difference" (step S108).

Following completion of the processing in steps S99, S100, S107, and S108, the number of interpolation frames is substituted into the Y-Z count, which is a variable (step S109). In the present embodiment, the number of interpolation frames is set at, for example, 6. This completes the up/down key input processing shown in FIG. 30 (step S61).

Figure 33:
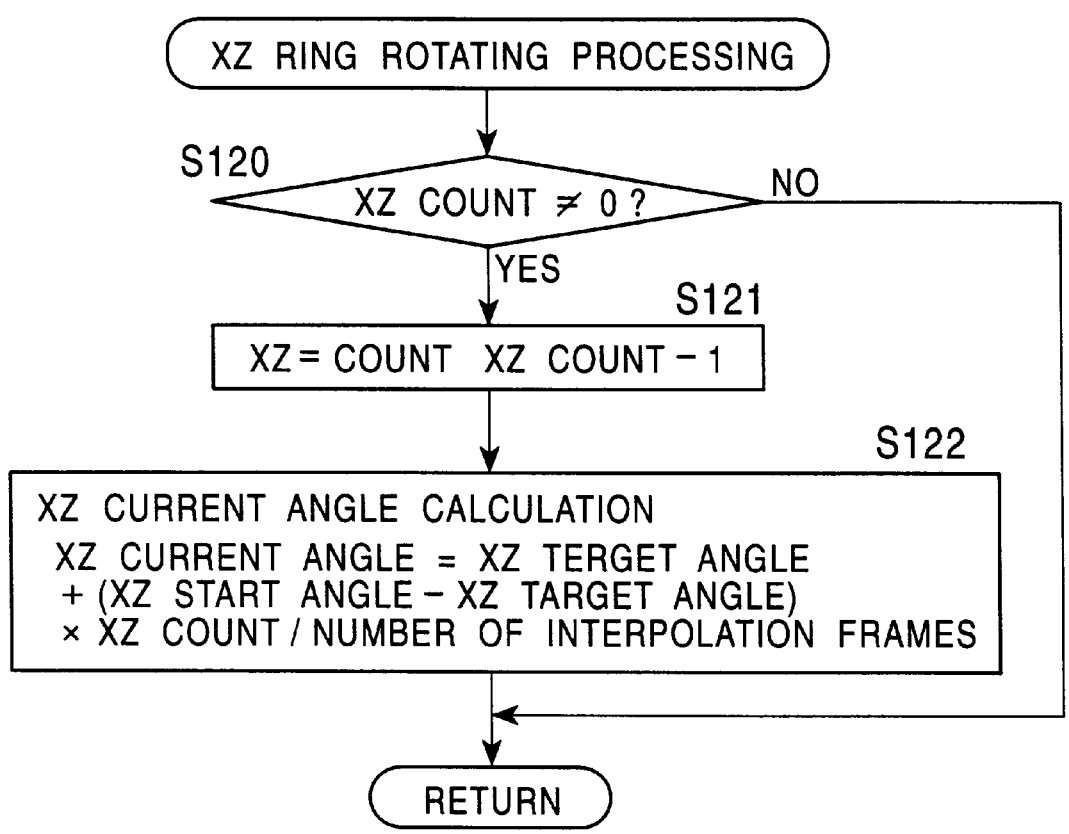
FIG. 33 is a flowchart for an X-Z ring rotating processing according to the first embodiment.

FIG. 33 is a flowchart illustrating the processing contents in the X-Z ring rotating process routine (step S62) shown in FIG. 30. As shown in this FIG. 33, an initial determination is made as to whether X-Z count=0 (step S120).

In the event that the X-Z count is zero, the X-Z ring rotating processing ends. On the other hand, if the X-Z count is not equal to 0, "X-Z count=X-Z count−1" is executed (step S121). That is, the X-Z count is decremented by 1. Next, the X-Z current angle is calculated (step S122). That is, the X-Z current angle is calculated by (X-Z target angle+(X-Z start angle−X-Z target angle) X-Z count/number of interpolation frames). This completes the X-Z ring rotating processing routine (step S62) shown in FIG. 30.

Figure 34:
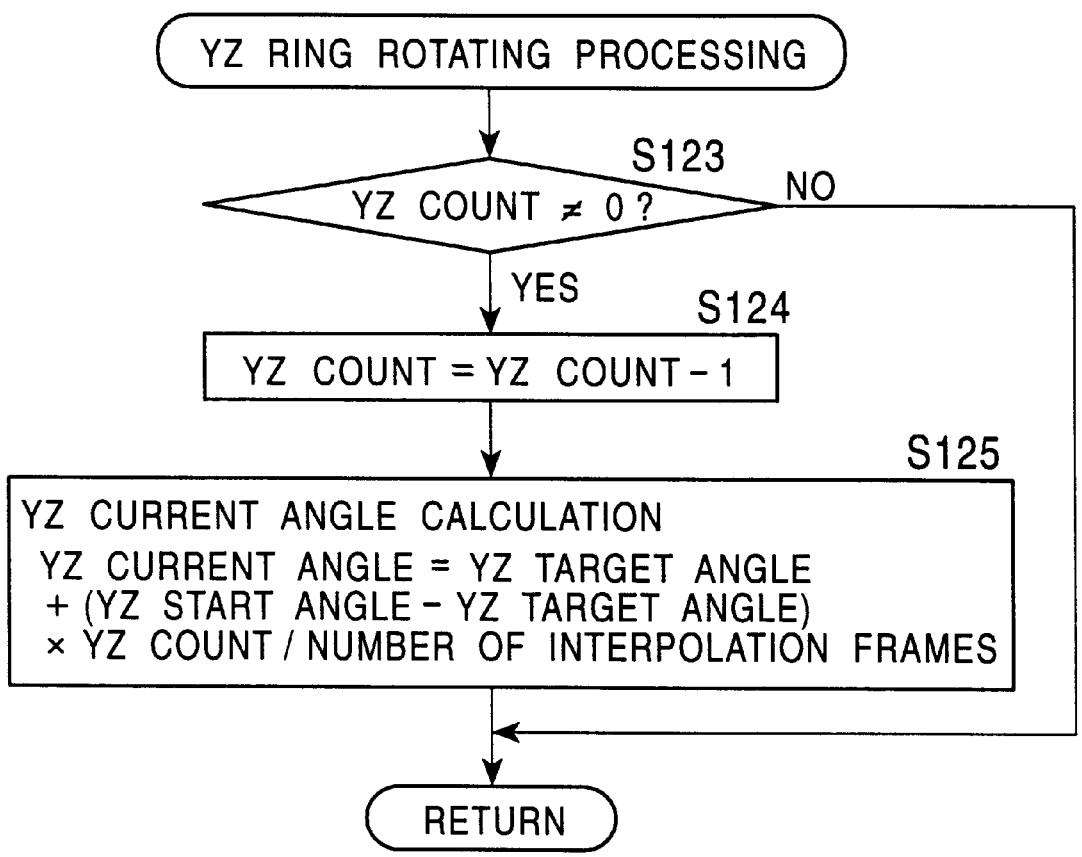
FIG. 34 is a flowchart for a Y-Z ring rotating processing according to the first embodiment.

FIG. 34 is a flowchart illustrating the Y-Z ring rotating process routine (step S63) shown in FIG. 30. As shown in FIG. 34, an initial determination is made as to whether Y-Z count is equal to 0 (step S123).

In the event that the Y-Z count is zero, the Y-Z ring rotating process routine ends. On the other hand, in the event that the Y-Z count does not equal 0 holds, "Y-Z count=Y-Z count−1" is executed (step S124). That is, the Y-Z count is decremented by 1. Next, the Y-Z current angle is calculated (step S125). That is, the Y-Z current angle is calculated by (Y-Z target angle+(Y-Z start angle−Y-Z target angle)×Y-Z count/number of interpolation frames). The above completes the Y-Z ring rotating process routine (step S63) shown in FIG. 30.

Figure 35:
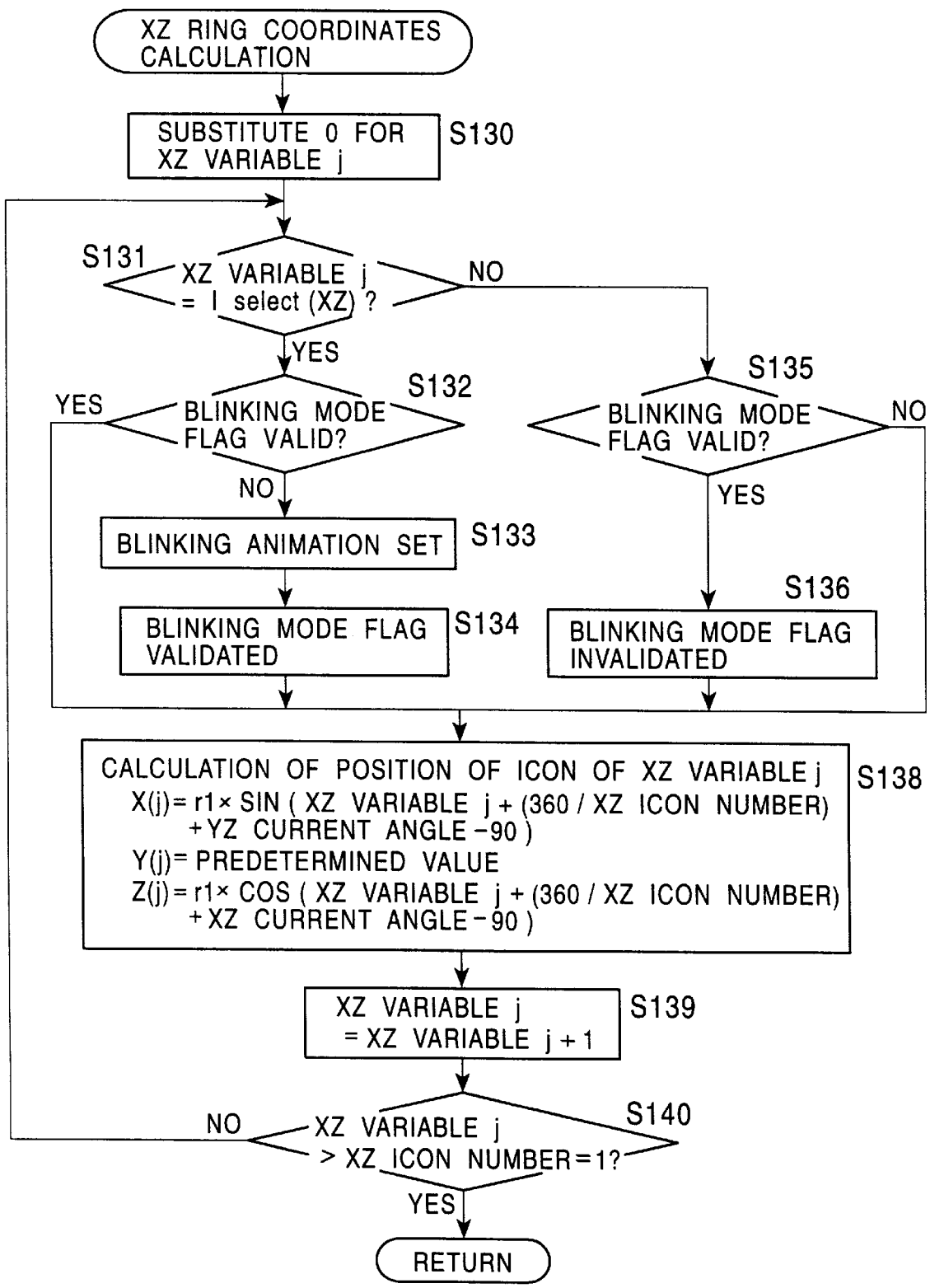
FIG. 35 is a flowchart for calculating X-Z ring coordinates according to the first embodiment.

FIG. 35 is a flowchart illustrating the X-Z ring coordinate calculating processing routine (step S64) in FIG. 30. Initially, zero is substituted for the X-Z variable j (step S130).

Then, a judgement is made as to whether X-Z variable j=Iselect (X-Z)>(step S131). Now, stored in Iselect (X-Z) is the icon No. of the icon which is enveloped by the first cursor 210 on the first loop-shaped orbit 190 in the virtual space in FIG. 20. That is, in the state shown in FIG. 20, Iselect(X-Z)=0.

In the event that the determination at step S131 is positive, it is determined if the blinking mode flag is valid (step S132). In the event that the blinking mode flag is not valid, the blinking animation is set (step S133). Then, the blinking mode flag is validated (step S134).

In the event that X-Z variable j does not equal Iselect(X-Z) in step S131, a judgement is made whether the blinking mode flag is valid (step S135). In the event that the blinking mode flag is valid, the blinking mode flag is invalidated (step S136).

In the event that the blinking mode flag is valid in step S132, or, in the event that the validation processing of the blinking mode flag for step S134 is completed, or in the event that the invalidation processing of the blinking mode flag for step S136 is completed, or, in the event that the blinking mode flag is judged to be invalid in step S135, the position of the icon with the same icon No. I as the X-Z variable j is calculated (step S138).

Specifically, the x coordinate and z coordinate for the icon of icon No. I (0≦I≦number of icons−1) are calculated by the following expressions:

$X(j)=r1 \times \sin$ (X-Z variable $j \times$(360/number of X-Z icons)+X-Z current angle−90)

$Z(j)=r1 \times \cos$ (X-Z variable $j \times$(360/number of X-Z icons)+X-Z current angle−90)

Here, "r1" represents the radius of the circle traced by the first loop-shaped orbit 190 shown in FIG. 20 (i.e., X-Z radius). Note that the y-coordinate is constant at an arbitrary value.

Next, the "X-Z variable j=X-Z variable j+1" processing is executed (step S139). That is, the X-Z variable j is incremented by 1. Next, a judgement is made whether the X-Z variable j is greater than the X-Z number of icons minus 1 (step S140). If the determination is negative, processing returns to step S131. On the other hand, in the event that the X-Z variable j is greater than the X-Z number of icons minus 1, that is, in the event that judgement is made that processing for validation or invalidation of the blinking mode flag has been made for all of the icons on the first loop-shaped orbit 190, the X-Z ring coordinates calculating processing (step S64) ends.

Figure 36:
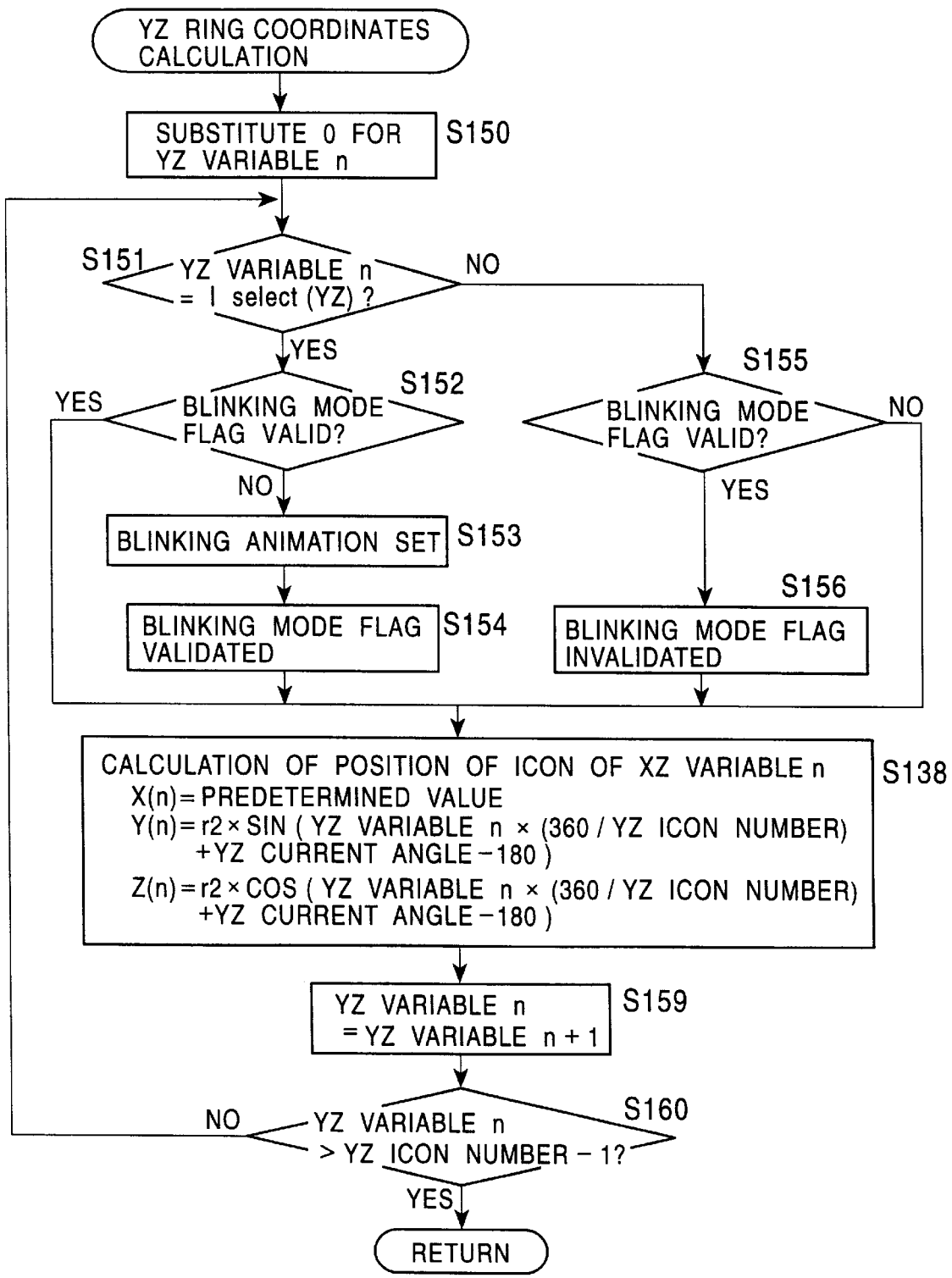
FIG. 36 is a flowchart for calculating Y-Z ring coordinates according to the first embodiment.

FIG. 36 is a flowchart illustrating the Y-Z ring coordinate calculating process routine (step S65) in FIG. 30. As shown in FIG. 36, zero is initially substituted for the Y-Z variable n (step S150).

Next, a judgement is made whether Y-Z variable n equals Iselect (Y-Z) (step S151). Now, stored in Iselect(Y-Z) is the icon No. of the icon which is enveloped by the second cursor 211 on the second loop-shaped orbit 191 in the virtual space in FIG. 20. That is, in the state shown in FIG. 20, Iselect (Y-Z)=0.

In the event that "Y-Z variable n=Iselect(Y-Z)" holds in step S151, processing in steps S152 through S154 is executed, with the processing in steps S152 through S154 being the same as the processing in steps S132 through S134 described above. That is, a judgement is made whether the blinking mode flag is valid (step S152). If the flag is not valid, the blinking animation is set (step S153), and the blinking mode flag is validated (step S154).

In the event that "Y-Z variable n=Iselect (Y-Z)" does not hold in step S151, processing in steps S155 through S156 is executed, with the processing in steps S155 through S156 being the same as the processing in steps S135 through S136 described above. That is, a judgement is made whether the blinking mode flag is valid (step S155). If the flag is valid, the blinking mode flag is invalidated (step S156).

In the event that the processing in these steps S152 through 156 have ended, the position of the icon with the same icon No. I as the Y-Z variable n is calculated (step S158).

Specifically, the y coordinates and z coordinates for the icon of icon No. I (0 ŭI ŭ number of icons−1) are calculated by the following expressions:

$Y(n)=r2 \times \sin$ (Y-Z variable $n \times$(360/number of Y-Z icons)+Y-Z current angle−180)

$Z(n)=r2 \times \cos$ (Y-Z variable $n \times$(360/number of Y-Z icons)+Y-Z current angle−180)

Here, "r2" represents the radius of the circle traced by the second loop-shaped orbit 191 shown in FIG. 20. Also, the x-coordinates are constant at an arbitrary predetermined value.

Next, the "Y-Z variable n=Y-Z variable n+1" processing is executed (step S159). That is, the Y-Z variable n is incremented by 1. Next, a judgement is made regarding whether the Y-Z variable n is greater than the X-Z number of icons minus 1 (step S160). In the event that the Y-Z variable n is not greater than the X-Z number of icons minus 1, the processing from the above step S151 is repeated. On the other hand, in the event that the Y-Z variable n is greater than the X-Z number of icons minus 1, that is, in the event that judgement is made that processing for validation or invalidation of the blinking mode flag has been made for all of the icons on the second loop-shaped orbit 191, the Y-Z ring coordinates calculating processing (step S65) ends.

Accordingly, the positional relationship between the first loop-shaped orbit 190 and second loop-shaped orbit 191 becomes orthogonal. Thus, at least a part of the first loop-shaped orbit 190 and second loop-shaped orbit 191 meet in an orthogonal manner.

Also, all icons are simultaneously displayed on the first loop-shaped orbit 190 or second loop-shaped orbit 191, so the player can visually recognize other selection options more easily. Thus, the player can instantly judge which items on which loop-shaped orbit should be moved in which direction to select the desired combination of icons.

Figure 65:
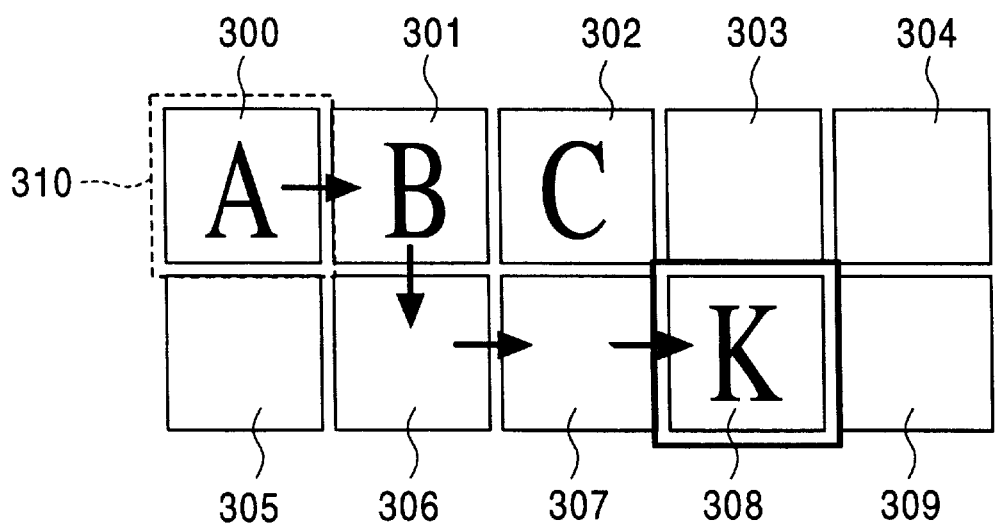
FIG. 65 is a diagram illustrating a conventional case of displaying icons to which commands have been appropriated in a grid array.

Moreover, as shown in FIG. 1, the only operation which the player needs to make to move the icons is to press the direction key 53A, so even in the event that the number of selection options of commands increases, an ease of key operation can be facilitated. That is, the key operation can be made easier for the player as compared with a conventional arrangement such as shown in FIG. 65 wherein icons are displayed on a two-dimensional plane, by displaying multiple icons on a loop-shaped orbit.

Further, icons are placed on the first loop-shaped orbit 190 and the second loop-shaped orbit 191, and the first cursor 210 and second cursor 211 are provided at the portion where these loop-shaped orbits meet in an orthogonal manner, so the player can select a combination made up of two icons at one time. Thus, the number of icons displayed on the screen that have been correlated to commands can be kept to a minimum, in the event that there is the need to input a desired command from a great many commands.

Also, with the present embodiment, the arrangement has been made such that the icons on the first loop-shaped orbit 190 are moved by the distance of one icon in the counter-clockwise direction in the event that the player presses the left-direction key 53c, but conversely, an arrangement may be made wherein the icons are moved in the clockwise direction by the distance of one icon. Also, the arrangement has been made such that the icons on the second loop-shaped orbit 191 are moved by the distance of one icon in the upward direction in the event that the player presses the up-direction key 53d, but conversely, an arrangement may be made wherein the icons are moved in the downward direction by the distance of one icon. Also, in either case, arrangements may be made wherein the icons are moved by the distance of multiple icons. Further, arbitrary images can be applied for the icons to be displayed.

Figure 37:
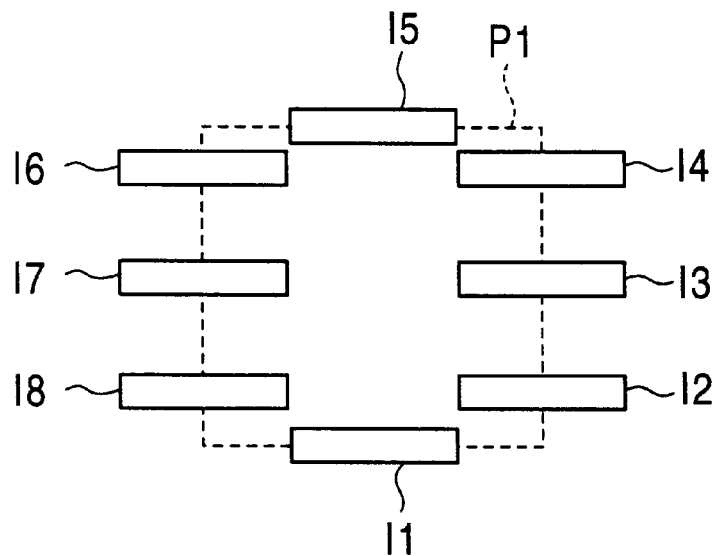
FIG. 37 is a plan view illustrating the state of icons being placed on a square orbit.
Figure 38:
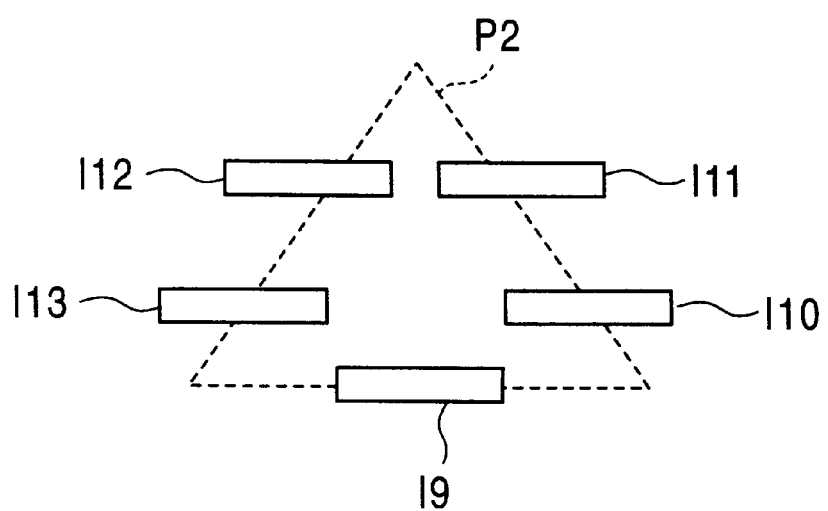
FIG. 38 is a plan view illustrating the state of icons being placed on a triangular orbit.

Also, with the present embodiment, loop-shaped orbits which trace a circular orbit have been used as the loop-shaped orbits upon which are placed the icons, but the present invention is not restricted to such; rather, orbits of arbitrary forms can be applied. As an example, FIG. 37 illustrates icons I1 through I8 on an orbit P1 wherein four straight lines are linked to form an orbit, this drawing being a plan view on the X-Z plane. As another example, FIG. 38 illustrates icons I9 through I13 on an orbit P2 wherein three straight lines are linked to form an orbit, this drawing also being a plan view on the X-Z plane. In this way, the orbit on which to place the icons may be square, triangular, elliptical, etc., as long as there is a loop-shaped form.

Figure 39A:
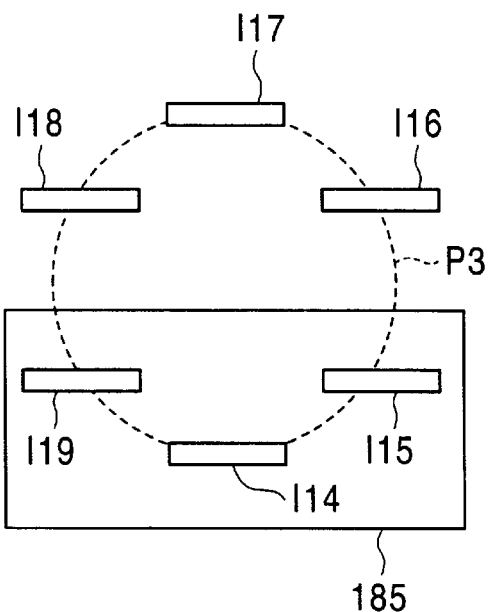
FIG. 39A illustrates the state of icons being placed on a loop-shaped orbit.
Figure 39B:
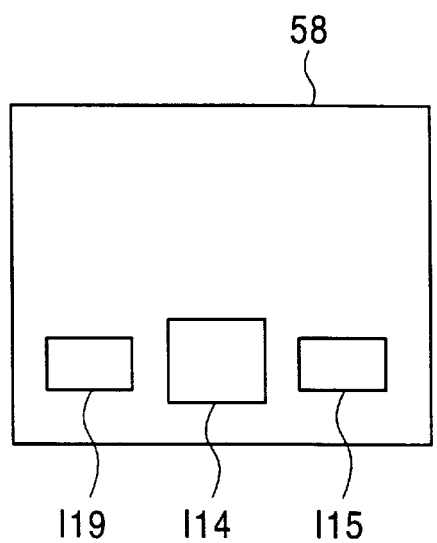
FIG. 39B illustrates a display screen, in which icons have been placed within a vertical space shown in FIG. 39A.

Also, the present embodiment has been arranged such that the icons are all arrayed and displayed inside a virtual space, but the present invention is not restricted to this and variations can be made as appropriate. FIG. 39 is a diagram illustrating a variation of the present embodiment. FIG. 39A illustrates the state of icons I14 through I9 being arrayed on a loop-shaped orbit P3, this drawing being a plan view on the X-Z plane. FIG. 39B is a diagram illustrating the display screen 58 wherein icons have been placed within a virtual space as with FIG. 39A, and only icons I14, I15, and I19 are displayed in the area 185. As shown in FIGS. 39A–B, the arrangement may be made so as to display only a certain range on the orbit or a certain number of icons. With the example shown in FIGS. 39A–B, only the icons contained in the area 185 are arrayed in the virtual space, and displayed on the display screen 185. Icons contained in other areas are not displayed.

Figure 40:
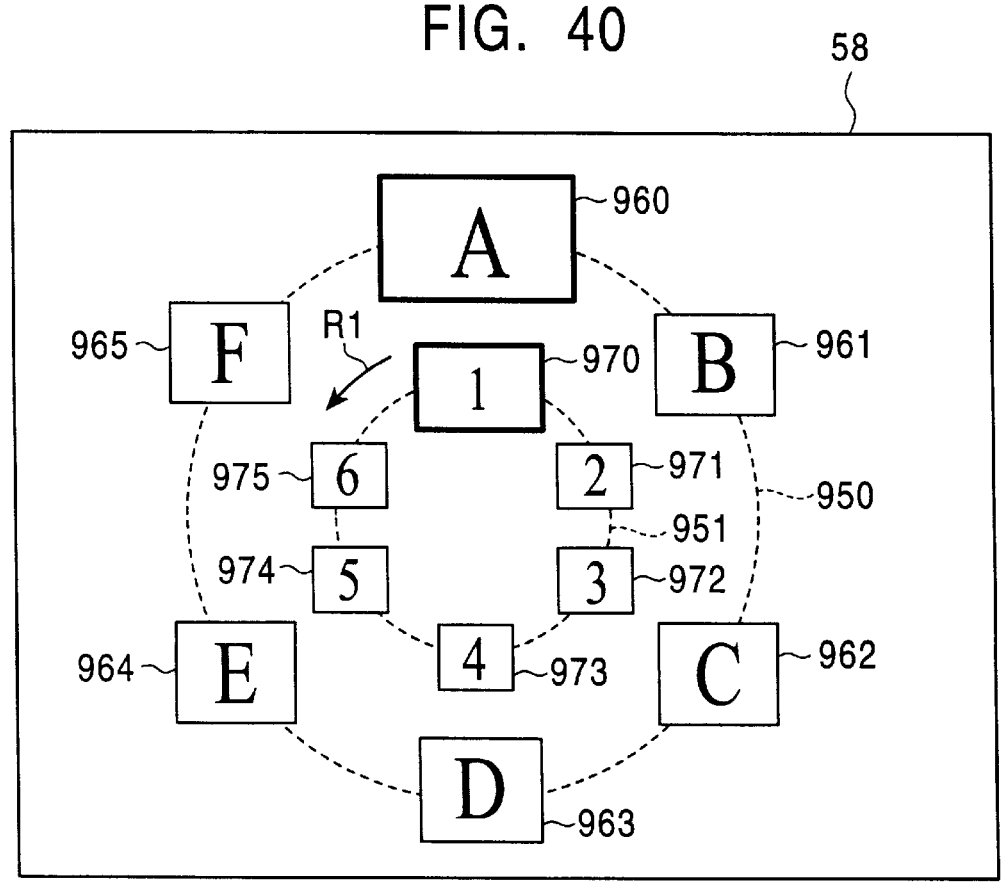
FIG. 40 is a diagram illustrating an example of a display screen, wherein the first loop-shaped orbit and the second loop-shaped orbit are concentrically placed.

Also, though the present embodiment involves a placement arrangement wherein at least a part of the first and second loop-shaped orbits meet in an orthogonal manner, the present invention is not restricted to this; rather, variations can be made as appropriate. FIG. 40 is a diagram illustrating an example wherein a first loop-shaped orbit 950 and a second loop-shaped orbit 951 tracing circles are placed within the display screen 58 in a concentric manner. Note here that the first loop-shaped orbit 950 is an outside loop and the second loop-shaped orbit 951 is an inside loop. Multiple icons 960 through 965 are placed at equal spacing on the first loop-shaped orbit 950, and multiple icons 970 through 975 are also placed at equal spacing on the second loop-shaped orbit 951. The icons placed on the first and second loop-shaped orbits 950 and 951 move along the loop-shaped orbits in accordance with the operation input by the player with the controller 53.

In FIG. 40, the position at which the icon 960 is situated on the first loop-shaped orbit 950 and the position at which the icon 970 is situated on the second loop-shaped orbit 951 indicate the icon selection position. The display size of the icons is uniform at positions other than the selection position, but the icons placed at the selection position are displayed larger than the other icons. Thus, the player is able to select icons in a sure manner.

Figure 41:
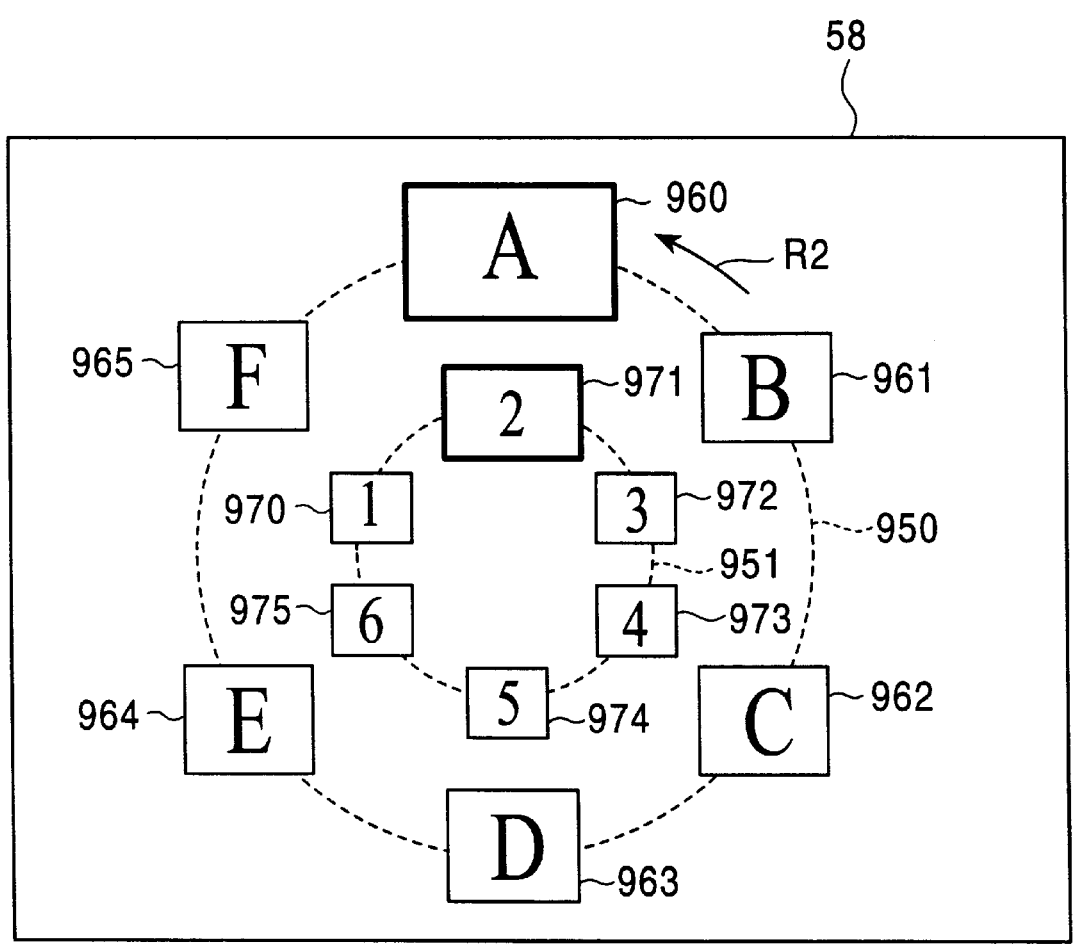
FIG. 41 is a diagram illustrating a display screen example, wherein the icons on the second loop-shaped orbit have moved from the state shown in FIG. 40.

FIG. 41 is an example of the display screen 58 in the event that the player presses the up-direction key 53d for example in the state shown in FIG. 40. The icons positioned on the second loop-shaped orbit 951 move in the direction of the arrow R1 shown in FIG. 40, and the icon which is a candidate for selection switches from icon 970 to icon 971. Selecting the icon combination in this state inputs a command corresponding to the combination of icon 960 and icon 971.

Figure 42:
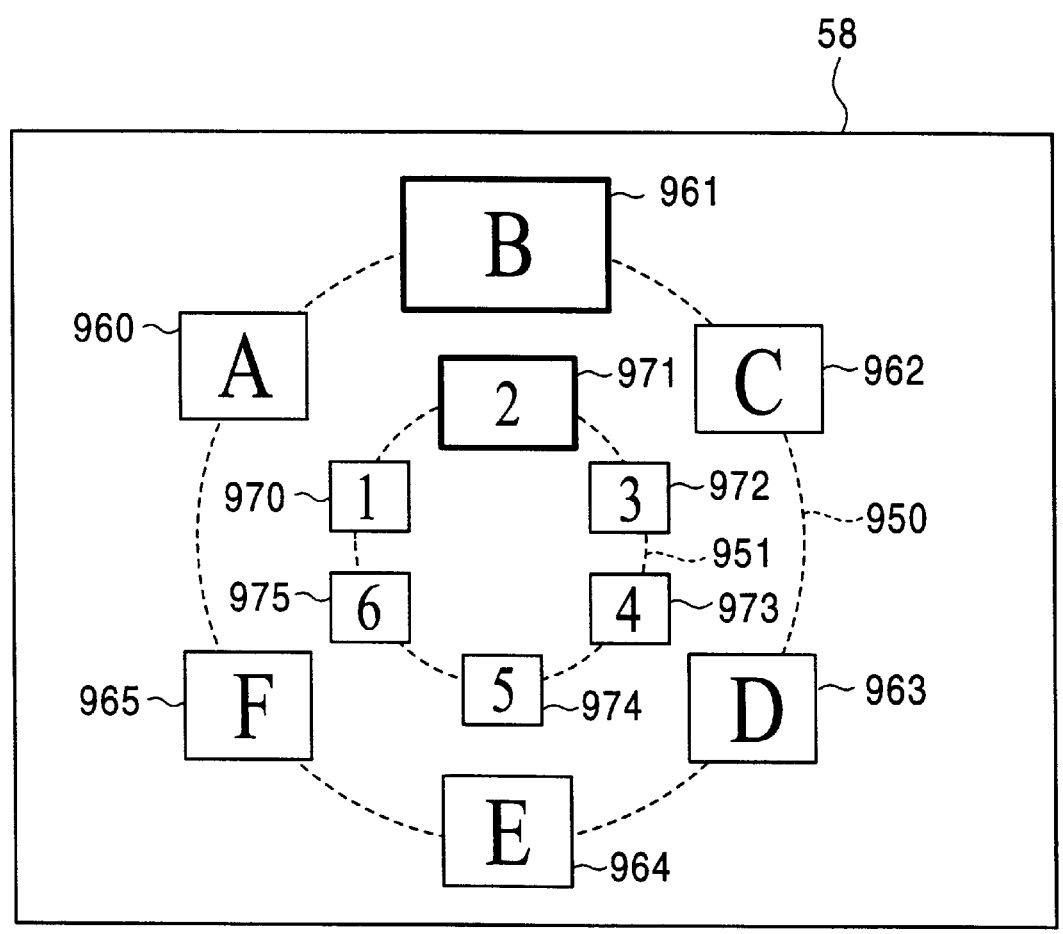
FIG. 42 is a diagram illustrating a display screen example, wherein the icons on the first loop-shaped orbit have moved from the state shown in FIG. 41.

FIG. 42 is an example of the display screen 58 in the event that the player presses the left-direction key 53c, for example, in the state shown in FIG. 41. The icons positioned on the first loop-shaped orbit 950 move in the direction of the arrow R2 shown in FIG. 41, and the icon which is a candidate for selection switches from icon 960 to icon 961. Selecting the icon combination in this state inputs a command corresponding to the combination of icon 961 and icon 971.

As described above, issuing a single command with a combination of icons allows differing commands to be executed according to the combination of icons. Thus, there is no need to provide an icon for each command, so the number of icons which need to be displayed can be kept to a minimum, and the display screen can be used effectively.

Second Embodiment

Figure 43:
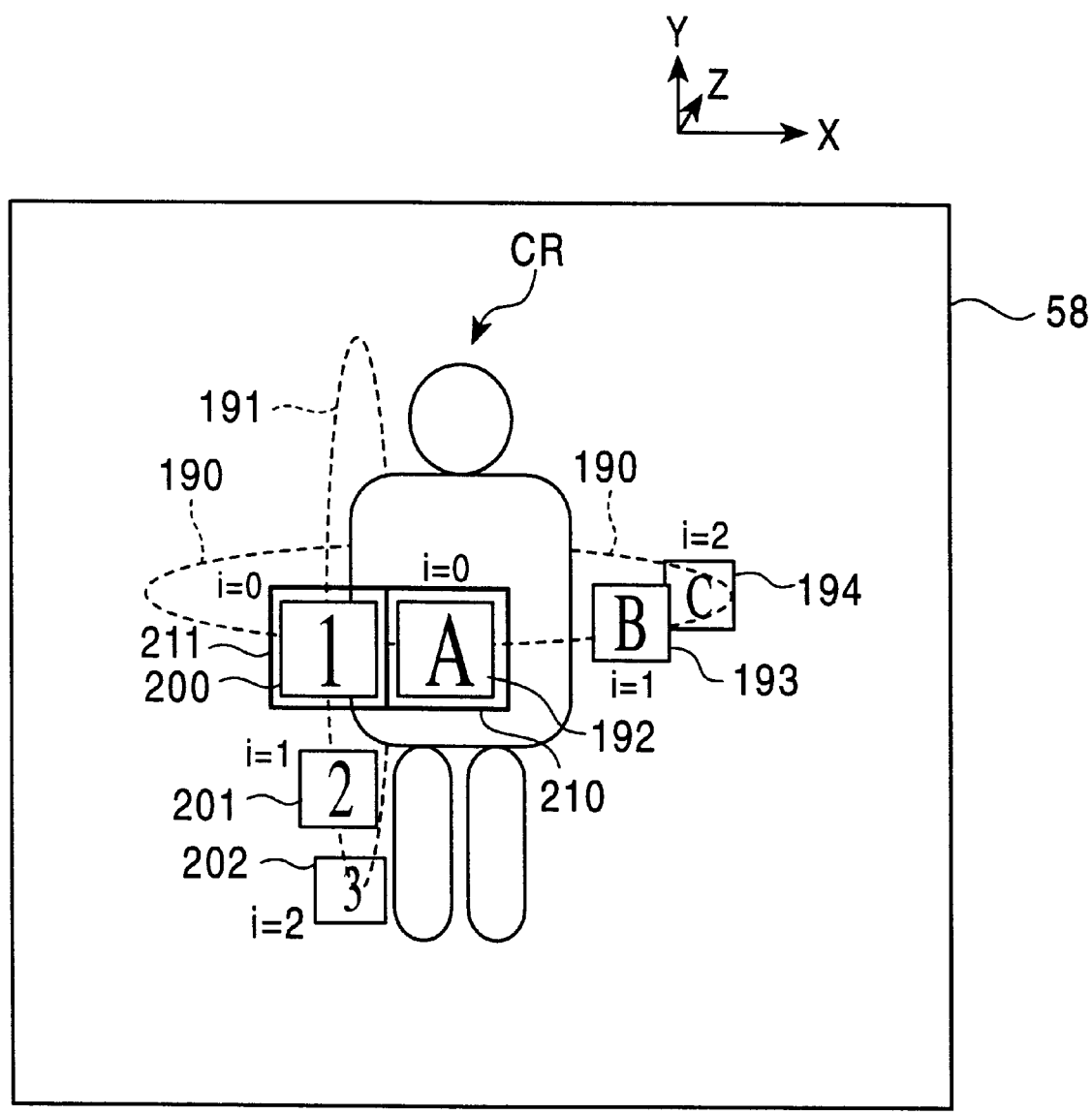
FIG. 43 is a diagram illustrating the display screen state according to a second embodiment of the present invention.

With the present embodiment, icons are displayed for inputting commands in a manner corresponding with a character positioned in a virtual space. FIG. 43 is a diagram illustrating the state of a character and icons being placed in a virtual space with the method according to the present embodiment of the invention, and displayed on a display screen 58. In FIG. 43, character CR is located at the center portion of the first loop-shaped orbit 190 and second loop-shaped orbit 191 shown in FIG. 20.

Figure 44:
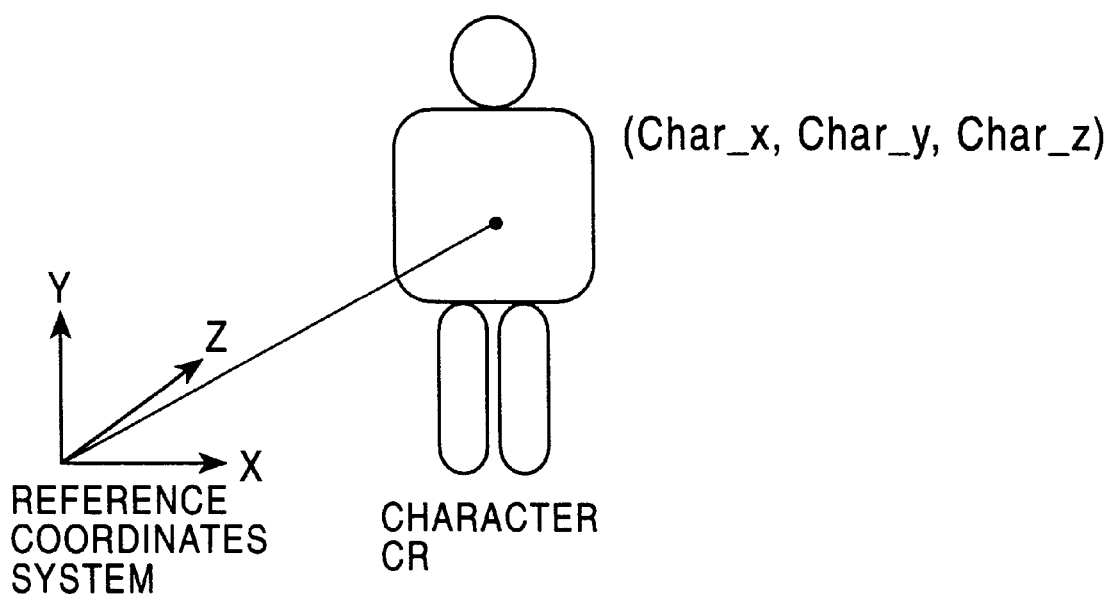
FIG. 44 is a diagram illustrating character coordinates in the reference coordinates system.

The coordinates position of the character CR in this virtual space is stored in the character data table 122a within the character data storing area 122 of the main memory 104 shown in FIG. 15. The coordinate position of the character is represented by the x-coordinates Char_x, y-coordinates Char_y, and z-coordinates Char_z, in a reference coordinates system, as shown in FIG. 44.

Figure 45:
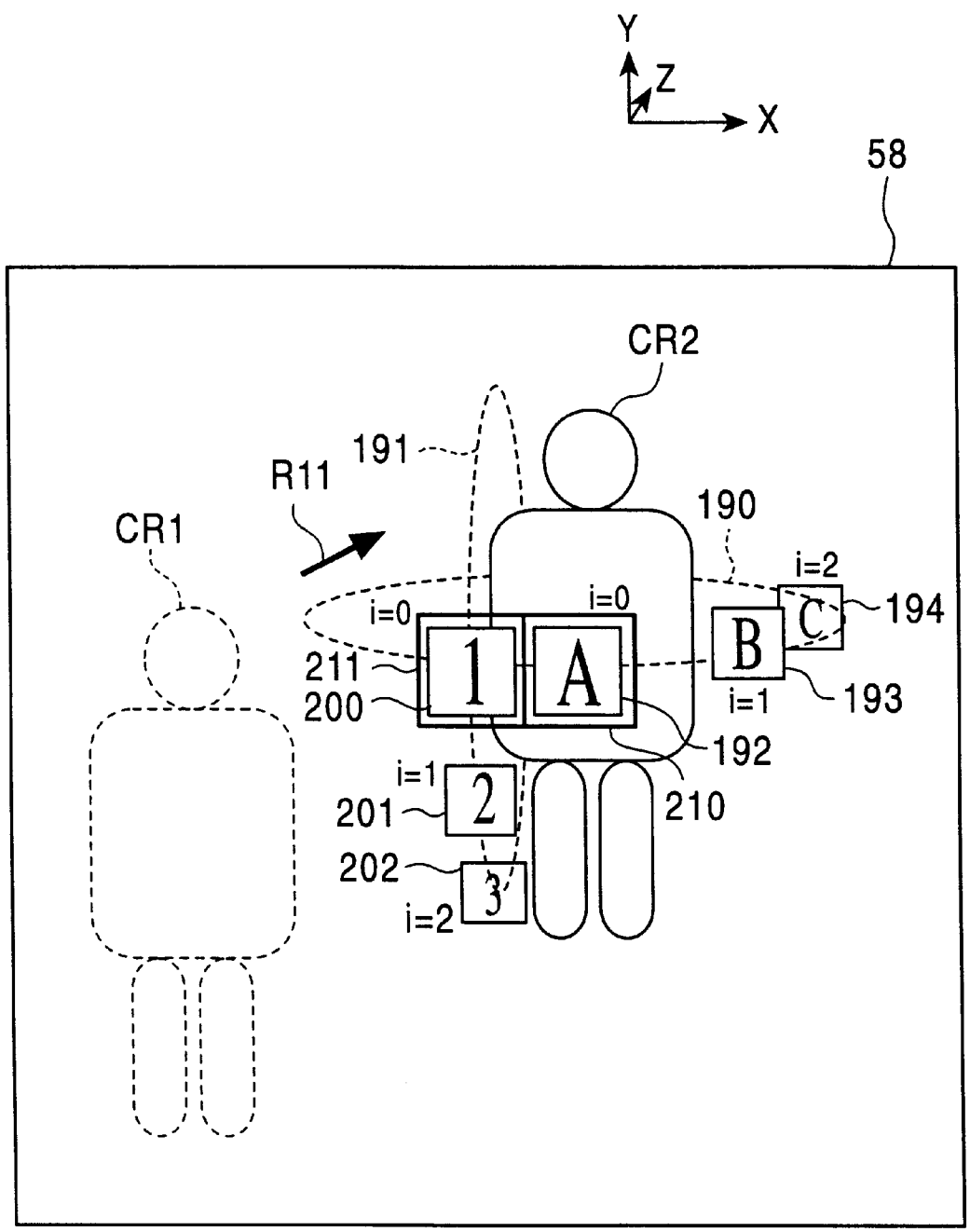
FIG. 45 is a diagram illustrating a display screen example wherein multiple characters are displayed.

FIG. 45 illustrates a state wherein multiple characters are displayed on the display screen 58. As shown in this FIG. 45, in the event that there are two characters CR1 and CR2 displayed on the screen, there is the need for the player to input commands for both character CR1 and character CR2. In order to achieve this, the player selects and inputs the command for the character CR1, and then selects and inputs the command for the character CR2.

At this time, in the present embodiment, icons are displayed around the character for which a command is to be input. That is to say, in the state shown in FIG. 45, commands can be input to character CR2.

Figure 46:
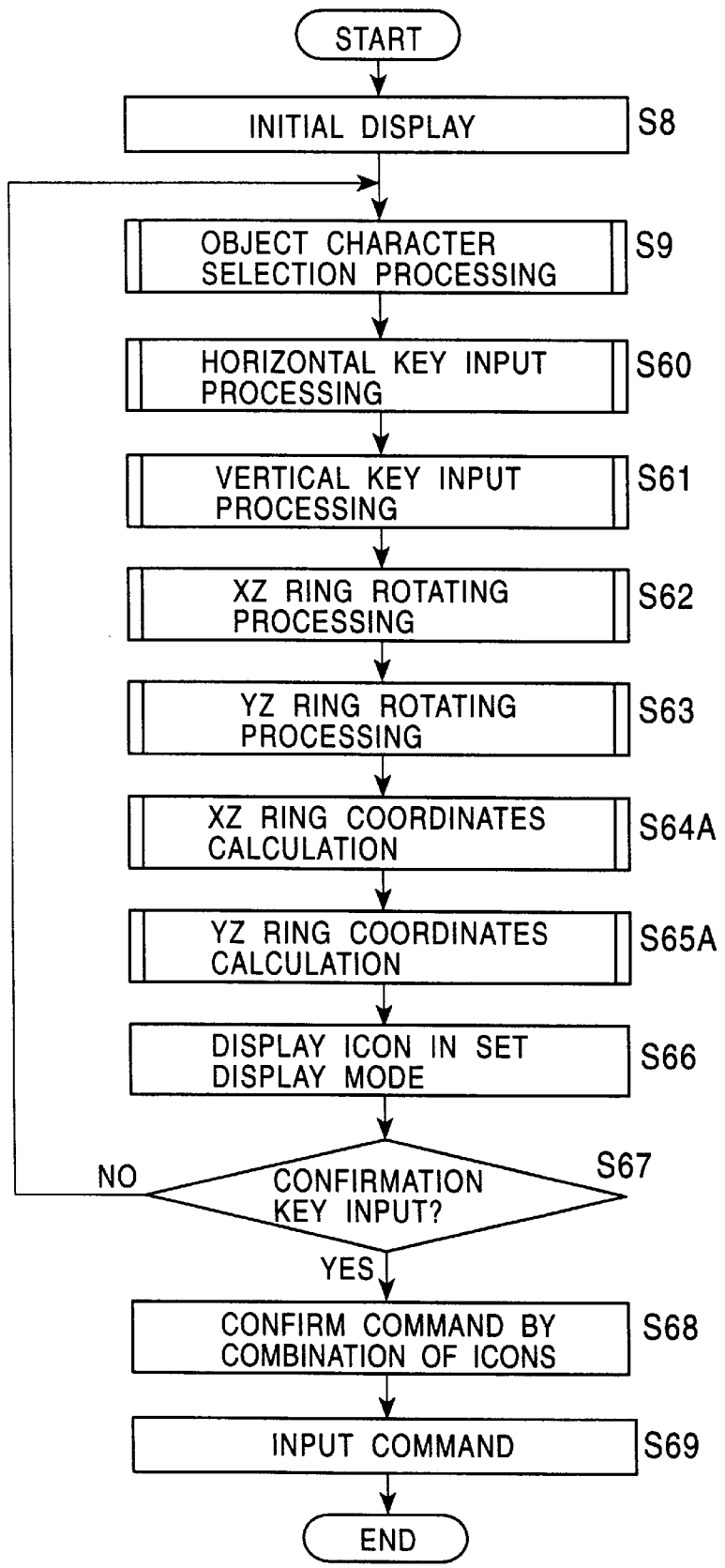
FIG. 46 is a flowchart for describing a main processing routine according to the second embodiment.

FIG. 46 is a diagram illustrating the main flowchart for the icon display processing according to the second embodiment. As shown in this FIG. 46, at the time of starting the processing, the processing for selecting character to be the object thereof is performed (step S9). This object character selection processing is a process for selecting the character, out of multiple characters, to which the player is to input commands. Details of the object character selection processing will be described later.

The processing of step 58 and steps S60 through S66 is performed, but regarding the processing other than that in step S64A and step S65A, this is the same as that in the above-described flowchart shown in FIG. 30, so detailed description thereof will be omitted. In this second embodiment, the processing in step S64A and step S65A is performed instead of that in step S64 and step S65 in the first embodiment.

Figure 47:
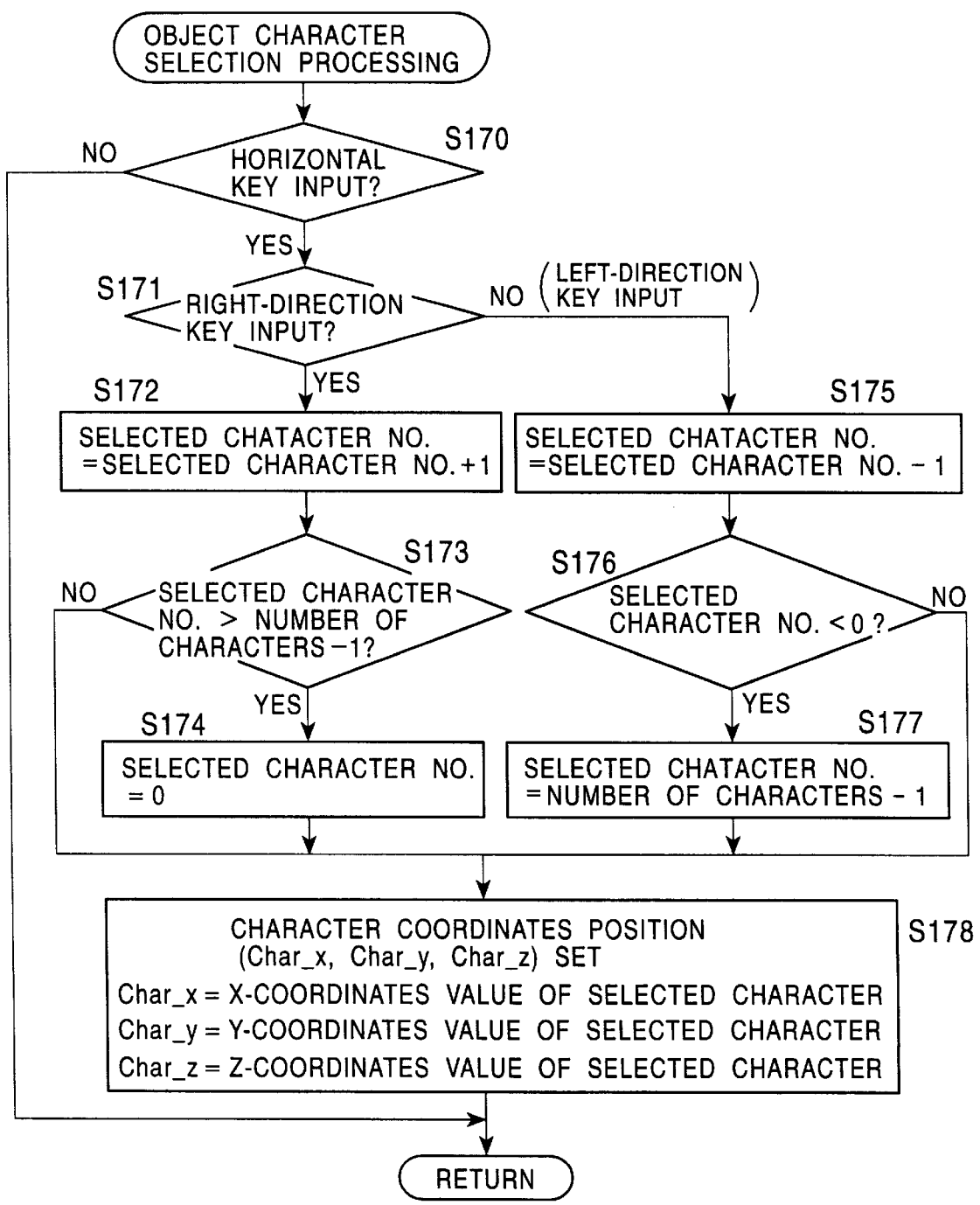
FIG. 47 is a flowchart for an object character selection processing routine according to the second embodiment.

FIG. 47 is a flowchart for describing the processing contents of the object character selection processing (step S9) shown in FIG. 46, in detail. As shown in FIG. 47, a judgement is made whether there has been an input with the right-direction key 53a or the left-direction key 53c (see FIG. 1) (step S170). That is, in the present embodiment, operating the right-direction key 53a or the left-direction key 53c switches the character which is the object of command input. In the event that this input has not been performed, the object character selection processing ends.

Next, a judgement is made whether there has been an input with the right-direction key 53a (see FIG. 1) (step S171). In the event that there has been an input with the right-direction key 53a, processing of "selected character No.=selected character No.+1" is performed (step S172). That is to say, the selected character No. is incremented by 1. Now, the selected character No. is data for specifying the character which the player has currently selected, and owing to the above configuration the player can arbitrarily select characters.

Next, a judgement is made whether the selected character No. is greater than the number of characters minus 1 (step S173). In the event that the selected character No. is greater than the number of characters minus 1, the selected character No. is set to zero (step S174). That is to say, the selected character No. has exceeded the maximum value thereof, and thus, the selected character No. is reset to zero.

In the event that there has not been an input with the right-direction key 53a in step S171, i.e., in the event that there has been input with the left-direction key 53c, processing of "selected character No.=selected character No.− 1" is performed (step S175). That is to say, the selected character No. is decremented by 1.

Next, judgement is made regarding whether or not the selected character No. is smaller than zero (step S176). In the event that the selected character No. is smaller than zero, the selected character No. is set to the number of characters minus 1 (step S177). That is to say, the selected character No. has exceeded the minimum value thereof, and thus the selected character No. is set to the maximum value thereof.

In the event that the selected character No. is not greater than the number of characters minus 1 in step S173, or, in the event that the processing in step S174 has ended, or, in the event that the selected character No. is not smaller than zero in step S176, or, in the event that the processing in step S177 has ended, the character coordinates position is set (step S178).

That is, reference is made to the character data table of the selected character No. in the character data area 122 in FIG. 15, so as to obtain the x-coordinates char_x for the selected character, the y-coordinates char_y for the selected character, and the z-coordinates char_z for the selected character. Thus, the object character selection processing (step S9) ends.

Figure 48:
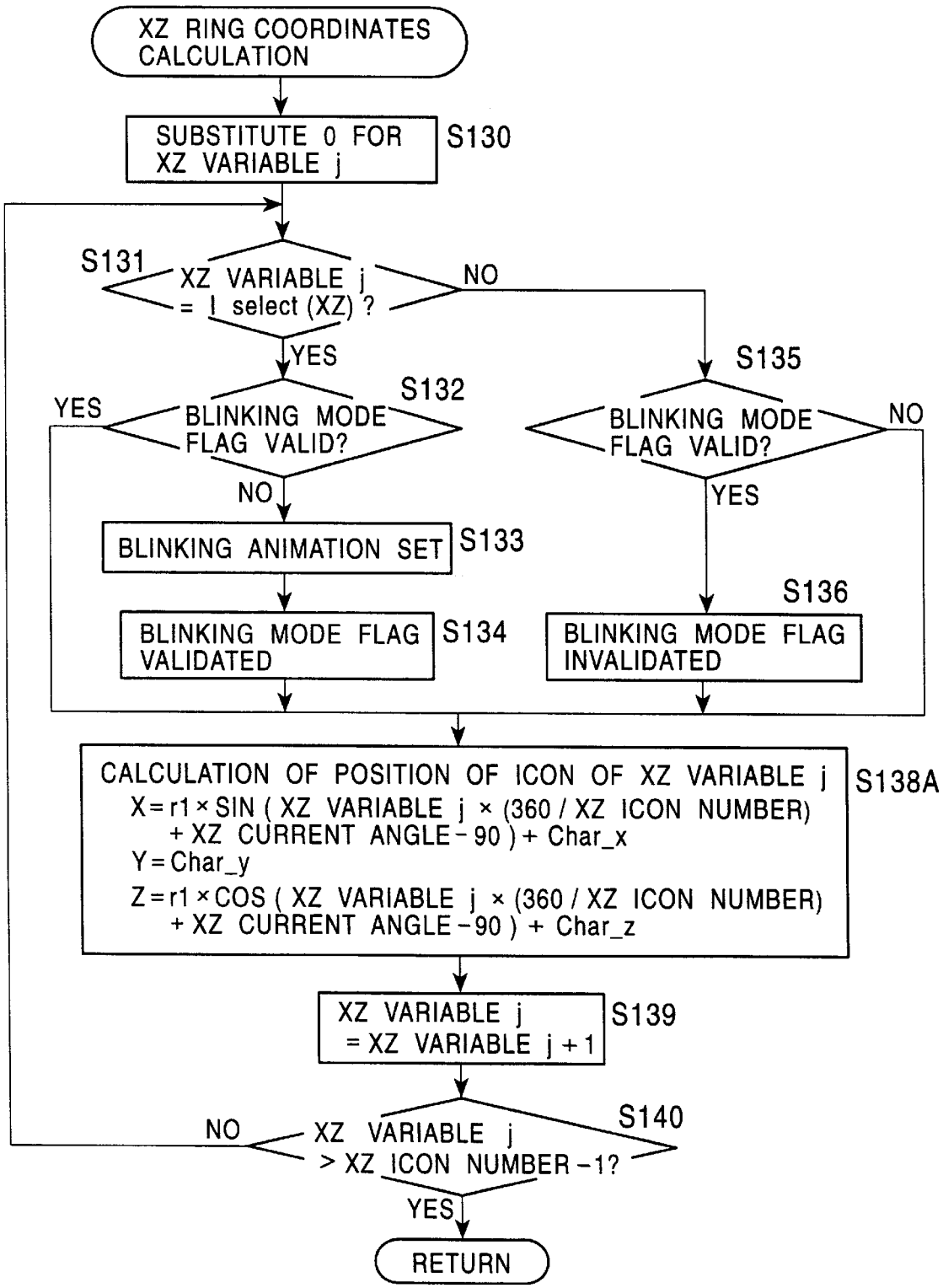
FIG. 48 is a flowchart for an X-Z ring coordinate calculation processing routine according to the second embodiment.

Next, the X-Z ring coordinate calculating process routine (step S64A) that has been changed by adding object character selection processing will be described. FIG. 48 is a diagram illustrating a flowchart for the X-Z ring coordinates calculating processing (step S64A). As shown in FIG. 48, the point that the X-Z ring coordinates calculating processing has been changed is in the processing of step S138A.

As shown in step S138A in FIG. 48, with the present embodiment, at the time of calculating the X-coordinates, Y-coordinates, and Z-coordinates of the X-Z icon within the virtual space which has an icon No. I equal to the value of the variable j, the character coordinates (Char_x, Char_y, Char_z) are added as offset values.

Figure 49:
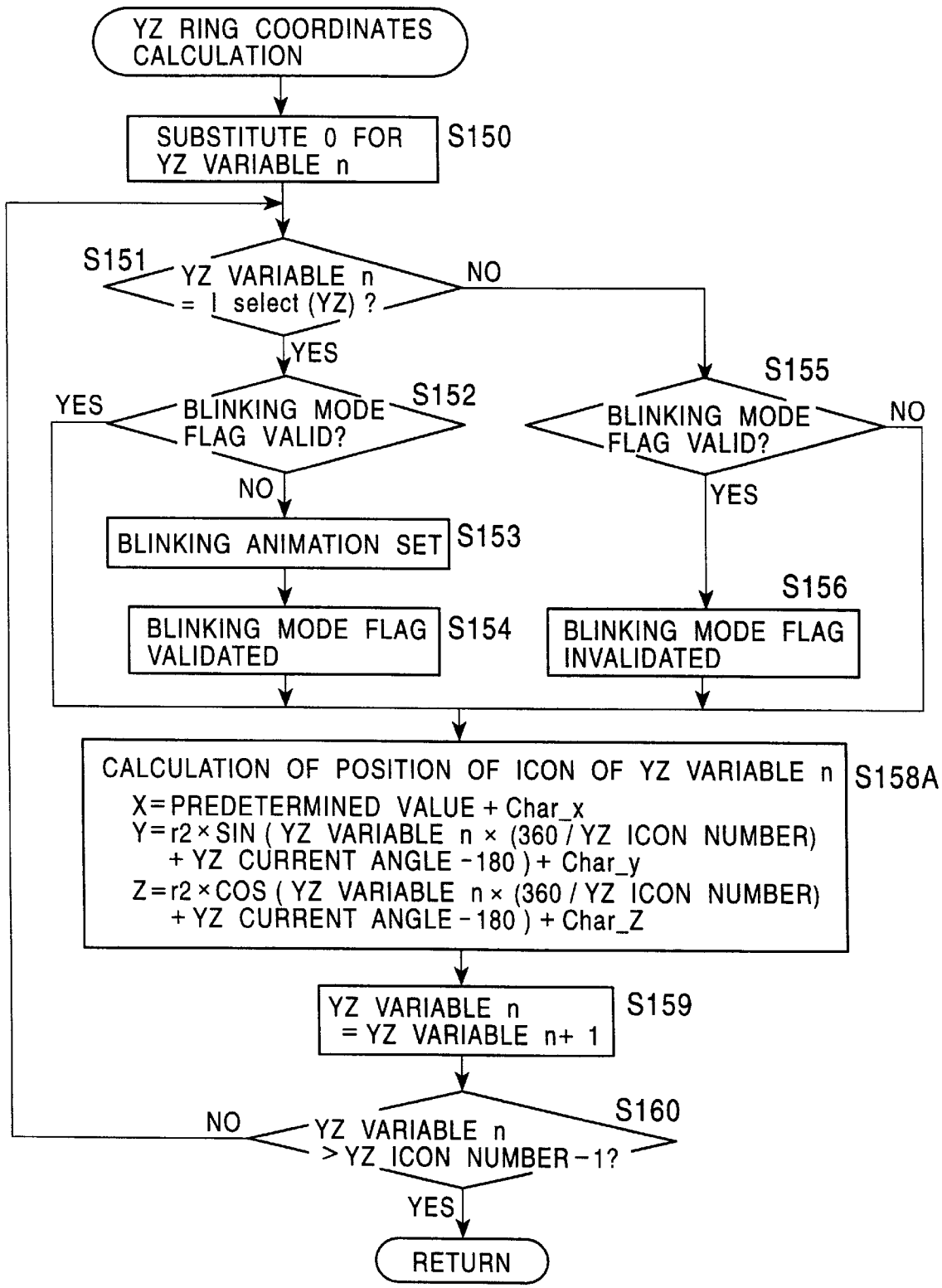
FIG. 49 is a flowchart for a Y-Z ring coordinate calculation processing routine according to the second embodiment.

Next, the Y-Z ring coordinates calculating processing (step S65A) that has been changed by adding object character selection processing will be described. FIG. 49 is a diagram illustrating a flowchart for the Y-Z ring coordinates calculating processing (step S65A). As shown in FIG. 49, the point that the Y-Z ring coordinates calculating processing has been changed is in the processing of step S158A. As shown in step S158A in FIG. 49, with the present embodiment, at the time of calculating the X-coordinates, Y-coordinates, and Z-coordinates of the X-Z icon within the virtual space which has an icon No. I equal to the value of the variable n, the character coordinates (Char_x, Char_y, Char_z) are added as offset values.

By means of adding the above change, the first loop-shaped orbit 190 and second loop-shaped orbit 191 can be displayed at a position following that of the character. Thus, the player can easily specify the character which is the object of command input at that time, and can also select two icons at once.

According to the icon display method relating to the present embodiment described above, the icons are displayed around the character which is the object of commanding in a ring shape as shown in FIG. 45, so the player can easily determine the character which is the object of command input at that point.

Figure 50:
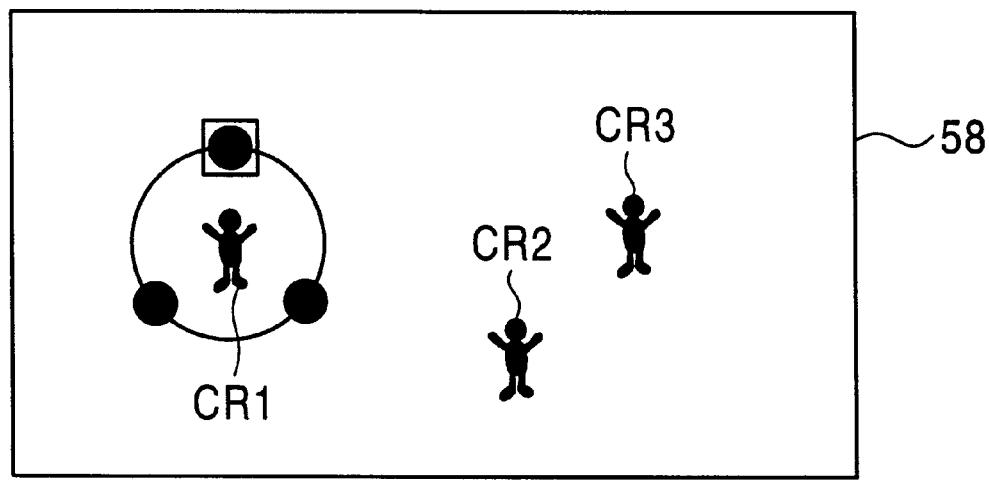
FIG. 50 is a diagram illustrating an example wherein the present embodiment is applied to a two-dimensional plane.
Figure 51:
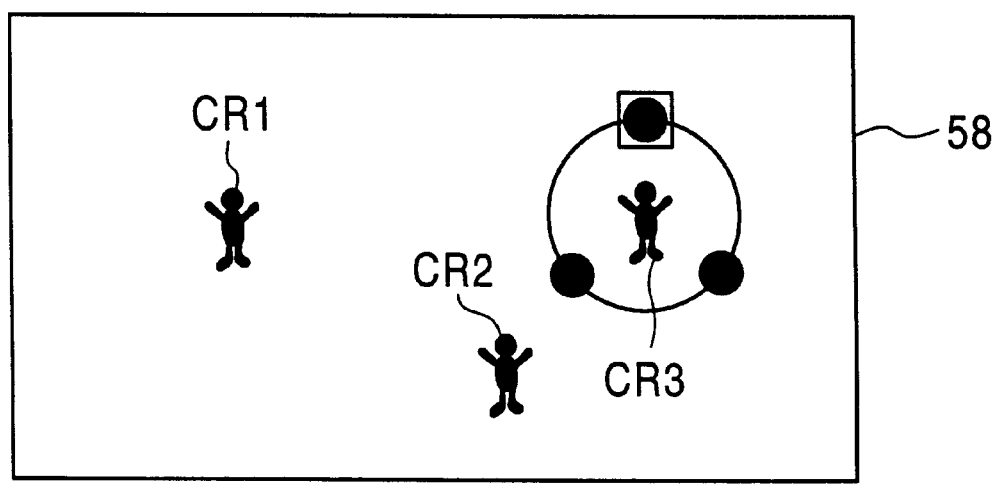
FIG. 51 is a diagram illustrating a case wherein the character that is the object of a command input is moved from the state shown in FIG. 50.

Incidentally, the present embodiment may also be applied to characters displayed on a two-dimensional plane, as well. FIG. 50 is a diagram illustrating the display screen 58 in the case that the character CR1 is the object of command input. Icons are displayed around the character CR1 in a loop shape, so the player can tell at a glance that the current state is such that command input can be made to the character CR1. FIG. 51 is a diagram illustrating the display screen 58 in the case that the player has pressed the right-direction key 53a or left-direction key 53c (see FIG. 1) in the state shown in FIG. 50. Icons are displayed around the character CR3 in a loop shape, so the player can easily tell that the character that is the object of command input has switched from character CR1 to character CR3.

Also, with the present embodiment, an example has been described wherein the centers of the first loop-shaped orbit 190 and second loop-shaped orbit 191 match at the center of the character coordinates, but the present invention is not restricted to this. Variations such as the centers of the first loop-shaped orbit 190 and second loop-shaped orbit 191 matching at the head portion or foot portion of the character coordinates may be applied as appropriate.

Third Embodiment

Figure 52:
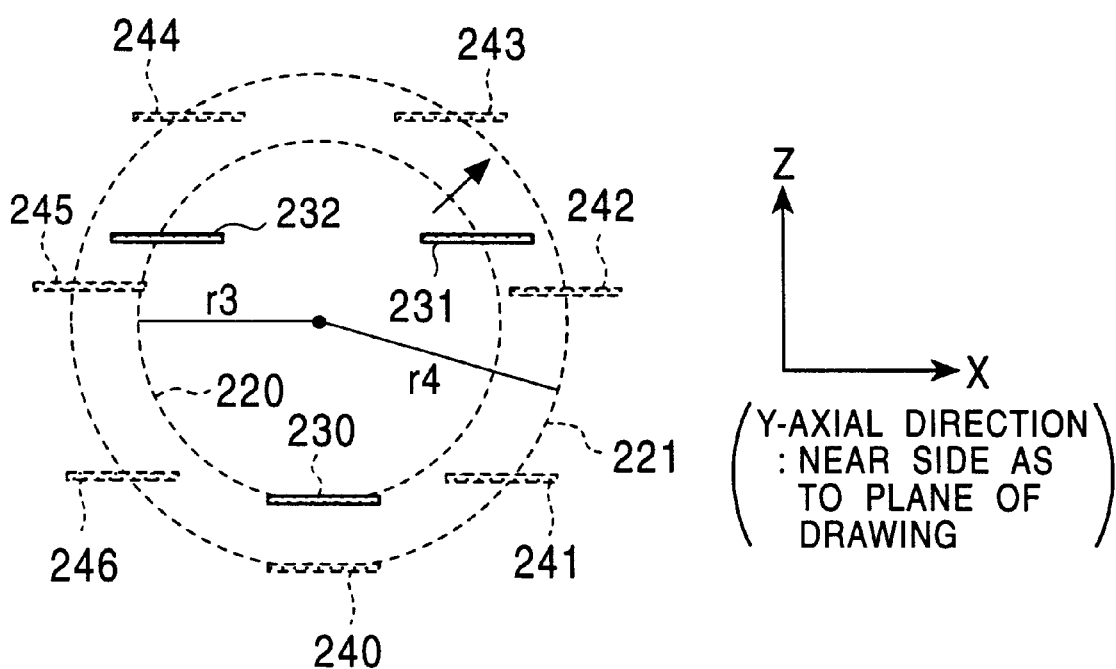
FIG. 52 is a diagram showing the state of icons directly from above, with respect to the X-Z plane.

FIG. 52 is a plan view of icons in a virtual space on an X-Z plane at the time of performing icon display with the method according to the third embodiment of the present invention.

As shown in FIG. 52, with the third embodiment, the radius of the circle traced by the loop-shaped orbit changes according to the hierarchical level thereof, in the event that hierarchical levels are to be provided with commands.

Figure 53:
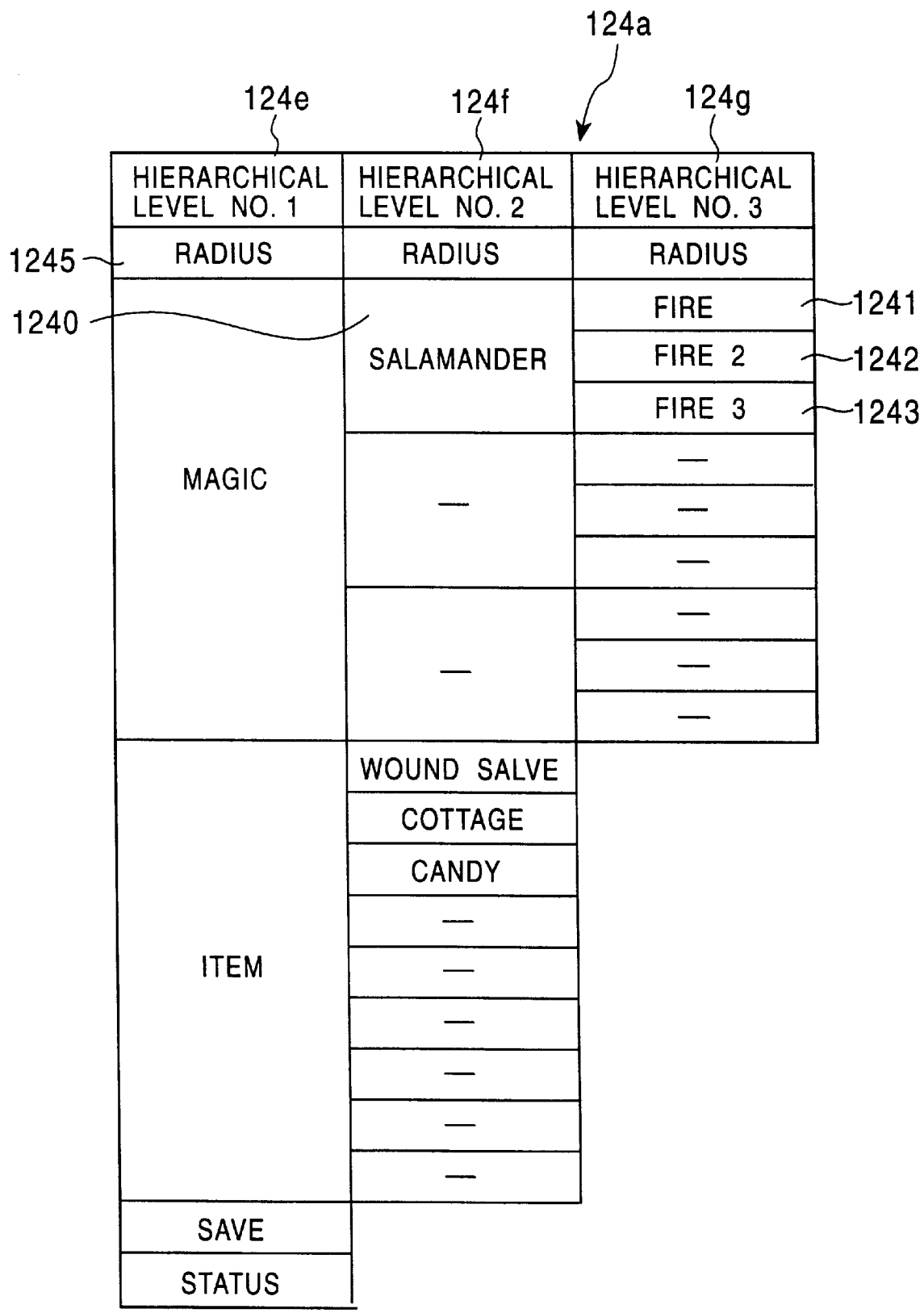
FIG. 53 is a diagram illustrating the command table in the command data storing area.

FIG. 53 is a diagram illustrating the configuration of the command table 124a stored in the command data storing area 124 in the main memory 104 of the third embodiment. Stored in the command table 124a according to the present embodiment are a first hierarchical level command group 124e which is the highest hierarchical level, a second hierarchical level command group 124f which is the hierarchical level below each command in the highest hierarchical level, and a third hierarchical level command group 124g which is the hierarchical level below each command in the second hierarchical level.

Also, radius 1245 of the circle traced by the loop-shaped orbit upon which the icons are placed according to each hierarchical level of commands is stored therein. Also, though omitted in the drawings for sake of simplicity in description, each command of each hierarchical level is provided with icon image data 124b and 124c for specifying the icon image as with FIG. 17, and further, commands which have no lower hierarchical levels are each correlated with processing programs and stored in the program storing area 120.

With the present embodiment, icons correlated with commands belonging to one of the command hierarchical levels according to player operation instructions are placed on an orbit. Thus, only icons belonging to the command hierarchical level selected by the player are displayed, so the icon data tables 1260 and 1270 shown in FIGS. 18 and 19 store the names of icons which belong to the hierarchical level to be displayed and also which are in a valid state (i.e., the player can select and execute). Also, which hierarchical level icons to display is determined by the operation instructions of the player.

Also, hierarchical processing for storing the radius 1245 (see FIG. 53) of the circle traced by the loop-shaped orbit corresponding to the selected hierarchical level in the radii 1263 and 1273 of the circumferences of the icon data tables 1260 and 1270 shown in FIGS. 18 and 19 is performed. The hierarchical processing will be described later. Then, the icons are placed on the loop-shaped orbit based on the data stored in the icon tables 1260 and 1270.

Figure 54:
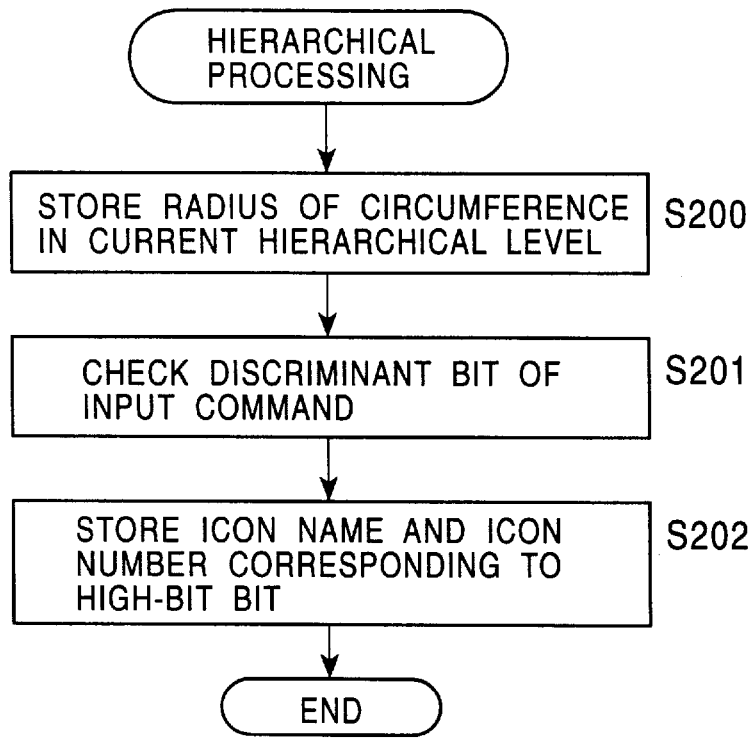
FIG. 54 is a flowchart describing a hierarchical processing.

FIG. 54 is a flowchart describing the above-mentioned hierarchical processing. The hierarchical processing shown in FIG. 54 is performed in the event that a command has been input, for example. Making reference to FIG. 54, first, in step S200, the icon data tables 1260 and 1270 stored in the icon data storing area 126 (see FIG. 15) are cleared, and the radius 1245 (see FIG. 53) of the circle traced by the loop-shaped orbit corresponding to the current hierarchical level is stored in the X-Z radius 1263 of the X-Z icon data table 1260 (see FIG. 18) and in the Y-Z radius 1273 of the Y-Z icon data table 1270 (see FIG. 19).

Next, the discriminant bit of the command input in step S201 is checked. That is, at the time of the icons each being correlated to the icon Nos. in the icon data tables 1260 and 1270, valid commands are discerned in the present command hierarchical level. That is, commands which that character can execute at that point are discerned. For example, in the event that a command "Salamander" 1240 which is a command belonging to the second level hierarchical command group 124f is input, whether the command is valid (or invalid) at the lower order hierarchical level (the third hierarchical level) is discerned by a later-described check of a discriminant bit string.

Figure 55:
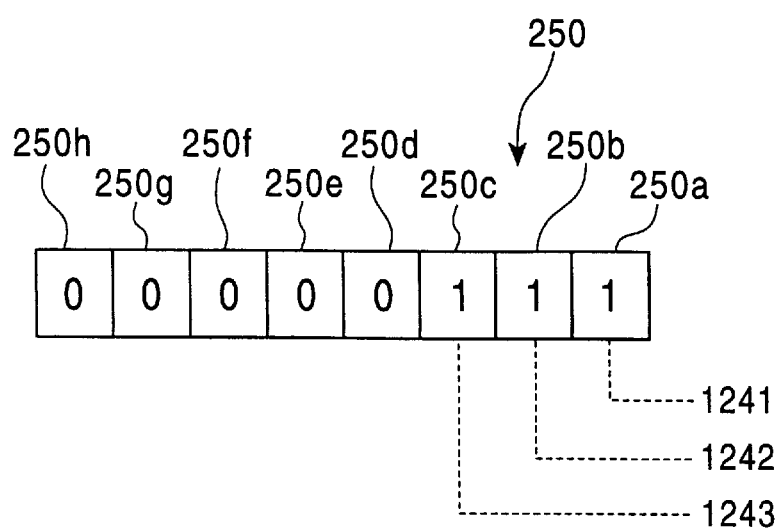
FIG. 55 is a diagram illustrating an example of a discriminant bit string.

FIG. 55 an example of a discriminant bit string correlated with "Salamander" 1240 shown in FIG. 53 for discerning whether the command is valid (or invalid) at the lower order hierarchical level (the third hierarchical level 124g) of "Salamander".

As shown in FIG. 55, with the present embodiment, "Fire" 1241 which is the lower order hierarchical level command of "Salamander" 1240 shown in FIG. 53 is correlated with the No. 0 bit 250a of the discriminant bit string 250, "Fire 2" 1242 is correlated with the No. 1 bit 250b, and "Fire 3" 1243 is correlated with the No. 2 bit 250c. Incidentally, the three commands are associated with "Salamander" 1240, so only No. 0 bit 250a through No. 2 bit 250c are used, but in the event that even more commands are provided thereto, the other bits (250d through 250h) are used as well.

At the time of discerning whether the command is valid (or invalid), whether each bit in the discriminant bit string for "Salamander" 1240 is a high bit (i.e., "1") or a low bit (i.e., "0") is detected. In the event that a bit is a high bit (i.e., "1") for example, the command correlated therewith is judged to be valid.

Returning to FIG. 54, the name of the icon corresponding to the command of the bit that was the high bit ("1") in step S202 is correlated with the icons Nos. 1261 and 1271 of the icon data tables 1260 and 1270 and sequentially stored. Also, the total number of the types of icons stored is counted, and stored as the icon number 126b.

As shown in FIG. 52, the first loop-shaped orbit 220 (radius r3) can be switched to the second loop-shaped orbit 221 (radius r4) and displayed according to the hierarchical level of the command (here, r4>r3). The commands displayed as the icons 240 through 246 placed on the loop-shaped orbit 221 are commands of a lower order than the commands displayed as the icons 230 through 236 placed on the loop-shaped orbit 220. Thus, the player can easily recognize switching of the command hierarchical levels.

Figure 56:
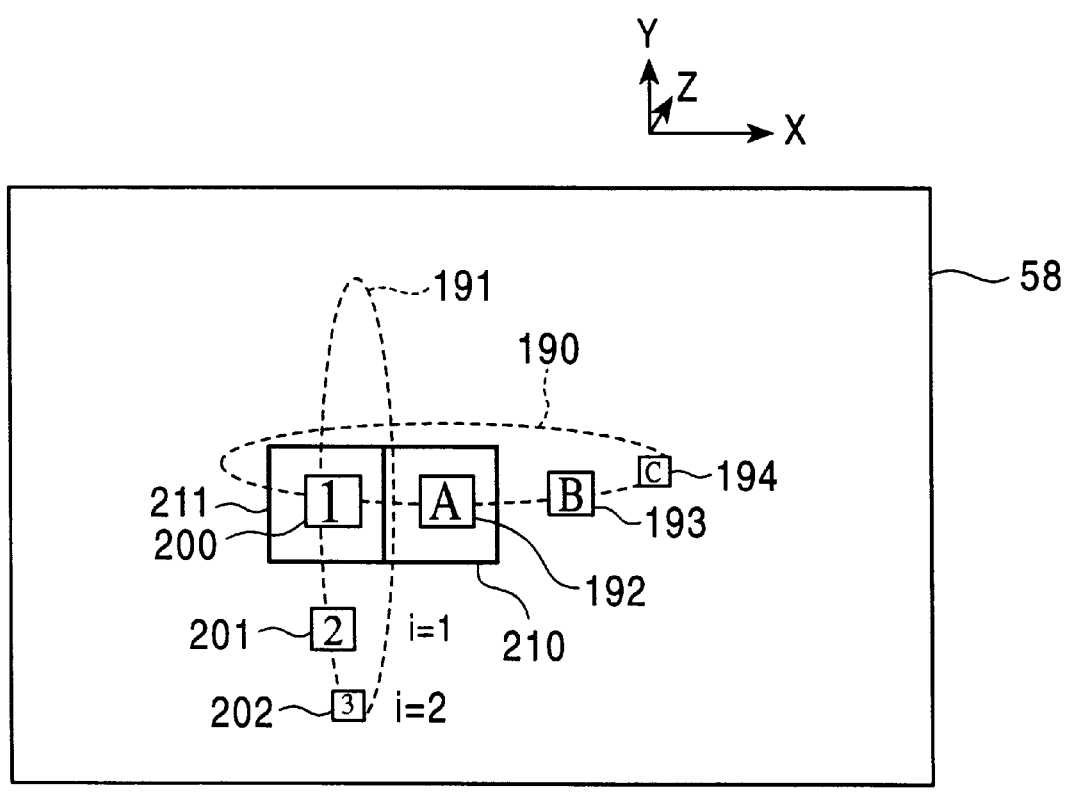
FIG. 56 is a diagram illustrating the display screen according to a third embodiment.

FIG. 56 is a diagram illustrating the state of icons being displayed on the display screen 58 by the method according to the present embodiment. As shown in FIG. 56, the radii of the first loop-shaped orbit 190 and the second loop-shaped orbit 191 change according to the hierarchical level of commands which the player is inputting at that time. In the example shown in FIG. 56, the icons on the first loop-shaped orbit 190 and the second loop-shaped orbit 191 correspond with commands in the middle order hierarchical level, and thus, the radii of the first loop-shaped orbit 190 and the second loop-shaped orbit 191 are smaller than that shown in FIG. 20.

As described above, according to the present embodiment, the radius of the circle traced by the loop-shaped orbit is changed according to the hierarchical level of the command in the event that commands are provided with a hierarchical structure, so the player can tell the hierarchical level of the command which is the object of input at that point simply by seeing the radius of the icons displayed.

Fourth Embodiment

With the present embodiment, the loop-shaped orbit of the icons corresponding to the hierarchical levels changes each time input of commands is switched between higher order hierarchical level and lower order hierarchical level. Thus event in the event that the radius of the circle traced by the loop-shaped orbit is the same, the player can easily tell that the hierarchical level of commands has shifted.

Figure 57:
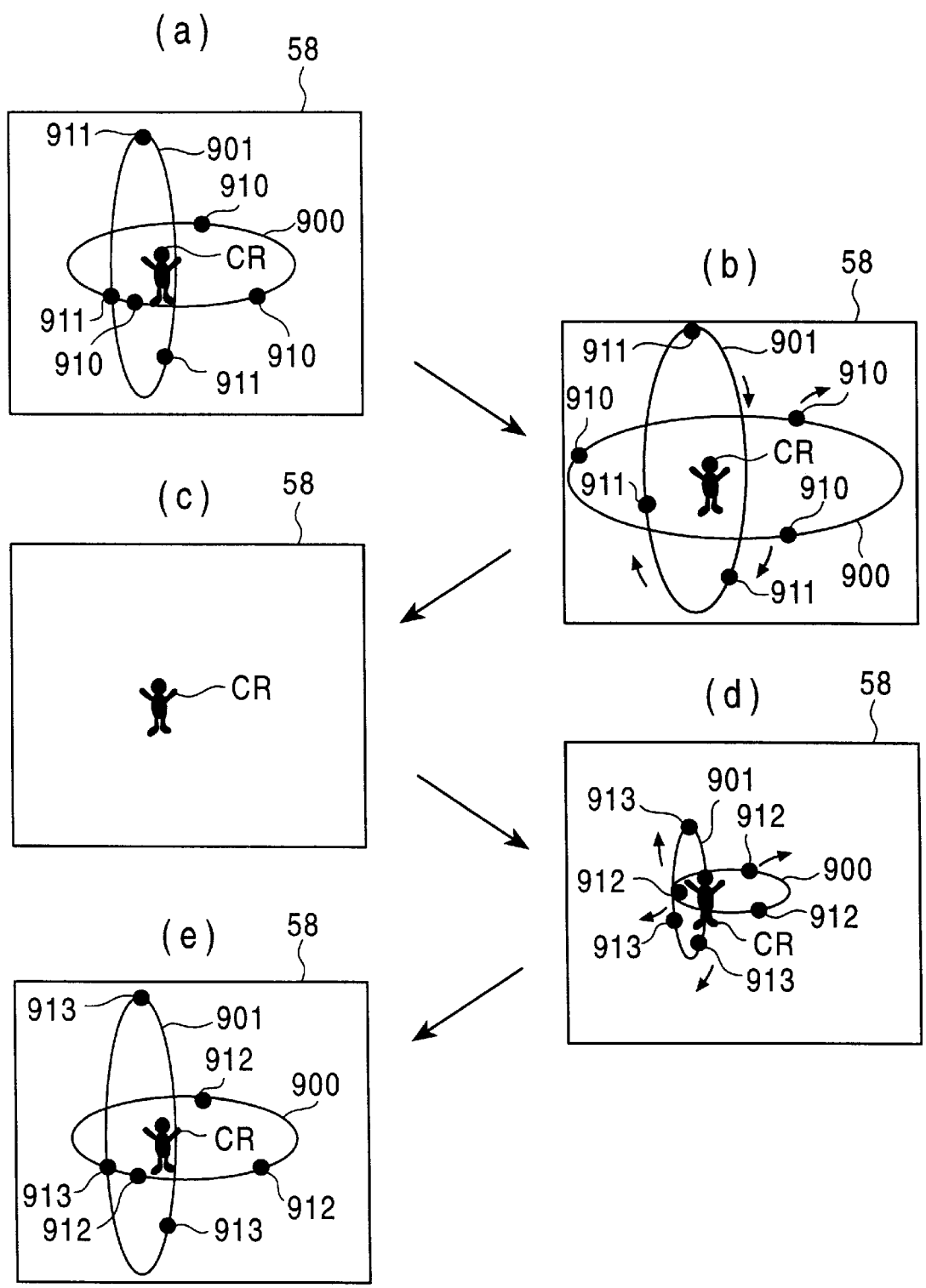
FIGS. 57(a)–57(e) are diagrams illustrating the display screen according to a fourth embodiment of the present invention (switch-over display to lower hierarchical level)

FIGS. 57(a)–57(e) are diagrams illustrating the change of the display screen 58 at the time of the command hierarchical level changing, in the form of a time-sequence. The diagram of FIG. 57(a) shows the character CR, a first loop-shaped orbit 900 and a second loop-shaped orbit 901 centered around this character CR, multiple icons 910 placed on this first loop-shaped orbit 900, and multiple icons 911 placed on this second loop-shaped orbit 901. Note that the cursors are omitted here in order to facilitate ease of description. Also, the diagrams in FIGS. 57(b) through 57(e) illustrate a display example on the display screen 58 in time sequence, according to a case wherein the player selects and instructs the combination of icons 910 and 911 enveloped by the cursors (not shown) on the first loop-shaped orbit 900 and second loop-shaped orbit 901 in FIG. 57(c).

That is, in the event that the combination of icons 910 and 911 on the first loop-shaped orbit 900 and second loop-shaped orbit 901 is selected by the player, the radii of the first loop-shaped orbit 900 and second loop-shaped orbit 901 increase with the character CR as the center thereof, as shown in FIG. 57(b). Also, the display of the icons is controlled so as to be positioned on their respective loop-shaped orbits in accordance with the enlarging of the first and second loop-shaped orbits. However, an arrangement may be made wherein the radii of the first loop-shaped orbit 900 and second loop-shaped orbit 901 increase in a state wherein these icons 910 and 911 do not move over the loop-shaped orbits. Then, as shown in FIG. 57(c), the first loop-shaped orbit 900 and second loop-shaped orbit 901 surpass the frame of the display screen 58 due to the expansion of the first loop-shaped orbit 900 and second loop-shaped orbit 901, so only the character CR is displayed on the display screen 58.

Subsequently, as shown in FIG. 57(d), the radii of the first loop-shaped orbit 900 and second loop-shaped orbit 901 continue to expand with the character CR on the display screen 58 as the center thereof. That is, display control is performed such that the radii of the first loop-shaped orbit 900 and second loop-shaped orbit 901 return from zero to the original radii. At this time, icons 912 and 913 corresponding to the lower order hierarchical level commands of the input command are provided on the first and second loop-shaped orbits, respectively. Then, as shown in FIG. 57(e), at the point that the first loop-shaped orbit 900 and second loop-shaped orbit 901 return to the original radii, the enlarging display control of the loop-shaped orbits ends.

Figure 58:
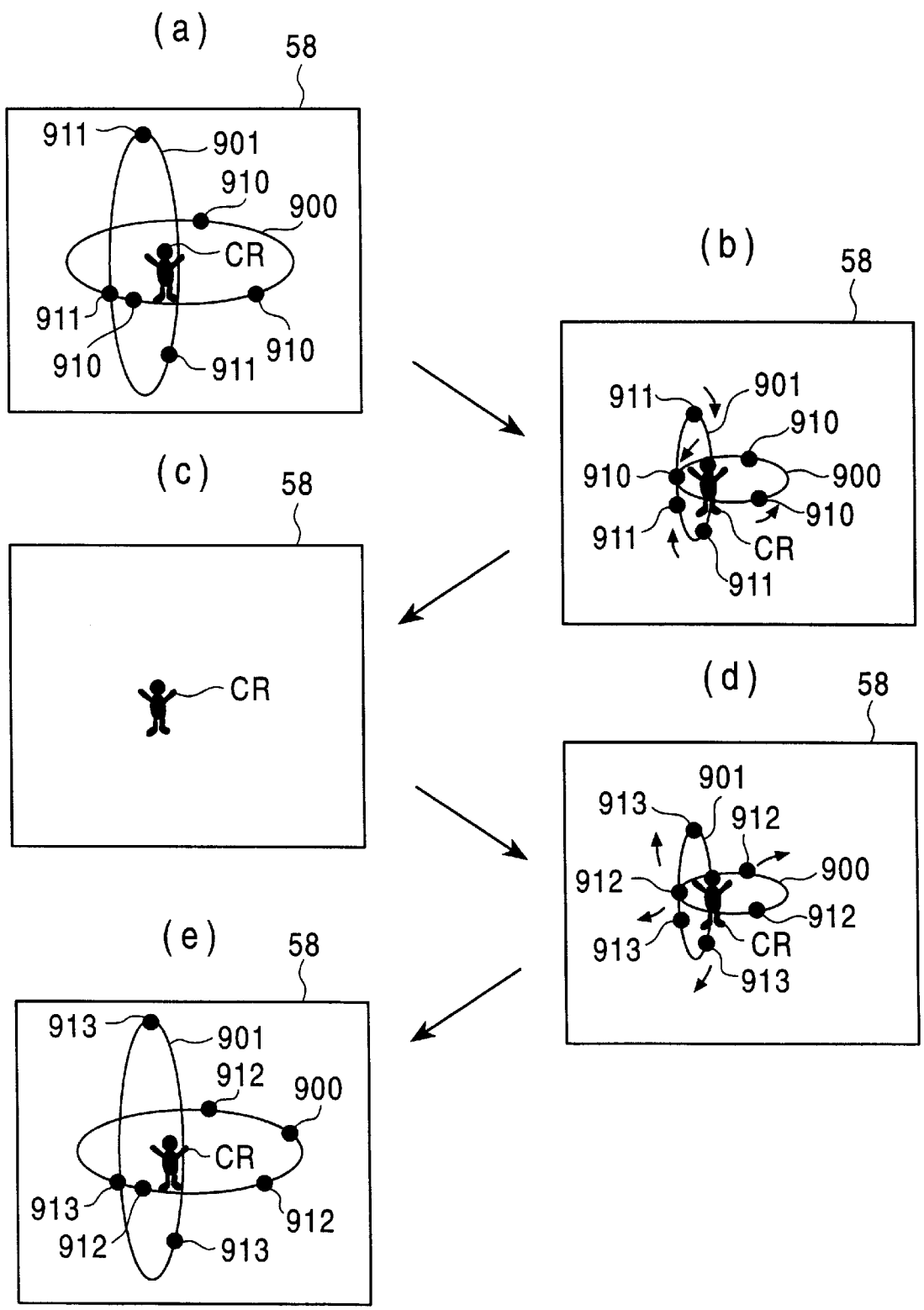
FIGS. 58(a)–58(e) are diagrams illustrating the display screen according to the fourth embodiment of the invention (switch-over display to higher hierarchical level)

FIGS. 58(a)–58(e) are diagrams illustrating the change of the display screen 58 at the time of the command hierarchical level changing, in the form of a time-sequence. The diagram of FIG. 58(a) shows the character CR, a first loop-shaped orbit 900 and a second loop-shaped orbit 901 centered around this character CR, icons 910 placed on this first loop-shaped orbit 900, and icons 911 placed on the second loop-shaped orbit 901. The cursors are omitted here in order to facilitate ease of description. Also, the diagrams in FIGS. 58(b) through 58(e) illustrate a display example on the display screen 58 in time sequence, according to a case wherein the player presses the cancel key 53f or the like in FIG. 58(a) so that higher order hierarchical level commands are displayed.

That is, in the event that the player presses the cancel key 53f or the like, the radii of the first loop-shaped orbit 900 and second loop-shaped orbit 901 with the character CR as the center thereof are displayed in a reduced manner, as shown in FIG. 58(b). Also, the display of the icons is controlled so as to be positioned on their respective loop-shaped orbits in accordance with the reduction of the first and second loop-shaped orbits. Then, as shown in FIG. 58(c), the first loop-shaped orbit 900 and second loop-shaped orbit 901 are no longer displayed due to the reduction of the first loop-shaped orbit 900 and second loop-shaped orbit 901, so only the character CR is displayed on the display screen 58.

Subsequently, as shown in FIG. 58(d), the radii of the first loop-shaped orbit 900 and second loop-shaped orbit 901 continue to expand with the character CR on the display screen 58 as the center thereof. That is, display control is performed such that the radii of the first loop-shaped orbit 900 and second loop-shaped orbit 901 return from zero to the original radii. At this time, icons 912 and 913 corresponding to the lower order hierarchical level commands of the input command are provided on the first and second loop-shaped orbits, respectively. Then, as shown in FIG. 58(e), at the point that the first loop-shaped orbit 900 and second loop-shaped orbit 901 return to the original radii, the enlarging display control of the loop-shaped orbits ends.

Thus, according to the present embodiment, upon inputting commands from the player and inputting lower order hierarchical level commands of the input command, the currently-displayed icons are controlled so as to be moved outside of the displays screen 58. Next, icons of the lower order hierarchical level are placed on the new loop-shaped orbit, and moved from the center position of the character CR to the original loop-shaped moving state.

Also, as shown in FIGS. 58(a)–58(e), in the event that the player presses the cancel key 53f or the like so that higher order hierarchical level commands are input, the radii of the loop-shaped orbits where the currently-displayed icons are placed are subjected to moving control until the values thereof become zero. Next, icons of the higher order hierarchical level are placed on the new loop-shaped orbit, and moved from the center position of the character CR to the original loop-shaped moving state. Thus, the player can easily understand the movement of command hierarchical level from the movement of the icons at the time of switching the icons.

Incidentally, though the present embodiment has been described with reference to an arrangement wherein the first loop-shaped orbit 900 and second loop-shaped orbit 901 simultaneously are expanded or reduced, but the present invention is not restricted to this. An arrangement may be made wherein one loop-shaped orbit or the other is expanded or reduced, and commands are input according to combinations of icons.

Also, with the present embodiment, description has been made such that in the event that a lower order hierarchical level command is input, the loop-shaped orbit is expanded so that the icons displayed at that point are deleted from the display screen, and in the event that a higher order hierarchical level command is input, the loop-shaped orbit is reduced so that the icons displayed at that point are deleted from the display screen, but the present invention is not restricted to such. For example, an arrangement may be made wherein in the event that a lower order hierarchical level command is input, the loop-shaped orbit is reduced so that the icons displayed at that point are deleted, and in the event that a higher order hierarchical level command is input, the loop-shaped orbit is expanded so that the icons at that point are deleted.

Also, at the time of displaying a new loop-shaped orbit, an arrangement may be used wherein the loop-shaped orbit is reduced from the outside of the display screen and thus displayed, instead of being expanded from the center position of the character CR.

Further, an arrangement may be made wherein, in the event that a lower order hierarchical level command is input, a new loop-shaped orbit is expanded from the center position of the character CR and thus displayed, and in the event that a higher order hierarchical level command is input, a new loop-shaped orbit is reduced from the outside of the display screen and thus displayed. Moreover, a reverse arrangement may be used.

Fifth Embodiment

With the game according to the present embodiment, the player causes a character to execute magic spells by selecting a combination of an icon on the first loop-shaped orbit (first orbit) and an icon on the second loop-shaped orbit (second orbit).

FIG. 59 is a diagram illustrating the command data table 124*a* according to the present embodiment. The command data table 124*a* in FIG. 59 is made up of a column 124*b* for storing the name of "color attributes", a column 124*c* for storing the name of "effects", and a column 124*d* for storing the name of "magic spell".

The column 124*b* for "color attributes" stores the attributes information for magic spells. The column 124*c* for "effects" stores information of the types of "effects" which can be combined with the attributes information stored in the column 124*b* for "color attributes". The column 124*d* for "magic spell" stores the mane of magic spells which are executed by specifying the combination of "color attributes" and "effects".

In this way, the command data table 124*a* shows the correlated relationship between the combination of color attribute icons placed on the first loop-shaped orbit (first orbit) and effect icons placed on the second loop-shaped orbit (second orbit) with magic spells, with the fifth embodiment. Though omitted in the diagrams, a processing program is stored in the program storing area 120 corresponding with each magic spell. Input of a magic spell executes a processing program, thereby realizing the functions for each magic spell.

The color attributes represent the attributes of the magic spell, and the effects represents the range and the like over which the magic spell has effect. Different magic spells are executed according to the combination of color attribute and effect. For example, in the event that the player selects the color attribute icon "red" and effects icon "normal", the magic spell "burner" is executed. In the same way, in the event that the player selects the color attribute icon "blue" and effects icon "power", the magic spell "ripple" is executed.

Next, a description will be made regarding selection and execution of magic spells in the present embodiment. FIG. 60 is a diagram illustrating the display screen 58 at the time of the player selecting a magic spell. With the present embodiment, a description will be made with reference to an arrangement wherein the first loop-shaped orbit and the second loop-shaped orbit are concentrically positioned, as described in the first embodiment.

Figure 60A:
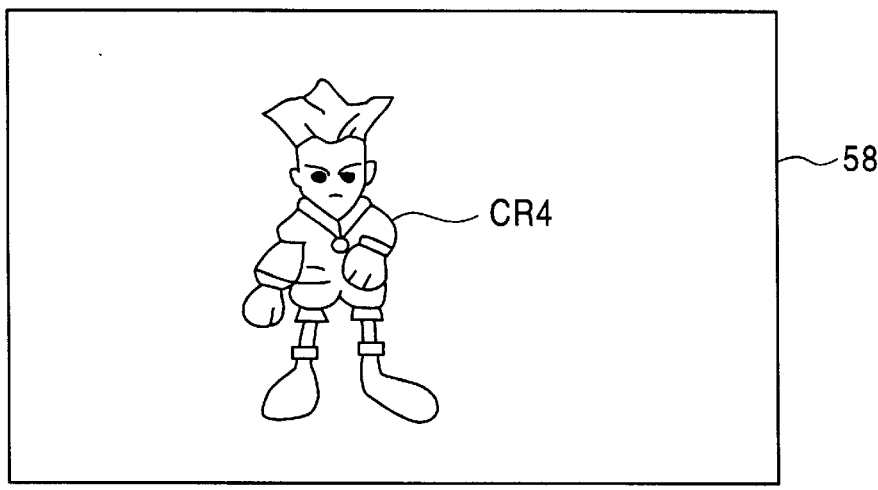
FIGS. 60A–60C are diagrams illustrating a display screen at the time of selecting magic spells, according to the fifth embodiment.
Figure 60B:
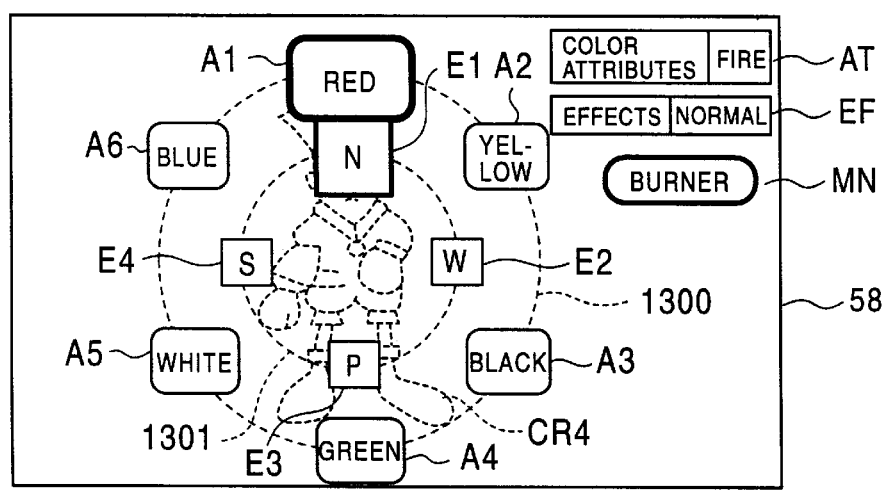

A character CR4 is displayed on the display screen 58 shown in FIG. 60A. In the state shown in FIG. 60A, the player pressing the confirmation key 53*e* of the controller 53 causes icons corresponding to character CR4, as shown in FIG. 60B, i.e., color attribute icons A1 through A6 positioned on the first loop-shaped orbit 1300 and effects attribute icons E1 through E4 positioned on the second loop-shaped orbit 1301, to be displayed. The color attribute icons A2 and A3 and effects icon E4 indicate that these have not yet been attained by the character in the game at this point. While the player keeps the confirmation key 53*e* pressed down, the first loop-shaped orbit 1300 and second loop-shaped orbit 1301 are displayed on the display screen 58, and moving control of the icons can be performed in the same manner as with the main processing shown in FIG. 30.

In FIG. 60B, the position at which the color attribute icon Al on the first loop-shaped orbit 1300 and the effects icon E1 on the second loop-shaped orbit 1301 are placed indicate the icon selection position. The icons at places other than the selection position are all of a constant size, but the icons positioned at the selection position are displayed larger than the other icons.

The name of the color attribute icon currently in the selection position is displayed in the color attribute display area AT. Also, the name of the effects icon currently in the selection position is displayed in the effects display area EF. Further, the name of the magic spell corresponding to the combination of the color attributes icon and the effects icon currently in the selection position is displayed in the magic spell name display area MN.

As one example in the present embodiment, icons on the first loop-shaped orbit 1300 can be moved along the first loop-shaped orbit 1300 by means of pressing either the right-direction key 53*a* or the left-direction key 53*c* of the controller 53 in the state that the player keeps the confirmation key 53*e* pressed down. Also, icons on the second loop-shaped orbit 1301 can be moved along the second loop-shaped orbit 1301 by means of pressing either the up-direction key 53*d* or the down-direction key 53*b*.

In the event of executing desired magic spells, the player moves the desired icons to the selection position, stops pressing the confirmnation key 53*e*, and thus stops the display of the first loop-shaped orbit 1300 and second loop-shaped orbit 1301. Next, the player presses a key to which invocation of magic spells has been appropriated, such as the triangle key 53*h*, at the desired timing for invocation of the magic spell, which causes the combination of icons in the selection position to be specified from the selected icon Nos. in the icon table within the main memory 104. A command corresponding to the combination of icons is input, and the magic spell (i.e., function) corresponding to that command is executed.

Figure 60C:
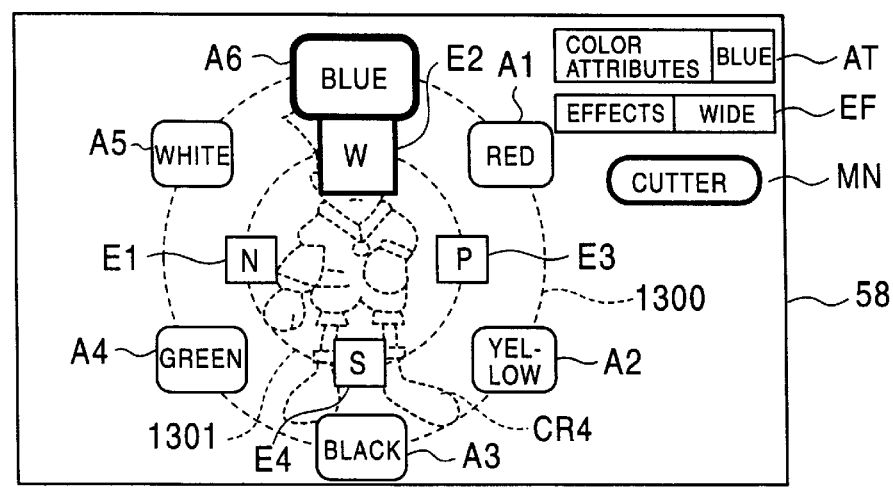

FIG. 60C shows the state of the display 58 screen wherein the player has pressed the left/right direction and up/down direction keys of the controller 53 from the state shown in FIG. 60B to move the icons on the first loop-shaped orbit 1300 and second loop-shaped orbit 1301. The color attributes icon A6 and effects icon E2 are placed on the icon selection position.

At this time, the name of the color attributes icon A6 is displayed in the color attribute display area AT, and the name of the effects icon E2 is displayed in the effects display area EF. Further, the name of the magic spell corresponding to the combination of the color attributes icon A6 and the effects icon E2 is displayed in the magic spell name display area MN.

Figure 61:
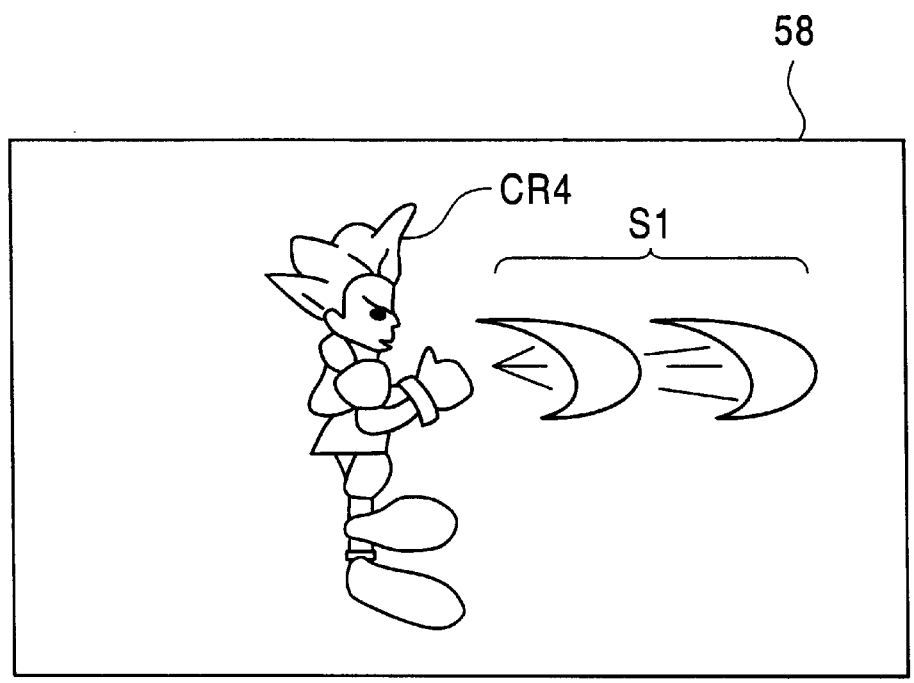
FIG. 61 is a diagram illustrating the state of the display screen, having executed a magic burner.

FIG. 61 illustrates the display screen 58 at the time of executing the magic spell corresponding to the combination of the color attributes icon A1 and the effects icon E1 in FIG. 60B. In this case, the magic spell "burner" is executed, and a screen showing the character CR4 firing projectiles S1 is displayed on the display screen 58.

Figure 62:
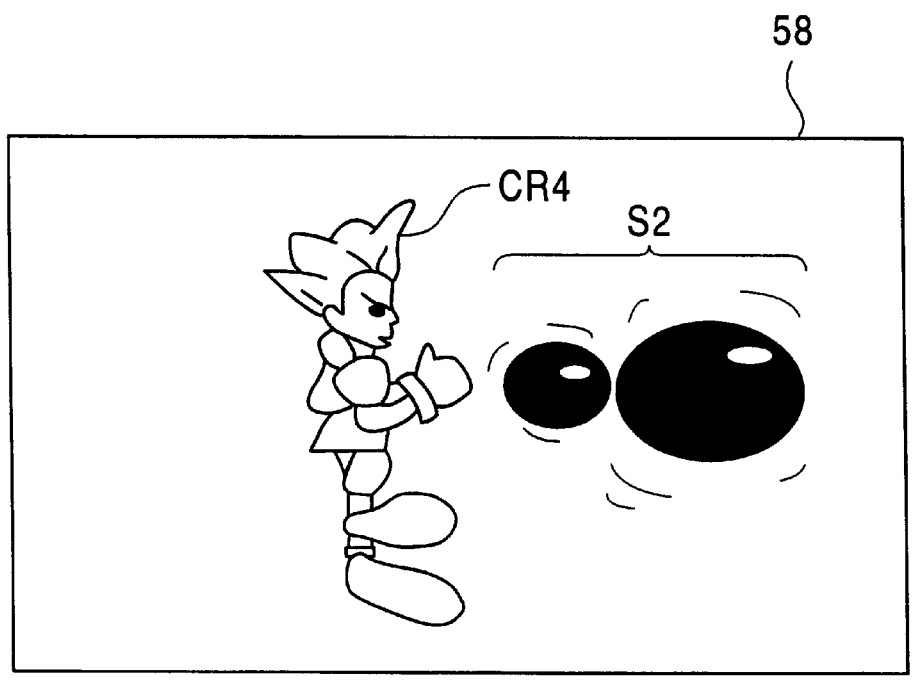
FIG. 62 is a diagram illustrating the state of the display screen, having executed a magic cutter.

FIG. 62 illustrates the display screen 58 at the time of executing the magic spell corresponding to the combination of the color attributes icon A6 and the effects icon E2 in FIG. 60C. In this case, the magic spell "cutter" is executed, and a screen showing the character CR4 firing projectiles S2 is displayed on the display screen 58.

Thus, with the game according to the present embodiment, one magic spell corresponding to the combination of color attribute icons and effect icons can be executed, as with the above-described embodiments. Hence, even in the event that the number of selections of magic spells increases in the game, the number of icons that needs to be displayed on the screen can be kept to a minimum, and also the player can easily select magic spells.

Though this description has been made as one example of the present embodiment wherein icons on the first loop-shaped orbit 1300 and second loop-shaped orbit 1301 are positioned concentrically, but it is needless to say that the present embodiment may be also applied to the first through fourth embodiments and variations thereof. Thus, the visual recognition of the icons can be improved, and various types of magic spells can be selected and executed.

Incidentally, the description of the present embodiment has involved an arrangement wherein different types of magic spells are executed according to combinations of icons, but the present embodiment is not restricted to this. For example, this may be applied to actions of the character in the game, such as usage of weapons and items and the like by the character in the game.

Sixth Embodiment

Figure 63:
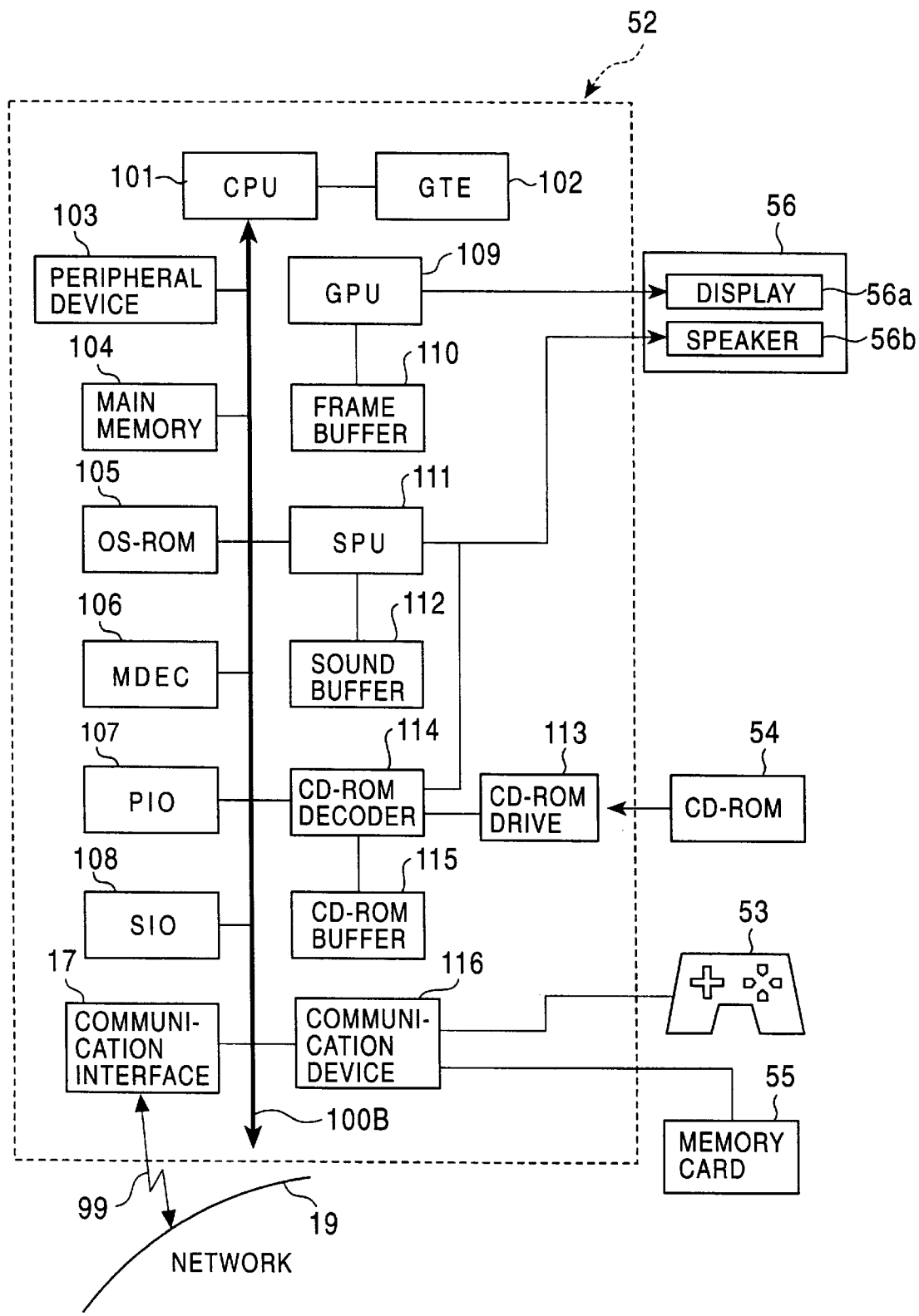
FIG. 63 is a diagram illustrating a game apparatus and the peripheral configuration thereof, according to a sixth embodiment of the present invention.

FIG. 63 is a block diagram illustrating a circuit configuration of the game apparatus 52 and the peripheral configuration thereof according to a variation of the present embodiment. The circuit confirmation shown in FIG. 63 is basically the same as the circuit confirmation shown in FIG. 2, except for a portion thereof. Accordingly, the same components as those in FIG. 2 are denoted with the same reference numerals in FIG. 63 as well, and description thereof is omitted.

Making a description of the points of change with FIG. 2, a communication interface 17 is provided for the game apparatus 52, such that the game apparatus 52 can be connected to a communication circuit 99 via the communication interface 17. The communication interface 17 is a circuit for performing information exchange with other devices on a network 19 via the communication line 99, and is connected to the other circuits of the game apparatus 52 via a bus 100B.

Figure 64:
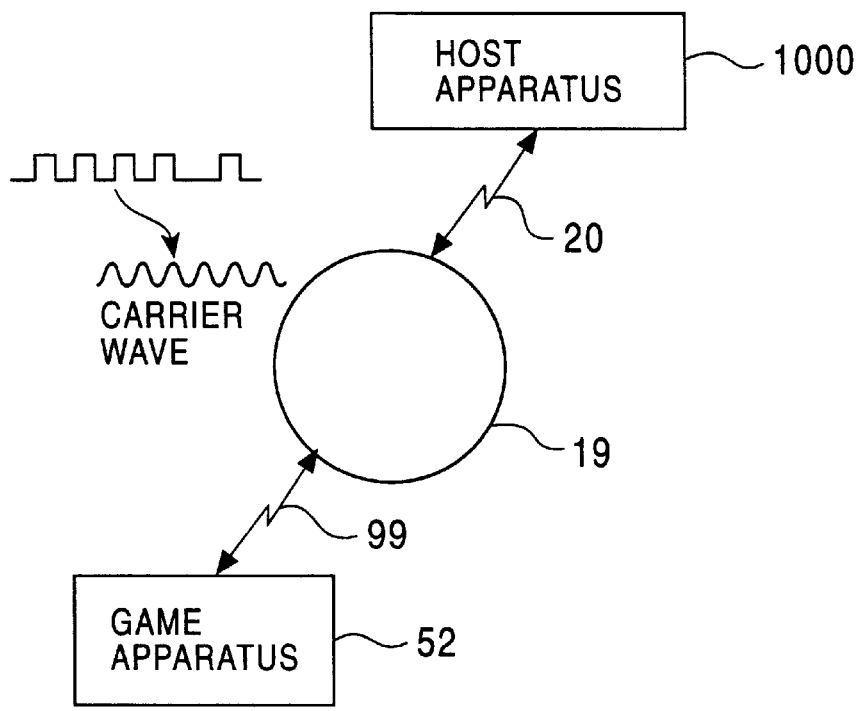
FIG. 64 is a diagram illustrating the state of the game apparatus according to the sixth embodiment being connected to a host apparatus via a network.

Making a connection to the communication line 99 via the communication interface 17 allows programs and data for realizing the present invention to be received from the host apparatus 1000 shown in FIG. 64 via the communication line 20 and network 19 as carrier waves, for example, either frequency-modulated or phase-modulated, according to the data stream thereof, so as to be stored within the various storage areas in the main memory 104 as appropriate and used.

Moreover, an arrangement may be made wherein programs and data for realizing the present invention are partially or all recorded in the memory of other equipment connected via the communication line 99 or network 19, such that these programs and data can be used via the communication line 99 or network 19.

The above first through sixth embodiments of the present invention has been described with reference to an arrangement wherein a game system serves as the platform fore realizing the present invention. However, the present invention may be realized using general-purpose computers, such as, for example, personal computers, arcade devices, cellular telephones, portable information terminal, car navigation devices and other like communication devices, etc., and the platform thereof.

Further, with the embodiments, the present programs and data for realizing the present invention were described as being stored in a CD-ROM, with the CD-ROM being used as the recording medium. However, the recording medium is by no means restricted to a CD-ROM; rather, other recording mediums may be used, such as, for example, computer-readable electromagnetic or optical recording mediums like electromagnetic disks and ROM cards, or semiconductor memory.

Also, an embodiment has been described wherein the programs and data for realizing the present invention are received via communication lines, but the programs and data for realizing the present invention may be pre-installed in the memory of the game device or computer beforehand.

As described above, according to the present invention, commands can be input according to combinations of icons, so the number of icons displayed can be kept to a minimum.

The present disclosure relates to subject matter contained in Japanese Patent Applications Nos. HEI 11-309823, filed on Oct. 29, 1999, and HEI 11-023155, filed on Jan. 29, 1999 the contents of both of which are herein expressly incorporated by reference in their entireties.

What is claimed is:

1. A game apparatus, comprising:

a computer that controls a game; and a recording medium that stores at least one program used by said computer to control the game, wherein said at least one program causes said computer to:

store each of a first icon image group and a second icon image group, made up of a plurality of icon images, for inputting of commands to be instructed to said computer, respectively set in a loop fashion a first orbit for moving said first icon image group into a virtual space, and a second orbit for moving said second icon image group, position said stored first and second icon image groups on said set first and second orbits in a corresponding manner, control a movement of said first and second icon image groups positioned on a display screen, associated with the game apparatus, along corresponding first and second orbits, in response to an operation input, and input commands correlated beforehand with combinations of icons placed on particular positions on said first and second orbits by said moving control.

2. The game apparatus of claim 1, which further executes magic spells correlated beforehand with said input commands.

3. The game apparatus of claim 1, wherein the position in said virtual space of at least one character displayed on said display screen is stored, the selected character information for specifying a character selected by the player from said at least one character being displayed on said display screen, said at least one the character specified by said held selection information being changed to another character according to operating signals from the player, said first and second orbits being set with the position of the at least one character specified by said stored selected character information as the center thereof.

4. The game apparatus of claim 3, further wherein said commands appropriated to said first and second icon image groups are hierarchically sorted and stored, wherein said icon positioning involves only icon images to which are appropriated the commands belonging to the hierarchical level selected by the player being selected from said first and second icon image groups and positioned, and wherein said orbit setting involves the diameters of each of the first and second orbits to be set according to the hierarchical level of the command appropriated to the icon image to be displayed is changed to a diameter stored in correlation with the hierarchical level of said command.

5. The game apparatus of claim 4, further comprising a hierarchy change display device wherein, in the event that the hierarchical level of the command selected by the player changes, a diameter of the orbit from said first or second orbit where the icon image to which the command regarding which the hierarchical level thereof changes is located is one of enlarged and reduced with a position of the character specified by said selected character information as the center thereof, so as to be deleted from said display screen, and the diameter of the orbit on which the icon image to which the command of the new hierarchical level is positioned is displayed on said display screen by one of enlarging and reducing with the position of the character specified by said selected character information as the center thereof.

6. The game apparatus of claim 4, wherein, with said icon placing, said first and second icon image groups are positioned on said set first and second orbits at a uniform distance.

7. The game apparatus of claim 6, wherein the selected icon information that specifies icon images selected by the player from said first and said second icon image groups is held, the icon image specified by said held selected icon information is changed into other icon images adjacent on one of said first orbit and said second orbit with the icon image specified by said selected icon information according to operating signals from the player, and said icon positioning involves positioning icon images specified from said held selected icon information at specific positions on said first orbit and said second orbit.

8. The game apparatus of claim 1, wherein at least a part of said first orbit and said second orbit are set so as to intersect when setting said orbits.

9. The game apparatus of claim 1, wherein said first orbit and said second orbit are set so as to be concentric when setting said orbits.

10. A game apparatus, comprising:

a computer that controls a game; and a recording medium that stores at least one program for causing said computer to control a game, wherein said at least one program causes said computer to perform:

a storing of an icon image group made up of at least one icon image that inputs commands to be instructed to said computer;

a setting in a loop fashion an orbit for moving said icon image group into a virtual space;

a positioning of said stored icon image group on said set orbit;

a controlling of a movement of said icon image group positioned on a display screen, associated with said game apparatus, along said orbit, in response to an operation input; and an inputting of a command correlated beforehand with icons placed on particular positions on said orbit by said controlling movement.

11. A video game command input method, wherein a first orbit for moving a first icon image group made up of a plurality of icon images for inputting commands for instructing a computer, and a second orbit for moving a second icon image group made up of a plurality of icon images for inputting commands for instructing the computer are respectively set in loop forms in a virtual space;

the first icon image group and the second icon image group being positioned on the set first orbit and the second orbit in a respectively correlated fashion;

a movement being controlled for the first icon image group and the second icon image group positioned on a display screen along the first orbit and the second orbit, in response to an operation input; and commands correlated beforehand with combinations of icons placed on particular positions on the first orbit and the second orbit by the moving control are input.

12. A command input method according to claim 11, further comprising executing magic spells correlated beforehand with the input.

13. A video game command input method according to claim 11, wherein at least one character selected by the player to be displayed on the display screen is specified;

the specified character being changed to another character according to operating signals from the player; and the orbit setting sets the first orbit and the second orbit with the position of the specified character as the center thereof in the virtual space.

14. A command input method according to claim 13, wherein the commands appropriated to the first icon image group and the second icon image group are hierarchically sorted and stored;

the icon positioning involves only icon images to which are associated commands belonging to a hierarchical level selected and positioned from the first icon image group and the second icon image group; and the orbit setting involves the diameters of each of the first orbit and the second orbit to be set according to the hierarchical level of the command associated to the icon image to be displayed is changed to a diameter stored in correlation with the hierarchical level of the command.

15. A video game command input method according to claim 14, further including a hierarchy change displaying process wherein, in the event that the hierarchical level of the command selected by the player changes, the diameter of the orbit from the first orbit or the second orbit where the icon image to which the command regarding which the hierarchical level thereof changes is appropriated is located is one of enlarged and reduced with the position of the character specified by the selected character information as the center thereof, so as to be deleted from the display screen, and the diameter of the orbit on which the icon image to which the command of the new hierarchical level is associated is positioned is displayed on said display screen by one of enlarging and reducing with the position of the character specified by the selected character information as the center thereof.

16. A command input method according to claim 14, wherein, the first icon image group and the second icon image group are positioned on the set first orbit and the set second orbit at a uniform distance.

17. A command input method according to claim 16, wherein
the icon images selected by the player from the first icon image group and the second icon image group are respectively specified;
the specified icon images being changed into other icon images adjacent one of the first orbit and the second orbit with the specified icon image, according to operating signals from the player;
the icon positioning involving positioning the specified icon images at specific positions on the first orbit and the second orbit.

18. A command input method according to claim 11, wherein at least a part of the first orbit and the second orbit are set so as to intersect when setting the orbits.

19. A command input method according to claim 11, wherein the first orbit and the second orbit are set so as to be concentric when setting the orbits.

20. A video game command input method, wherein:
forming an orbit that moves an icon image group made up of at least one icon image, an inputting of commands to be instructed to a computer being set in a loop form;
positioning the icon image group on the set orbit;
controlling a movement of the icon image group positioned on a display screen along said orbit, in response to an operation input; and
inputting commands correlated beforehand with icons placed on particular positions on said orbit by said moving control.

21. A computer-readable recording medium that records a program for controlling a video game, wherein said program causes a computer to perform the following:
respectively setting in a loop fashion a first orbit for moving in a virtual space the first icon image group made up of a plurality of icon images for inputting commands to be instructed to the computer, and a second orbit for moving the second icon image group made up of a plurality of icon images for inputting commands to be instructed to the computer;
positioning the first icon image group and the second icon image group on the set first orbit and the set second orbit in a corresponding manner;
controlling a movement of the first icon image and the second icon image group positioned on a display screen along corresponding first orbit and second orbit, in response to an operation input; and
inputting commands correlated beforehand with combinations of icons placed on particular positions on the first orbit and the second orbit by the moving control.

22. A recording medium according to claim 21, further comprising executing command execution procedures that execute magic spells correlated beforehand with the input commands.

23. A recording medium according to claim 21, wherein
a character selected by the player from at least one character displayed on the display screen is specified;
the character specified is changed to another character according to operating signals from the player; and
the orbit setting sets the first orbit and the second orbit with the specified position of the character in the virtual space as the center thereof.

24. A recording medium according to claim 23, wherein the commands appropriated to the first icon image group and the second icon image group are hierarchically sorted and stored;
the icon positioning involves only icon images to which are appropriated the commands belonging to the hierarchical level selected by the player being selected and positioned from the first icon image group and the second icon image group; and
said orbit setting involves the diameters of each of the first orbit and the second orbit to be set according to the hierarchical level of the command appropriated to the icon image to be displayed is changed to a diameter stored in correlation with the hierarchical level of the command.

25. A recording medium according to claim 24, further including a hierarchy change displaying process wherein, in the event that the hierarchical level of the command selected by the player changes, the diameter of the orbit from the first orbit or the second orbit where the icon image to which the command regarding which the hierarchical level thereof changes is one of enlarged and reduced with the position of the character specified by the selected character information as the center thereof, so as to be deleted from the display screen, and the diameter of the orbit on which the icon image to which the command of the new hierarchical level is positioned is displayed on the display screen by one of enlarging and reducing the position of the character specified by the selected character information as the center thereof.

26. A recording medium according to claim 24, wherein, with the icon placing, the first icon image group and the second icon image group are positioned on the set first orbit and the second orbit at uniform distancing.

27. A recording medium according to claim 26, wherein
the icon images selected by the player from the first icon image group and the second icon image group are each specified;
the specified icon images are changed into other icon images adjacent to the specified icon images on the first orbit or the second orbit specified according to operating signals from the player; and
the icon positioning involves positioning specified icon images at specific positions on the first orbit and the second orbit.

28. A recording medium according to claim 21, wherein at least a part of the first orbit and the second orbit are set so as to intersect when setting the orbits.

29. A recording medium according to claim 21, wherein the first orbit and the second orbit are set so as to be concentric when setting the orbits.

30. A computer-readable recording medium that records a program that controls a video game, the program causing a computer to perform the following:
setting in a loop fashion an orbit for moving an icon image group made up of at least one icon image for inputting of commands to be instructed to the computer into a virtual space;
positioning the icon image group on the said set orbit;
controlling a movement of the icon image group positioned on a display screen along the orbit, in response to an operation input; and
inputting commands correlated beforehand with icons placed on particular positions on the orbit by the moving control.

* * * * *